(12) United States Patent
Noguchi et al.

(10) Patent No.: US 7,894,637 B2
(45) Date of Patent: Feb. 22, 2011

(54) DEVICE, PROGRAM, AND METHOD FOR CLASSIFYING BEHAVIOR CONTENT OF AN OBJECT PERSON

(75) Inventors: Yoshihiro Noguchi, Hachioji (JP); Keiji Shimada, Sagamihara (JP); Ken Ishihara, Atsugi (JP)

(73) Assignee: Asahi Kasei Corporation, Osaka (JP)

( * ) Notice: Subject to any disclaimer, the term of this patent is extended or adjusted under 35 U.S.C. 154(b) by 1043 days.

(21) Appl. No.: 11/596,258

(22) PCT Filed: May 23, 2005

(86) PCT No.: PCT/JP2005/009376

§ 371 (c)(1), (2), (4) Date: Nov. 13, 2006

(87) PCT Pub. No.: WO2005/114576

PCT Pub. Date: Dec. 1, 2005

(65) Prior Publication Data

US 2008/0037837 A1 Feb. 14, 2008

(30) Foreign Application Priority Data

May 21, 2004 (JP) ............................. 2004-151579

(51) Int. Cl.
*G06K 9/00* (2006.01)
(52) U.S. Cl. .................. 382/118; 382/115; 715/863
(58) Field of Classification Search .............. 382/115, 382/118; 715/863
See application file for complete search history.

(56) References Cited

U.S. PATENT DOCUMENTS 7,359,529 B2 * 4/2008 Lee ............................ 382/103
2003/0048930 A1 * 3/2003 Mihara et al. ............... 382/118
2003/0059092 A1 3/2003 Okubo et al.

FOREIGN PATENT DOCUMENTS

| JP | 2-57433 | 2/1990 |
|---|---|---|
| JP | 3-98078 | 4/1991 |
| JP | 4-24503 | 1/1992 |
| JP | 7-79937 | 3/1995 |
| JP | 7-156682 | 6/1995 |

(Continued)

*Primary Examiner*—Brian Q Le
*Assistant Examiner*—Edward Park
(74) *Attorney, Agent, or Firm*—Finnegan, Henderson, Farabow, Garrett & Dunner, L.L.P.

(57) ABSTRACT

A face portion detection device, a behavior content classification device, a speech content classification device, a car navigation system, a face direction classification device, a face portion detection device control program, a behavior content classification device control program, a face portion detection device control method, and a behavior content classification device control method are provided for appropriately classifying a behavior content of the object person from a captured image including the face of the object person. A speech section detection device 1 includes an image capturing unit 10, a data storage unit 11, an image processing unit 12, a lip region detection unit 13, feature extraction unit 14, and a speech section detection unit 15. The lip region detection unit 13 uses a dedicated SVM to detect a lip region from a captured image, and the speech section detection unit 15 uses features of an image of a detected lip region and a dedicated HMM to detect a speech section.

23 Claims, 29 Drawing Sheets

FOREIGN PATENT DOCUMENTS

| | | |
|---|---|---|
| JP | 8-145627 | 6/1996 |
| JP | 8-175218 | 7/1996 |
| JP | 9-325793 | 12/1997 |
| JP | 10-275212 | 10/1998 |
| JP | 11-219421 | 8/1999 |
| JP | 11-232456 | 8/1999 |
| JP | 11-352987 | 12/1999 |
| JP | 2000-40148 | 2/2000 |
| JP | 2001-356793 | 12/2001 |
| JP | 2002-157596 | 5/2002 |
| JP | 2002-288670 | 10/2002 |
| JP | 2003-158643 | 5/2003 |

* cited by examiner

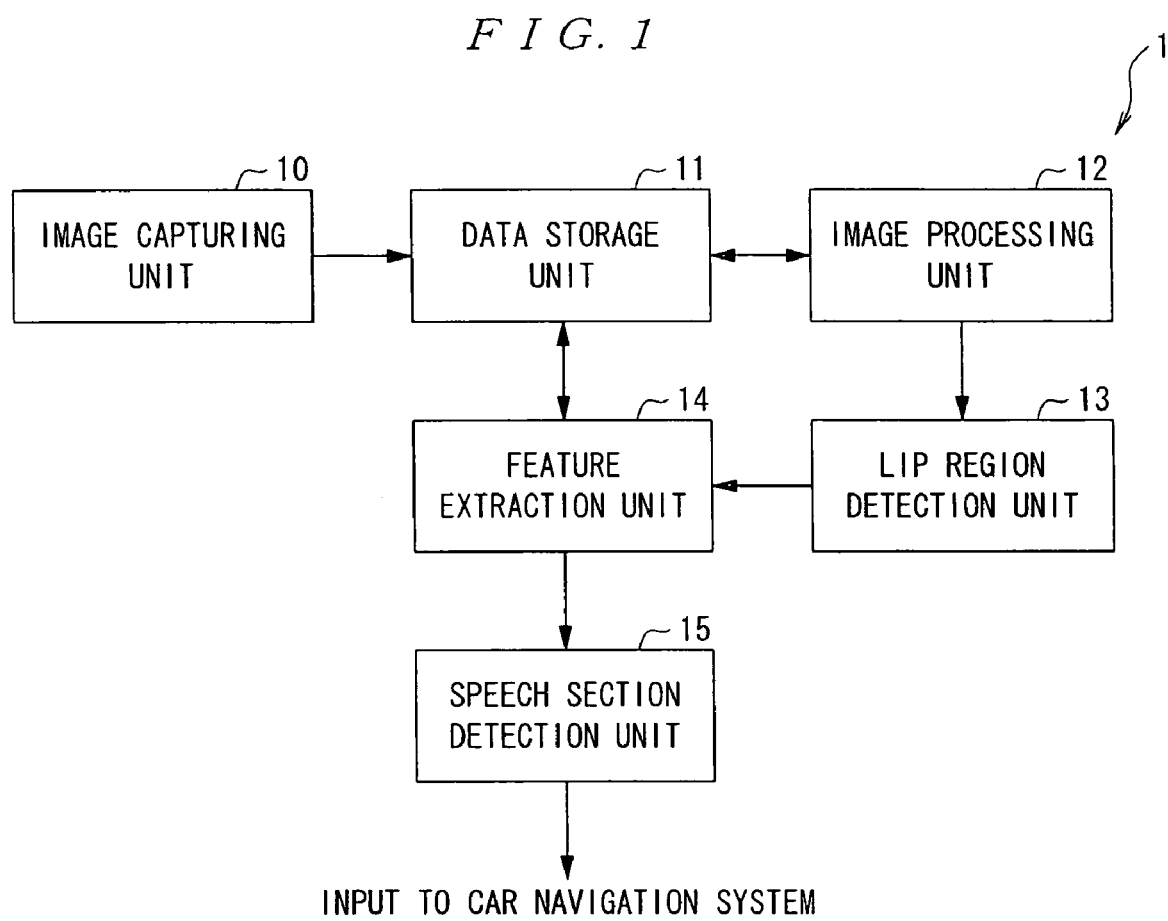

*F I G. 3 A*
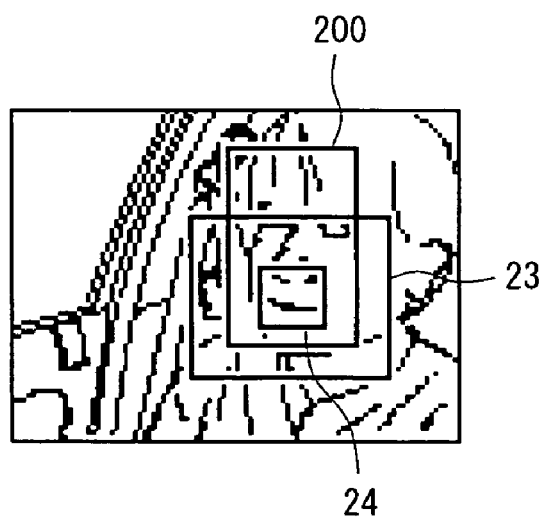
*F I G. 3 B*
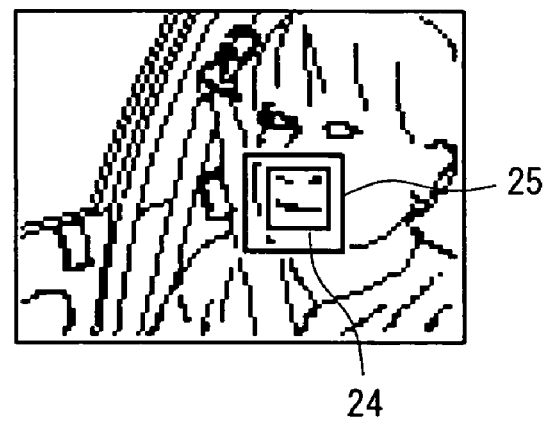
*F I G. 3 C*

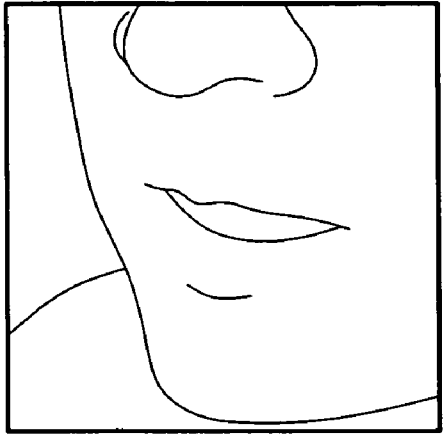
*F I G. 7A*
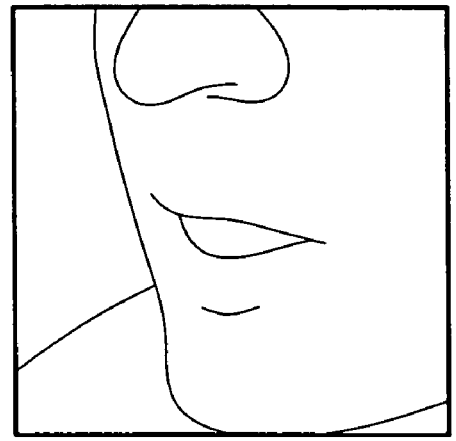
*F I G. 7B*
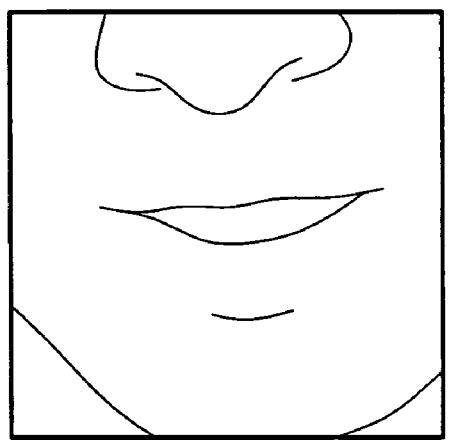
*F I G. 7C*
*F I G. 7D*

DEVICE, PROGRAM, AND METHOD FOR CLASSIFYING BEHAVIOR CONTENT OF AN OBJECT PERSON

TECHNICAL FIELD

The present invention relates to a device for classifying the behavior content of an object person, and more specifically to a behavior content classification device preferable in classifying the behavior content of the object person from a captured image including the face of the object person, a speech content classification device, car navigation system, an alarm system, a behavior content classification program, and a behavior content classification method.

BACKGROUND ART

An application of recognizing the condition and action of an object person from the expression of the face portion of the object person and applying them has been known. For example, as a function of a car navigation system (hereinafter referred to as a CNS for short) mounted in a vehicle, there is a voice operation function of performing an operation of the CNS such as issuing an instruction, etc. of a destination by voice by inputting voice to a microphone, etc. provided in a vehicle. The contents of the voice input through the microphone are recognized by speech recognition. When a driver inputs by voice the destination (for example, a destination such as the name of a place, the name of a facility, etc.) a word indicating the destination is recognized by speech recognition to retrieve a route to the place indicated by the recognized word or display information, etc. However, when a voice operation function is used, there is the problem that unnecessary sound such as the conversation of a passenger other than the driver, the music from a car stereo, road noise, the sound of wind, the sound of the engine, etc. is input to the microphone, thereby considerably reducing the accuracy of speech recognition. The technology of solving the problem is the speech recognition device of JP11-352987A (hereinafter referred to as Patent Document 1) and the image recognition device of JP11-219421A (hereinafter referred to as Patent Document 2).

The speech recognition device of the Patent Document 1 captures an image of a speaker using a camera, processes a captured image by an image processing ECU, and classifies the presence/absence of speech from the state of the appearance of the speaker. For example, the presence/absence of speech is classified from the external condition such as the face direction, the movement of lips, the gaze direction, etc. In processing a captured image for detecting the face direction, the movement of lips, the gaze direction, a pattern matching method is used. That is, when it is classified that a speaker is giving a speech, speech recognition is performed, thereby improving the recognition accuracy. The template matching method in the pattern matching method realizes face detection and detection of other portions by preparing a representative image pattern or an average image pattern of a face to be detected or another portion as a template, and searching an image area closest to the template image from the entire image.

Additionally, the image recognition device of the Patent Document 2 includes: an image acquisition unit for acquiring a distance image stream for a target object; an oral cavity portion extraction unit for extracting an oral cavity portion from the distance image stream acquired by the image acquisition unit; and an image recognition unit for recognizing at least one of the shape of lips and the movement of the lips based on the distance image stream of the oral cavity portion extracted by the oral cavity portion extraction unit. In extracting the oral cavity portion, the template matching method, etc. is used as in the voice recognition device according to the Patent Document 1. Furthermore, in the image recognition unit, a template of the shape image of the oral cavity portion corresponding to the pronunciation such as "a", "i", etc. is prepared, and the contents of the speech is recognized by performing a matching operation between the template and an image of the extracted oral cavity portion.

Furthermore, there are a driving state detection device of JP8-175218A (hereinafter referred to as Patent Document 3), a sleeping state detection device of JP10-275212A (hereinafter referred to as Patent Document 4), and an anti-drowsy-driving device of JP2000-40148A (hereinafter referred to as Patent Document 5) as the technology of capturing an image of the face of an object person, processing the captured image, and detecting whether or not a driver is awake.

The driving state detection device of the Patent Document 3 performs a relative correlation operation using an object template on a captured image, detects the eye area of the driver, and classifies the driving state of the driver from the image of the detected eye area.

The sleeping state detection device of the Patent Document 4 detects the density of the pixels along the row pixels of a face image, determines each pixel for a locally high value of the density in the pixel string, defines it as an extraction point, couples the extraction points in adjacent pixel strings close to each other in the pixel string direction, detects the position of the eyes from the curve group extending in the horizontal direction of the face, then detects the position of the eyes in a predetermined area including the eyes, classifies the arousal state of the eyes in the predetermined area including the eyes, and detects the drowsy state from the change in the open/closed state change.

The anti-drowsy-driving device of the Patent Document 5 sequentially acquires the pictures including the eyes of a driver on a vehicle as moving pictures by a video camera, calculates the area of the region in which the brightness has changed between the latest pictures and the previous pictures stored in frame memory, and performs a correlation operation for obtaining coefficients of correlation between a time-serial pattern of the difference in area between an area in which the brightness increases and an area in which the brightness decreases and a standard blink waveform. When the relative coefficient exceeds a reference value, the blink time point is extracted, and the arousal state of the driver is classified based on the blink extraction.

However, in the conventional technology according to the above-mentioned Patent Documents 1 and 2, a template matching method is used in detecting the lip portion from the image captured by a fixed camera. Therefore, for example, when the lip portion is detected from the image of a face as a side view or a diagonally side view due to a change in direction of the face during driving, there is the possibility that the detection accuracy is extremely lowered due to the contents of a prepared template. Furthermore, since the lip portion is searched in the image of the entire face, there are a large number of search points, thereby lowering the process speed.

Additionally, in the image recognition device of the Patent Document 2, the size, etc. of the oral region when the mouse is open is classified using a threshold, and the speech section is detected. Therefore, for example, it is difficult to classify the behavior content from an obscure image, such as a distinction between a yawn and speech.

Furthermore, in the conventional technologies of the Patent Documents 3 to 5, the frequency of blinks in a predetermined time period, the accumulation value of open and close times of the blinks in a predetermined time period, etc. are used in classifying the arousal state. With the configuration, the arousal state cannot be classified with the information about the aperture, duration time, speed, etc. of each blink taken into account, which are considered to be effective in classifying the arousal state from the viewpoint of the physiology.

Thus, the present invention has been developed to solve the above-mentioned problem not yet solved by the conventional technology, and the object of the present invention is to provide a behavior content classification device, a speech content classification device, a car navigation system, an alarm system, a behavior content classification program, and a behavior content classification method that are preferable in classifying the behavior contents of an object person from a captured image including the face of the object person.

DISCLOSURE OF THE INVENTION

To attain the above-mentioned object of the present invention, the behavior content classification device according to an embodiment of the present invention classifies a behavior content of an object person based on a captured image including a predetermined portion constituting the face of the object person, and includes: image capturing means for capturing an image including the predetermined portion; feature extraction means for extracting features in an image of the predetermined portion based on a captured image of the image capturing means; an HMM (hidden Markov model) having as input features extracted from an image of the predetermined portion and having as output a likelihood for a predetermined behavior content relating to the movement of the predetermined portion; and behavior content classification means for calculating the likelihood for the features using the features extracted by the feature extraction means and the HMM, and classifying behavior content relating to a movement of the predetermined portion of the object person based on the calculation result.

With the configuration, the image capturing means can capture an image including a predetermined portion constituting the face of an object person, the feature extraction means can extract features in an image of the predetermined portion based on the captured image of the image capturing means, the behavior content classification means can calculate a likelihood for the features using an HMM having as input features extracted by the feature extraction means and features extracted from an image of a predetermined portion, and having as output a likelihood for the predetermined behavior content relating to the movement of the predetermined portion, and can classify the behavior content relating to the movement of the predetermined portion of the object person based on the calculation result.

Therefore, using a well known HMM, the behavior content relating to the movement of a predetermined portion having a time concept can be classified. Therefore, the behavior content can be classified with higher accuracy.

The HMM is a probability model of a time-series signal, and a non-constant time-series signal is modeled by transiting among a plurality of constant signal sources. For example, the voice changes in time length depending on the speaking speed and indicates a characteristic shape (referred to as envelope of spectrum) in frequency depending on the speech content, but the shape depends on the speaker, the environment, the contents, etc. and fluctuation occurs. The HMM is a statistical model that can absorb the fluctuation. The HMM can be defined in any unit (for example, word and phoneme if speech recognition is performed), and each HMM (in this example, "each" is used by considering that there are normally a plurality of words and a plurality of phonemes) is constituted in plural states as shown in FIG. 31, and each state is constituted by a statistically learned state transition probability (a) and an output probability (b: probability distribution such as a normal distribution, a mixture of normal distribution, etc.). For example, the transition probability absorbs the fluctuation of the time expansion and contraction of voice, and the output probability absorbs the fluctuation of a spectrum.

Features can be a spectrum component obtained by performing a Fourier transform on an image of a predetermined portion, a logarithmic component to a frequency spectrum obtained by performing a Fourier transform on an image of a predetermined portion, an inter-frame difference component between the current frame for the frequency spectrum obtained by performing a Fourier transform on an image of a predetermined portion and its previous and subsequent frames, a MEL cepstrum (MFCC) component for an image of a predetermined portion, an intra-frame moment component for an image of a predetermined portion, an inter-frame moment component for an image of a predetermined portion, an intra-frame moment component for a frequency spectrum obtained by performing a Fourier transform on an image of a predetermined portion, an inter-frame moment component for a frequency spectrum obtained by performing a Fourier transform on an image of a predetermined portion, etc.

An image of a predetermined portion includes an image of a predetermined portion clipped from a captured image, as well as an image of an area including the image of the predetermined portion and an image of its surrounding portion.

The predetermined portion constituting the face can be an eye, a nose, a mouth, an eyebrow, etc.

To attain the above-mentioned object, the behavior content classification device according to an embodiment of the present invention classifies the behavior content of an object person based on a captured image including a predetermined portion constituting the face of the object person, and includes: image capturing means for capturing an image including the predetermined portion; face portion detection means for detecting a predetermined portion constituting the face of the object person from the captured image using an SVM (support vector machine) based on the captured image of the image capturing means; feature extraction means for extracting features in an image of the predetermined portion based on a detection result of the face portion detection means; an HMM (hidden Markov model) having as input features extracted from the predetermined portion and having as output a likelihood for a behavior content relating to a movement of the predetermined portion; and behavior content classification means for calculating the likelihood for the features using features extracted by the feature extraction means and the HMM (hidden Markov model), and classifying a behavior content relating to the movement of the predetermined portion of the object person based on the calculation result.

With the above-mentioned configuration, the image capturing means can capture an image including the face of the object person, the face portion detection means can detect a predetermined portion constituting the face of the object person from the captured image using the SVM (support vector machine) based on the captured image of the image capturing means, the feature extraction means can extract the features in the image of the predetermined portion based on the detection result of the face portion detection means, the behavior content classification means can calculate a likelihood for features using the HMM having as input the features extracted by the feature extraction means and the features extracted from an image of a predetermined portion and having as output the likelihood for a predetermined behavior content relating to the movement of the predetermined portion, and classify the behavior content relating to the movement of the predetermined portion of the object person based on the calculation result.

Therefore, since the predetermined portion is detected using the SVM, a predetermined portion can be detected from various acquired images with high accuracy. Additionally, since the behavior content relating to the movement of a predetermined portion with a time concept can be classified by using the well known HMM in classifying the behavior content, the behavior content can be classified with higher accuracy.

The SVM is a learning model for constituting an classifier for classifying two classes excellent in pattern recognizing function. The SVM has a high classifying capability for unlearned data by setting a discriminant plane by the reference of maximization of margin. Practically, the minimum distance between the discriminant plane and the training sample is used as an evaluation function, and the discriminant plane is set such that the function can indicate a maximum value. Furthermore, the SVM can have a nonlinear discriminant function in the method called kernel trick. The kernel trick is a method for expanding to a nonlinear classifier, maps a characteristic space vector into a high dimensional space using nonlinear mapping, and realizes nonlinear classification in an original space by linear classification in the space. The nonlinear mapping is referred to as a kernel function, and the classification method using the function is called a kernel trick. For the SVM, refer to "Introduction to Support Vector Machine by Takio Kurita" described on the Web page of URL http://www.neurosci.aist.go.jp/~kurita/lecture/svm/svm-.html.

That is, using the SVM, the face indicating different contents (shape, brightness distribution, etc.) depending on the face direction and the image of a portion constituting the face are learned using a number of patterns in advance, the images of the faces and their portions are separated with high accuracy using a curved surface as a boundary plane from the images other than them. By detecting the images of a face and its portions using the boundary plane as a reference, detection with high accuracy can be performed even if the images of the face and its portions depend on the face direction.

The face portion detection means changes for each direction the size of the image area detected as the predetermined portion for each of a plurality of face directions of the object person in the captured image.

With the configuration, the face portion detection means can change for each direction the size of the image area detected as the predetermined portion for each of the face directions.

That is, for example, when a behavior content classification process is performed using an image including the entire face of an object person captured by a fixed camera attached to the inner mirror in a vehicle, a predetermined portion is acquired in a state in which it is deformed in various shapes and sizes depending on the direction of the face. Therefore, although the size of an image area of a predetermined portion to be detected is changed depending on the face direction, it is possible to sufficiently extract necessary features. Therefore, by changing the size of the image area of a predetermined portion to be detected depending on the face direction, it is not necessary to perform a process of extracting features on an image of unnecessary portion, thereby increasing the speed of the extracting process.

The image capturing means captures an image portion including the entire face of the object person, and includes: positional relation information acquisition means for acquiring positional relation information between the image portion including the entire face and an image of the predetermined portion; and face direction classification means for classifying the face direction of the object person according to the positional relation information. The HMM includes HMM corresponding to each of the plurality of directions generated for each of the face directions. The behavior content classification means selects an HMM corresponding to the face direction of the classification result from among the plurality of HMMs based on the classification result of the face direction classification means, calculates a likelihood of the selected HMM for the features using the features extracted by the feature extraction means and the selected HMM, and classifies the behavior content relating to the movement of the predetermined portion of the object person based on the calculation result.

With the configuration, the positional relation information acquisition means can acquire positional relation information between the image portion including the entire face and the image of the predetermined portion, the face direction classification means can classify the face direction of the object person according to the positional relation information, and the behavior content classification means can select an HMM corresponding to the face direction of the classification result from among the plurality of HMMs based on the classification result of the face direction classification means, calculate a likelihood of the selected HMM for the features using the features extracted by the feature extraction means and the selected HMM, and classify the behavior content relating to the movement of the predetermined portion of the object person based on the calculation result.

Therefore, the face direction of an object person is classified, an HMM corresponding to the face direction as the classification result is selected from the HMM corresponding to a plurality of face directions, and the behavior content is classified using the selected HMM. Therefore, for example, when a process of classifying the behavior content is performed using an image including the entire face of an object person captured by a fixed camera provided for an inner mirror of a vehicle, the behavior content relating to the movement of a predetermined portion can be classified with higher accuracy from the features depending on the various face directions in an image of the predetermined portion whose shape depends on various face directions.

The behavior content classification means inputs to the HMM a set of the features of each frame corresponding to a predetermined number of frames of successive captured images and for a set of the features for which input to the HMM is started one set before, the input of a subsequent set of the features is started with predetermined frames shifted for the input of the first frame of the immediately previous set such that the frame of the immediately previous set can partly overlap with the frame of the next set.

With the configuration, for example, when the behavior content is classified from the output of the HMM using the features of a predetermined portion image of 5 frames as input, and when one frame is $1/30$ second, the time resolution of the classification of the behavior content is $1/10$ sec when every five frames are sequentially input to the HMM. Then, by inputting to the HMM the features of a set of 5 frames with one frame shifted and a part of the frame overlapping as described above, it is possible to classify the behavior content for each frame ($1/30$ sec.) That is, the time resolution can be improved.

The image of the predetermined portion includes an image of the lip portion of the object person. The feature extraction means extracts features in the image of the lip portion based on the image of the lip portion. The HMM includes a lip state classifying HMM having as input features extracted from the image of the lip portion, and having as output a likelihood for a predetermined behavior content relating to the movement of the lip portion. The behavior content classification means calculates the likelihood for the features using the features of the lip portion and the lip state classifying HMM, and classifies the behavior content relating to the movement of the lips of the object person based on the calculation result.

With the configuration, the behavior content such as the speech, yawn, chewing of gum, etc. of an object person can be classified.

The image of a lip portion refers to an image of the lip portion itself clipped from a captured image, and also includes an area image, etc. of the image of the lip portion and its surrounding portion, etc.

The HMM outputs the likelihood for at least one of the speech state and non-speech state of the object person. The behavior content classification means classifies using the lip state classifying HMM whether or not the object person is in the speech state for each frame of the captured image. The device includes a speech start point classifying means for classifying the speech start point indicating the output of the lip state classifying HMM corresponding to the point when the object person starts the speech based on the classification result. The behavior content classification means classifies the speech section from the start of the speech of the object person to the end of speech based on the classification result of the speech start point classification means.

With the above-mentioned configuration, the speech start point classification means can classify the speech start point indicating the output of the HMM corresponding to the point where the object person starts giving speech based on the classification result. The behavior content classification means can classify the speech section from the start of speech of the object person to the end of the speech based on the classification result of the speech start point classification means.

Accordingly, since the speech start point of an object person is separately classified based on the classification result as to whether or not it is a speech state by the HMM, it is possible to classify a speech section with high accuracy, and it is possible to improve the recognition accuracy of the speech content of an object person in a noisy place by performing speech recognition on the speech data of an object person in a classified speech section. For example, by applying the system to the speech recognition in a vehicle using the above-mentioned CNS, etc., the recognition accuracy of the speech content can be improved.

The speech start point classification means sets the first frame as a candidate for a speech start point when the classification result indicates the speech state successively from the first frame to the n-th (n is an integer and n≧2) frame, and classifies the first frame as a speech start point when the classification result indicates the state of speech successively from the n-th frame to the m-th (m is an integer and m≧3) frame.

With the configuration, when the classification result indicates a practically impossible state (abnormal condition) such as the repetition of speech and non-speech, the speech start point can be classified more correctly.

The speech start point classification means removes the first frame from the candidate for the speech start point when the classification result indicates a non-speech state within k (k is an integer, and k≦m) frames from the n-th frame, and indicates a non-speech state successively p (p is an integer and p≧10) frames from the (n+k)th frame, and classifies the first frame as a speech start point when the classification result indicates the start of speech again within r (r is an integer and r<p) frames from the (n+k)th frame.

With the configuration, when the classification result becomes practically impossible (abnormal condition) such as the repetition of speech and non-speech, the speech start point can be classified more correctly.

The HMM outputs the likelihood for at least one of the speech state and the non-speech state of the object person. The behavior content classification means classifies whether or not the object person is in the speech state using the HMM for each frame of the captured image, includes speech end point classification means for classifying a speech end point indicating output of the HMM corresponding to the point where the object person terminates the speech based on the classification result, and classifies a speech section from the start of speech to the end of speech of the object person based on the classification result of the speech end point classification means.

With the above-mentioned configuration, the speech end point classification means can classify the end point of speech indicating output of the HMM corresponding to the point where the object person terminates the speech based on the classification result, and the behavior content classification means can classify the speech section from the start of speech to the end of speech of the object person based on the classification result of the speech end point classification means.

Therefore, since the speech end point of the object person is separately classified based on the classification result by the HMM, the speech section can be classified with high accuracy and by performing the speech recognition on the speech data of the object person in the classified speech section, the recognition accuracy of the speech content of the object person can be improved in a noisy place.

When the classification result indicates the non-speech state successively for w (w is an integer and w≧20) frames, the speech end point classification means classifies the first frame in the w frames as a speech end point.

With the configuration, when the classification result is practically impossible (abnormal condition) such as, for example, the repetition of speech and non-speech, the speech end point can be classified more correctly.

When the state indicating non-speech continues for x (x is an integer and 6≦x<w) frames, the speech end point classification means continues the count up to the w-th frame although the classification result is the state indicating one of a single speech and a speech state for successive two frames in the count of the state indicating non-speech in and after x+1 frames. On the other hand, when the speech state continues for three frames, the count is cleared.

With the configuration, although the classification result is practically impossible (abnormal condition) such as the repetition of speech and non-speech, etc., the speech end point can be classified more correctly.

The image of the predetermined portion includes an image of the eye portion of the object person. The feature extraction means extracts features in the image of the eye portion based on the detection result of the eye portion. The HMM includes an eye state classifying HMM having as input features extracted from the image of the eye portion, and having as output the likelihood for the behavior content relating to the movement of the eye portion. The behavior content classification means calculates the likelihood for the features using the features of the eye portion extracted by the feature extraction means and the eye state classifying HMM, and classifies the behavior content relating to the movement of the eye portion of the object person based on the calculation result.

With the configuration, it is possible to classify the behavior content such as drowsy state, etc.

The eye state classifying HMM outputs the likelihood for the type of blink of the object person in response to the input of the features extracted from plural frames of detected image in the eye portion. The behavior content classification means calculates the likelihood for the features using the features of the detected image of the plural frames of eye portion extracted by the feature extraction means and the eye state classifying HMM, and classifies the type of the blink of the object person based on the calculation result.

With the configuration, the type of the blink of an object person such as the speed of the blink, the closing level of the eyelid when a blink is made, etc. can be classified with high accuracy.

The eye state classifying HMM outputs the likelihood for the speed and the type of aperture of the blink of the object person in response to the input of the features extracted from the detected image of plural frames of the eye portion. The behavior content classification means calculates the likelihood for the features using the features of the detected image of the plural frames of eye portion extracted by the feature extraction means and the eye state classifying HMM, and classifies the speed and the type of aperture of the blink of the object person based on the calculation result.

With the configuration, the state of the eyes when a blink is made can be represented as, for example, an electro-oculogram waveform, and the speed (change time of electro-oculogram potential) from the start to the end of the blink, and the type of aperture indicating the closing level of the eyelid when a blink is made can be classified with high accuracy.

The eye state classifying HMM outputs a likelihood for the type of a blink of the object person in response to the input of the features for the detected image of plural frames of the eye portion. The behavior content classification means calculates the likelihood for the features using the features of the detected image of the plural frames of eye portion extracted by the feature extraction means and the eye state classifying HMM, and classifies the arousal state of the object person based on the calculation result.

With the configuration, for example, from the type of the blink of the object person that can be classified from the speed of a blink, the closing level of the eyelid when a blink is made, the arousal state of the object person such as a vacant state, a drowsy state, etc. can be classified with high accuracy.

The eye state classifying HMM outputs a likelihood for a blink of a specific type in response to the input of features for the detected image in a plurality of frames of the eye portion. The behavior content classification means calculates the likelihood for the type of a blink having the specific characteristic for the features using the features of the detected image of the plural frames of eye portion extracted by the feature extraction means and the eye state classifying HMM, and classifies the arousal state of the object person based on the calculation result.

For example, although there are various waveform patterns, which is considered to be significant in classifying the arousal state from the viewpoint of the physiology, in the electro-oculogram potential waveform indicating a change in electro-oculogram potential of the muscle of the eyes when a blink is made, it is considered that the arousal state can be satisfactorily classified by using specific types (for example, three types) in the various types of waveform patterns by noticing the characteristics of important elements for a blink such as the speed, aperture, etc. of a blink. Therefore, with the above-mentioned configuration, it is necessary only to generate HMMs for specific types of blinks, and it is necessary only to perform a classifying process using specific types of HMMs. Therefore, the memory capacity required for the HMMs can be reduced and the classifying process can be performed at a high speed.

The behavior content classification means classifies the arousal state of the object person based on the change in the number of occurrences of each of the specific types of blinks in a predetermined time.

With the configuration, the arousal state can be classified with high accuracy based on the change in the number of occurrences of the specific types of blinks in a predetermined time such as the number of occurrences of specific types of blinks, the frequency of a specific type of blink, etc., which is considered to be effective in classifying the arousal state from the viewpoint of physiology.

On the other hand, to attain the above-mentioned objects, the speech content classification device according an embodiment includes: image capturing means for capturing an image including a predetermined portion constituting the face of an object person; face portion detection means for detecting an image of the lip portion of the object person from the captured image; feature extraction means for extracting features in the image of the lip portion based on the image of the lip portion detected by the face portion detection means; a speech content classification HMM (hidden Markov model) having as input features extracted from the image of the lip portion and having as output a likelihood for the speech content relating to the movement of the lip portion; and speech content classification means for calculating the likelihood for the features using the features extracted by the feature extraction means and the speech content classification HMM, and classifying the speech content of the object person based on the calculation result.

With the configuration, the feature extraction means can extract the features in the image based on the image of the lip portion, the speech content classification means can calculate the likelihood for the features using the features extracted by the feature extraction means and the lip state classifying HMM, and classify the speech content of the object person based on the calculation result.

Therefore, since the state of a speech behavior with a time concept can be classified using an HMM, the speech content can be classified with high accuracy from the movement of the lips without voice information.

An image of a lip portion refers to an image of the lip portion itself clipped from a captured image and also includes an area image including the lip portion and its surrounding portion.

To attain the above-mentioned objects, the car navigation system according to an embodiment includes: the behavior content classification device according to the embodiments disclosed herein; speech recognition means for performing a speech recognition process based on a classification result of a behavior content relating to the movement of lips by the behavior content classification device; and operation processing means for performing predetermined operation processing based on a recognition result of the speech recognition means.

With the configuration, the speech recognition means can perform a speech recognition process based on a classification result of the behavior content relating to the movement of the lips by the behavior content classification device, and the operation processing means can perform a predetermined operating process based on the speech recognition result of the speech recognition means.

Therefore, for example, when the present system is mounted in a vehicle, and an object person is a driver of the vehicle, it is possible to more correctly recognize the speech content of the object person in an environment of noise such as the conversation of a passenger other than the driver, the music from a car stereo, road noise, the sound of wind, the sound of the engine, etc., and perform a predetermined operation such as searching a route, guiding along a route, etc. to a destination based on the recognition.

The car navigation system is a well known device for guiding an occupant such as a driver, etc. of the current position and a traveling route to a destination when a vehicle is driven on the display screen using an inertia navigation device and a GPS (satellite global positioning system).

To attain the above-mentioned objective, the alarm system according to an embodiment includes the behavior content classification device according to the embodiments disclosed herein and notification means for displaying or raising an alarm of a classification result about the arousal state.

With the configuration, the notification means can notify an object person or a staff involved of a classification result about the arousal state of the object person classified by the behavior content classification device according to the embodiments disclosed herein.

Therefore, for example, when the present system is mounted in a vehicle, and an object person is a driver of the vehicle, the drowsy state of the driver is classified and an alarm is raised to the driver, thereby preventing drowsy driving, etc.

On the other hand, to attain the above-mentioned object, the behavior content classification program according to an embodiment classifies a behavior content of an object person based on a captured image including a predetermined portion constituting a face of the object person, and directs a computer to perform the processes realized as: image capturing means for capturing an image including the predetermined portion; face portion detection means for detecting a predetermined portion constituting the face of the object person from the captured image using an SVM (support vector machine) based on the captured image by the image capturing means; feature extraction means for extracting features in the image of the predetermined portion based on a detection result of the face portion detection means; and behavior content classification means for calculating a likelihood for features using an HMM (hidden Markov model) having as input features extracted by the feature extraction means and features extracted from the predetermined portion, and having as output the likelihood for a behavior content relating to a movement of the predetermined portion, and classifying the behavior content relating to the movement of the predetermined portion of the object person based on a calculation result.

Thus, an operation and effect equivalent to the behavior content classification device according to an embodiment are obtained.

The image capturing means captures an image including the entire face of the object person. The program further includes a program used to direct a computer to perform the process realized as: positional relation information acquisition means for acquiring positional relation information between an image portion including the entire face and an image of the predetermined portion; and face direction classification means for classifying the direction of the face of the object person according to the positional relation information. The behavior content classification means selects an HMM corresponding to the direction of the face of the classification result from the HMMs respectively corresponding to plural directions generated for the plural directions of the face based on the classification result of the face direction classification means, calculates the likelihood of the selected HMM for the features using features extracted in the feature extraction step and the selected HMM, and classifies the behavior content relating to the movement of the predetermined portion of the object person based on the calculation result.

Thus, the operation and the effect equivalent to the behavior content classification device according to an embodiment are obtained.

The image of the predetermined portion includes an image of a lip portion of the object person. The feature extraction means extracts features in the image of the lip portion based on the image of the lip portion. The behavior content classification means calculates a likelihood for the features using a lip state classifying HMM having as input the features of the lip portion and the features extracted from an image of the lip portion, and having as output the likelihood for a predetermined behavior content relating to the movement of the lip portion, and classifies the behavior content relating to the movement of the lips of the object person based on the calculation result.

Thus, the operation and the effect equivalent to the behavior content classification device according to an embodiment are obtained.

The image of the predetermined portion includes an image of the eye portion of the object person. The feature extraction means extracts features in the image of the eye portion based on the detection result of the eye portion. The behavior content classification means calculates a likelihood for the features using an eye state classifying HMM having as input features of the eye portion extracted by the feature extraction means and features extracted from the image of the eye portion, and having as output the likelihood for the behavior content relating to the movement of the eye portion, and classifies the behavior content relating to the movement of the eye portion of the object person based on the calculation result.

Thus, the operation and the effect equivalent to the behavior content classification device according to an embodiment are obtained.

To attain the above-mentioned object, a behavior content classification method according to an embodiment classifies the behavior content of an object person based on the captured image including a predetermined portion constituting the face of the object person, and includes: an image capturing step of capturing an image including the predetermined portion; a face portion detection step of detecting a predetermined portion constituting the face of the object person from the captured image using an SVM (support vector machine) based on the captured image by the image capturing means; feature extraction step of extracting features in the image of the predetermined portion based on a detection result of the face portion detection means; and a behavior content classification step of calculating a likelihood for features using an HMM (hidden Markov model) having as input features extracted in the feature extraction step and features extracted from the predetermined portion, and having as output the likelihood for a behavior content relating to a movement of the predetermined portion, and classifying the behavior content relating to the movement of the predetermined portion of the object person based on a calculation result.

Thus, the effect similar to that of the behavior content classification device according to an embodiment is obtained.

The invention according to an embodiment is based on the behavior content classification method disclosed herein, and the image capturing means captures an image including the entire face of the object person. The method further includes a positional relation information acquisition step of acquiring positional relation information between an image portion including the entire face and an image of the predetermined portion; and a face direction classification step of classifying the direction of the face of the object person according to the positional relation information. In the behavior content classification step, an HMM corresponding to the direction of the face of the classification result is selected from the HMMs respectively corresponding to plural directions generated for the plural directions of the face based on the classification result of the face direction classification step, the likelihood of the selected HMM for the features is calculated using features extracted in the feature extraction step and the selected HMM, and the behavior content relating to the movement of the predetermined portion of the object person is classified based on the calculation result.

Thus, the effect equivalent to the behavior content classification device according to an embodiment is obtained.

The image of the predetermined portion includes an image of a lip portion of the object person. In the feature extraction step, features in the image of the lip portion is extracted based on the image of the lip portion. In the behavior content classification step, a likelihood for the features is calculated using a lip state classifying HMM having as input the features of the lip portion and the features extracted from an image of the lip portion, and having as output the likelihood for a predetermined behavior content relating to the movement of the lip portion, and the behavior content relating to the movement of the lips of the object person is classified based on the calculation result.

Thus, the effect equivalent to the behavior content classification device according to an embodiment is obtained.

The image of the predetermined portion includes an image of the eye portion of the object person. In the feature extraction step, features in the image of the eye portion is extracted based on the detection result of the eye portion. The HMM includes in the behavior content classification step, a likelihood for the features are calculated using an eye state classifying HMM having as input features of the eye portion extracted in the feature extraction step and features extracted from the image of the eye portion, and having as output the likelihood for the behavior content relating to the movement of the eye portion, and the behavior content relating to the movement of the eye portion of the object person is classified based on the calculation result.

Thus, the effect equivalent to the behavior content classification device according to an embodiment is obtained.

BRIEF DESCRIPTION OF THE DRAWINGS

FIG. 1 is a block diagram of the configuration of the speech section detection device according to the present invention;

FIG. 3A shows an example of a captured image, FIG. 3B shows a search area and a search window in a detection mode for a detecting image, and FIG. 3C shows a search area and a search window in a tracking mode for a detecting image;

FIGS. 7A to 7D show an example of a result of classifying a speech/non-speech for various face directions;

BEST MODE FOR CARRYING OUT THE INVENTION

Figure 2A:
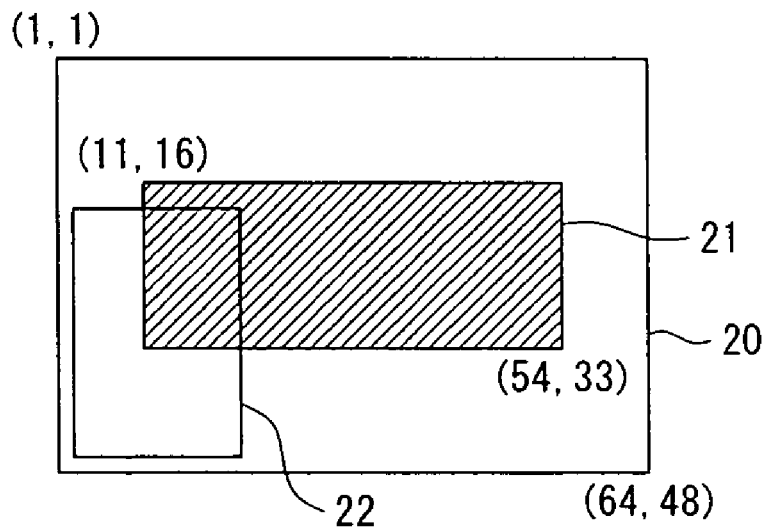
FIG. 2A shows the concept of the process of searching the area of the entire face for a detecting image.

First Mode for Embodying the Present Invention

The first mode for embodying the present invention is explained below by referring to the attached drawings. FIGS. 1, 2A to 2C, 3A to 3C, 4A and 4B, 5, 6, 7A to 7D, and 8 to 14 show the face portion detection device, the behavior content classification device, the face portion detection device control program, the behavior content classification device control program, the face portion detection device control method, and the behavior content classification device control method in the first mode for embodying the present invention.

In the mode for embodying the present invention, the face portion detection device, the behavior content classification device, the face portion detection device control program, the behavior content classification device control program, the face portion detection device control method, and the behavior content classification device control method according to the present invention are explained by applying them to a speech section detection device for detecting a speech section from a start of speech to an end of speech of a driver who drives a vehicle.

First, the configuration of the speech section detection device according to the present invention is explained by referring to FIG. 1. FIG. 1 is a block diagram of the configuration of the speech section detection device according to the present invention.

As shown in FIG. 1, a speech section detection device 1 includes an image capturing unit 10, a data storage unit 11, an image processing unit 12, a lip region detection unit 13, feature extraction unit 14, and a speech section detection unit 15. In the mode for embodying the present invention, the speech section detection device 1 is mounted in a cabin of a vehicle, and is connected to be driven in cooperation with a car navigation system (hereinafter referred to as a CNS) having the speech recognition function and mounted in the cabin of the vehicle not shown in the attached drawings. The output of the speech section detection device 1 is input to the CNS, and the CNS performs speech recognition according to the input information, and a predetermined operation based on the recognition result.

The image capturing unit 10 has the configuration including a CCD (charge coupled device) camera, and outputs an image captured in a frame unit as digital data. The output image data is transmitted to the data storage unit 11. According to the mode for embodying the present invention, the CCD camera is attached to the inner mirror in the cabin of the vehicle such that the image of the entire face of a person at the wheel (driver) can be captured. The attachment position of the CCD camera is not limited to the inner mirror, but can be another position of the steering column, the center panel, the front pillar, etc. so far as the image including the entire face of the object person can be captured.

The data storage unit 11 stores data necessary in detecting a speech section such as an SVM for detecting the entire face, an SVM for detecting a lip region, an HMM for detecting a speech section, an image captured by the image capturing unit 10, etc. In the mode for embodying the present invention, the speech data is also stored depending on the frame of a captured image. Therefore, according to the mode for embodying the present invention, a microphone for acquiring the speech data issued by the person at the wheel is also provided in a vehicle.

The image processing unit 12 reduces the color information by expressing a gray scale for each frame of a captured image, reduces an image size by sub-sampling, etc. as preprocessing of the process of detecting a lip region from the captured image performed by the lip region detection unit 13. Hereinafter, the captured image reduced in gray scale and image size is referred to as a detecting image.

The lip region detection unit 13 detects a lip region of an object person to be captured from the detecting image acquired from the image processing unit 12 using an SVM. In the mode for embodying the present invention, a lip region is detected in two stages using two types of SVM, that is, an entire face detecting SVM for detecting the area of the entire face of the object person to be captured from the detecting image and a lip region detecting SVM for detecting the lip region from the entire face image detected by the entire face detecting SVM. Once the lip region is detected, for the detecting image from the next frame, a search area for a lip region is set based on the positional relation information (coordinate information when the coordinates of the upper left pixel of the image are set to (1,1), for example) about the lip region detected in the previous frame, and the lip region detecting SVM is applied to the search area. That is, once a lip region is detected, the detecting process of an image area of the entire face by the entire face detecting SVM is omitted for the detecting image from the next frame until the lip region is not detected. At this time, by setting a search area narrower than the search area set when the lip region is first detected, the process of detecting a lip region is performed at a high-speed. Thus, the mode in which the process of detecting a lip region using the above-mentioned two types of SVMs is performed is referred to as a detection mode, and the mode in which the process of detecting a lip region by setting a search area of a lip region according to the positional relation information about the lip region detected in the previous frame, and applying the lip region detecting SVM to the search area is performed is referred to as a tracking mode. The information about the detection result is transmitted to the feature extraction unit 14.

When the feature extraction unit 14 acquires the information about the detection result from the lip region detection unit 13, it reads the corresponding original captured image from the data storage unit 11 according to the information, an image of the lip region is clipped from the read image, and the features to be input to the speech section detecting HMM described later is extracted from the clipped lip region image. In the mode for embodying the present invention, the number of dimensions is reduced by performing the principal component analysis or the independent component analysis on the extracted features. Additionally, in the mode for embodying the present invention, a Fourier transform is performed on the clipped lip region image, and the frequency spectrum component is extracted as features. Furthermore, the extracted features are transmitted to the speech section detection unit 15 using successive 5 frames as a set.

The speech section detection unit 15 inputs the features of the lip region image acquired from the feature extraction unit 14 to the speech section detecting HMM, and based on the output from the HMM in response to the input, the speech section from the start of speech of an object person to the end is detected. The information about the detected speech section is transmitted to the car navigation system not shown in the attached drawings.

In the mode for embodying the present invention, the speech section detection device 1 is provided with a processor not shown in the attached drawings, RAM (random access memory), and a storage medium storing a dedicated program, and controls each of the above-mentioned components by executing the dedicated program by the processor.

A storage medium can be a semiconductor storage medium such as RAM, ROM, etc., a magnetic storage medium such as an FD, HD, etc., an optical read system storage medium such as a CD, a CDV, and LD, a DVD, etc., a magnetic storage type/optical read system storage medium such as an MO, etc., and can be any storage medium so far as it is a computer-readable storage medium regardless of the read method such as an electronic, magnetic, or optical reading method.

Figure 2B:
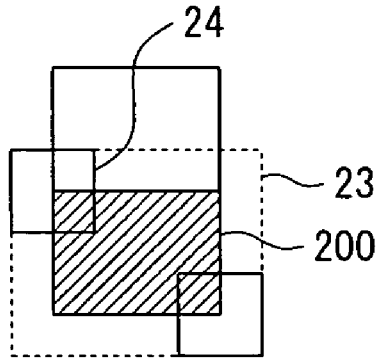
FIG. 2B shows the concept of the process of searching the lip region from the area of the entire face detected.
Figure 2C:
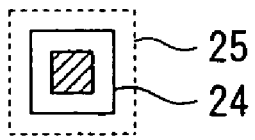
FIG. 2C shows the concept of the process of searching the lip region in a tracking mode.
Figure 4:
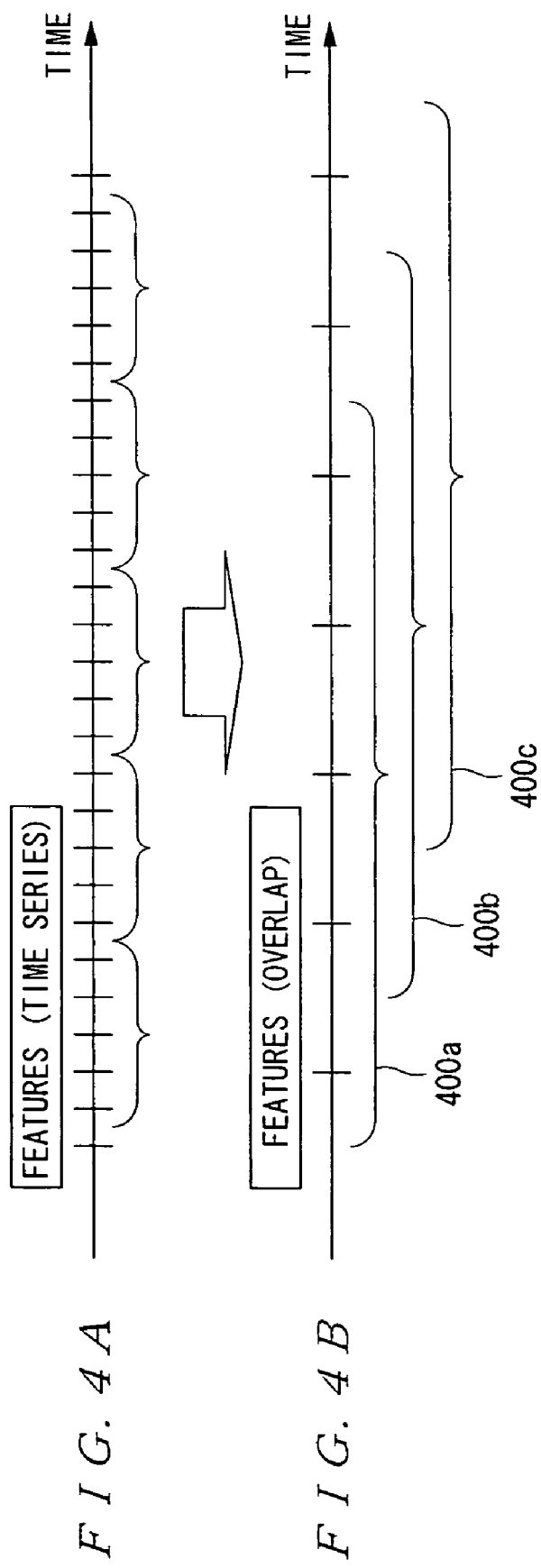
FIGS. 4A and 4B show a time concept in inputting features to an HMM.
Figure 5:
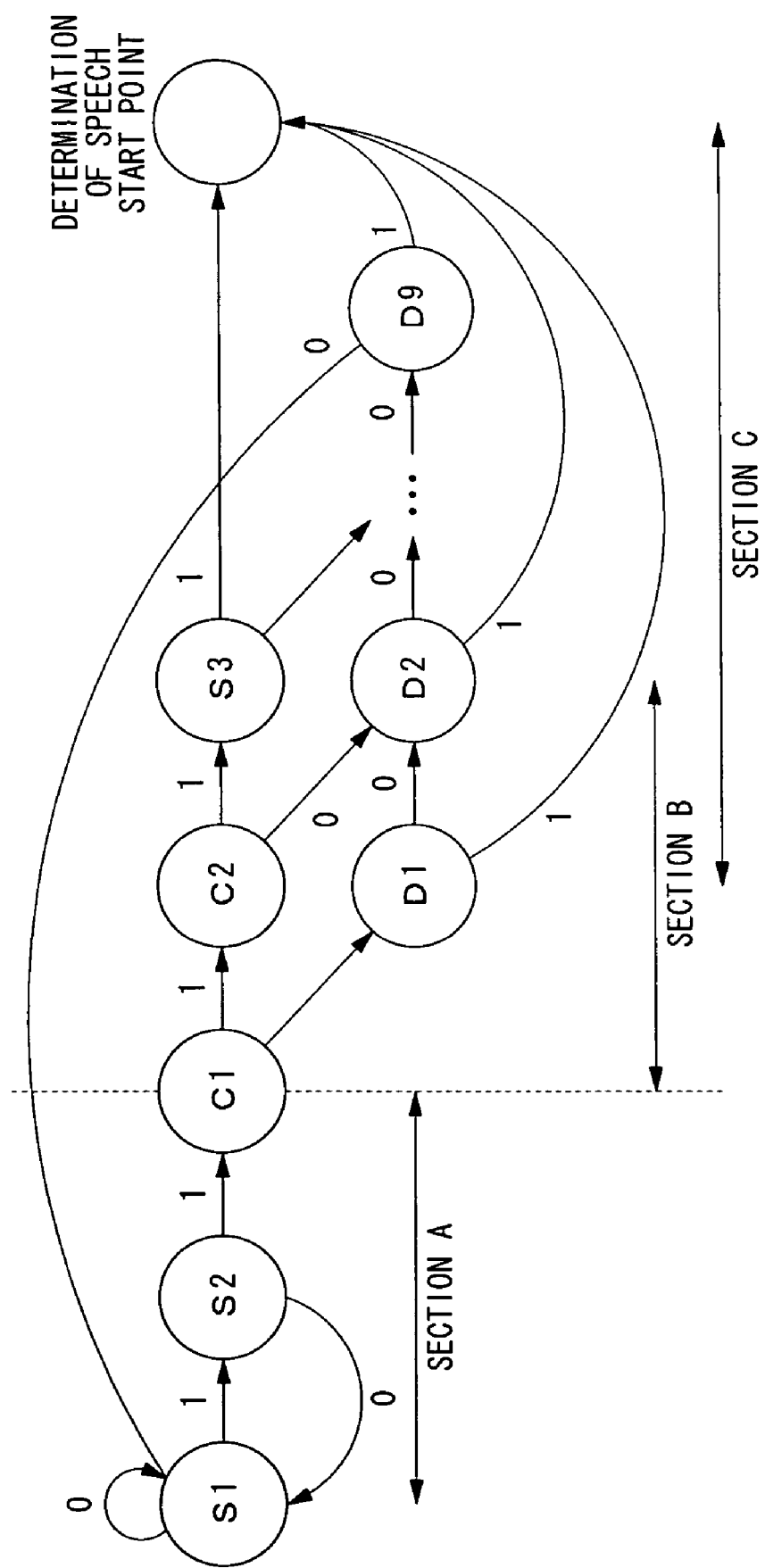
FIG. 5 shows a flow of the process of classifying a speech start point based on the output of an HMM.
Figure 6:
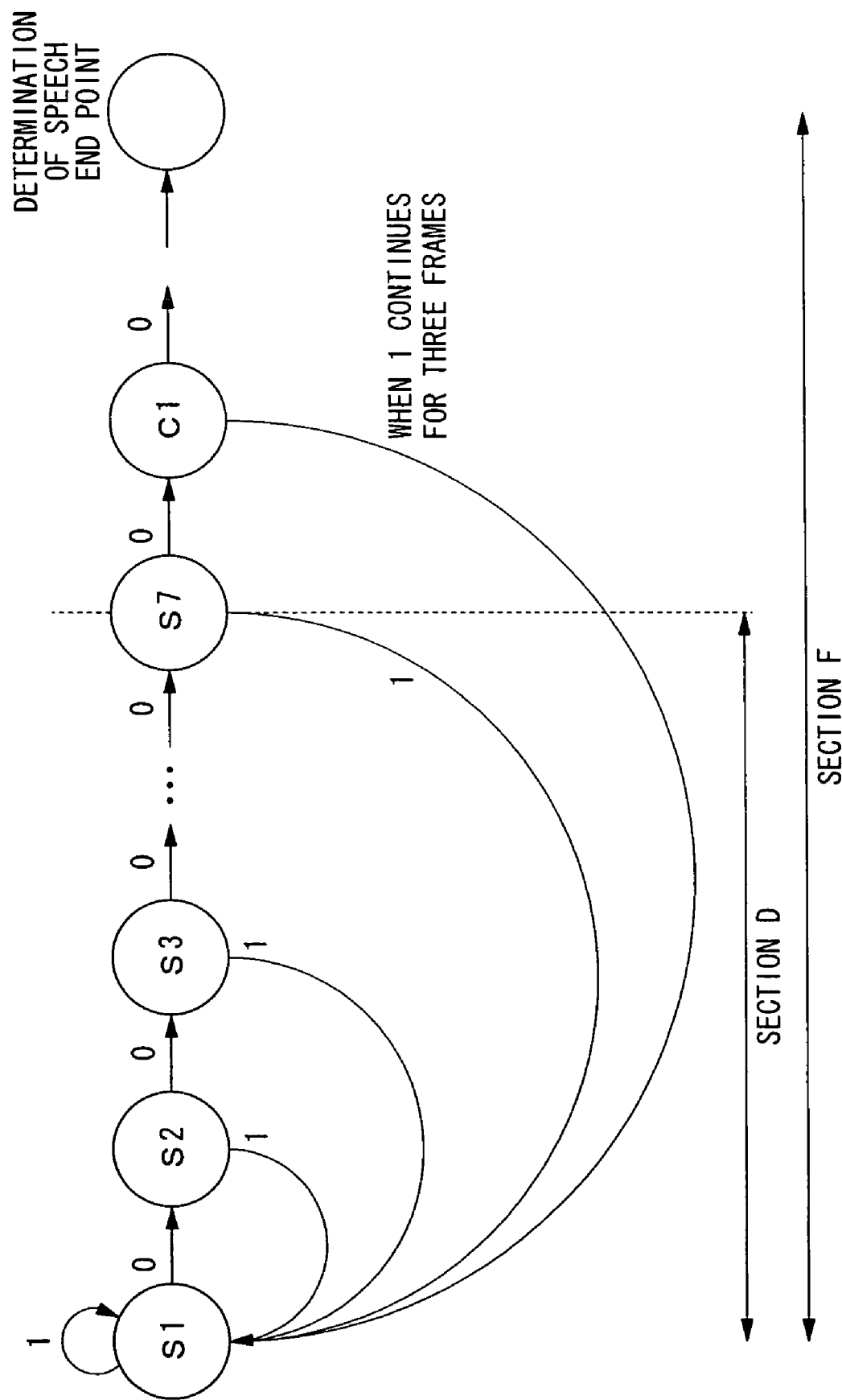
FIG. 6 shows a flow of the process of classifying a speech end point based on the output of an HMM.

Furthermore, by referring to FIGS. 2A to 2C, 3A to 3C, 4A and 4B, 5, 6, and 7A to 7D, a more practical operation of the speech section detection device 1 is explained below. FIG. 2A shows the concept of the process of searching the area of the entire face for a detecting image, FIG. 2B shows the concept of the process of searching the lip region from the area of the entire face detected, and FIG. 2C shows the concept of the process of searching the lip region in a tracking mode. FIG. 3A shows an example of a captured image, FIG. 3B shows a search area and a search window in a detection mode for a detecting image, and FIG. 3C shows a search area and a search window in a tracking mode for a detecting image. FIGS. 4A and 4B show a time concept in inputting features to an HMM. FIG. 5 shows a flow of the process of classifying a speech start point based on the output of an HMM. FIG. 6 shows a flow of the process of classifying a speech end point based on the output of an HMM. FIGS. 7A to 7D show an example of a result of classifying a speech/non-speech for various face directions.

When the speech section detecting process is started, the speech section detection device 1 first captures an image including the entire face of the object person at the wheel of the vehicle to be captured as shown in FIG. 3A using, a CCD camera attached to the inner mirror in the image capturing unit 10, and stores the captured image data in the data storage unit 11 in the order in which it is captured in a frame unit (1/30 second in this example). In the mode for embodying the present invention, it is assumed that the captured image is a color image. The data storage unit 11 notifies the image processing unit 12 of the storage of data when the captured image data is stored.

Upon receipt of a notification from the data storage unit 11, the image processing unit 12 reads the captured image data from the data storage unit, and performs the process of reducing the color information by expressing in gray scale images and the process of reducing the image size by sub-sampling on the read image data. For example, assuming that the captured image is a full-color image of the size of 640×480 pixels, the gray scaling of the image converts the full-color image into data having the color scales including the intermediate colors between white and black, further sub-sampled into 1/10 vertically and horizontally about the image, and the image is converted into an image of 64×48 pixel size. Thus, the number of pixels can be reduced to 1/100. Thus, the generated detecting image is transmitted to the lip region detection unit 13.

When the lip region detection unit 13 acquires the detecting image from the image processing unit 12, it enters the detection mode, and scans the image area of the entire face in a 20×30 pixel search window 22 on the entire 64×48 pixel detecting image 20 as shown in FIG. 2A. Furthermore, the gray scale value of 20×30=600 pixels scanned is input to the entire face detecting SVM as a value of 600 dimensions. In the entire face detecting SVM, a learning process is performed in advance in a state in which the entire face class and non-entire face class can be discriminated in the 600 dimensional space, and the similarity of the classes is determined by the distance (Euclid distance, etc.) between the classifying hyper plane and an input value, and the 20×30 pixel area image having the highest similarity is detected as an image area 200 of the entire face. When the image area 200 of the entire face is detected, then a 20×15 pixel search area 23 including the lower half image area of the image area 200 of the entire face is set as shown in FIG. 2B, and the lip region is scanned in a 10×10 pixel search window 24 on the set search area 23. That is, FIG. 3B shows the actual image. Then, the gray scale value of a total of scanned 10×10 pixels, that is, 100 pixels, is input to the lip region detecting SVM as a value of 100 dimensions. In the lip region detecting SVM, a learning process is performed in advance in a state in which the lip region class and non-lip region class can be discriminated in the 100 dimensional space, and the similarity of the classes is determined by the distance (Euclid distance, etc.) between the classifying hyper plane and an input value, and the 10×10 pixel area image having the highest similarity is detected as an lip region image. Furthermore, when a lip region image is detected, the positional relation information (coordinates information) is acquired, and the unit enters the tracking mode for the detecting image in the next frame.

When the lip region detection unit 13 enters the tracking mode, it sets a 15×15 pixel search area 25 by expanding the area five pixels each in the vertical and horizontal directions with the position coordinates of the lip region image detected in the previous frame in the centre as shown in FIG. 2C for the detecting image in the next frame, and scans the lip region in the 10×10 pixel search window 24 on the set search area 25. The actual image is shown in FIG. 3C. That is, the process of detecting the entire face image area is omitted, the range is limited to the 15×15 pixel search area 25 narrower than the 20×15 pixel search area 23, and the lip region is searched, thereby performing the process at a higher speed. The gray scale value of scanned 10×10 pixels, that is, a total of 100 pixels, is input to the lip region detecting SVM as in the detection mode, thereby performing the process of detecting a lip region. When the lip region is detected, the central coordinates of the lip region are transmitted to the feature extraction unit 14 in the present mode for embodying the present invention. In the tracking mode, the mode is maintained while the lip region is successfully detected. When the lip region is not successfully detected, the unit enters the face detection mode.

When the feature extraction unit 14 acquires the central coordinates of the lip region in the detecting image in each frame by the lip region detection unit 13, it clips a lip image of the 64×64 pixel gray scale with the acquired central coordinates in the center from the corresponding captured image stored by the data storage unit 11. Then, the process of reducing the influence as possible when the portions other than the lip portion such as the nose, the chin, etc. are included is performed using a window function such as a Hamming window, etc. on the clipped lip image in each frame. Then, the two-dimensional Fourier transform process is performed, and the amplitude spectrum of the lip image is obtained as features. In the present mode for embodying the present invention, a computation amount reducing process and a dimension reducing process to remove unnecessary information are performed by a principal component analysis in identification for the obtained features. The eigenvector for use in the principal component analysis is obtained offline in advance using various lip images of unspecified persons, and, for example, by performing principal component analysis using the components up to the tenth component of the eigenvector, the order of the features more than ten dimensions is reduced to ten dimensions. The above-mentioned features are extracted for each frame, and the extracted features are grouped as a five-frame set in the order in which images are captured, and is transmitted to the speech section detection unit 15.

When the speech section detection unit 15 acquires features of a five-frame set from the feature extraction unit 14, it inputs to a speech section detecting HMM features corresponding to the first frame of features set 400b such that the features corresponding to the first frame of the subsequent features set 400b can be one frame shifted to the features corresponding to the first frame of the immediately previous input features set 400a as shown in FIGS. 4A and 4B. Thus, the second to fifth frames of the features set 400a overlap the first to fourth frames of the features set 400b, and are input to the speech section detecting HMM. Similarly, the features corresponding to the first frame of the next features set 400c after the features set 400b is input to the speech section detecting HMM by one frame shifting the features corresponding to the first frame of the next set 400c to the features corresponding to the first frame of the 400b. Thus, by inputting to the speech section detecting HMM the features by one frame shifting the features to the previous frame, the output of the HMM can be obtained by the time resolution for each frame.

Additionally, the speech section detecting HMM identifies the speech/non-speech for an input five-frame features set, and uses the data obtained by learning various lip images of unspecified persons in advance. That is, the five-frame features set is input to each speech HMM and non-speech HMM, and a model having a higher occurrence probability is output as an identification result. For example, when a five-frame features set is input to each of the above-mentioned HMMs, and when the output probability from the speech HMM is higher than the output probability of the non-speech HMM, the five-frame identification result is "speech".

The speech section detection unit 15 performs the process of classifying the speech start point and the speech end point of the object person to be captured based on the output of the HMM. The speech start point and the speech end point are classified by referring to the speech/non-speech output using the speech HMM and the non-speech HMM for a five-frame features set. The process of classifying a speech start point is described below first.

The speech start point is classified in the flow as shown in FIG. 5. In FIG. 5, "S" shows the state in which a speech candidate point has not been determined, "C" indicates that a speech candidate point has been determined, "D" indicates that a speech candidate point has been canceled, "0" in the state transition indicates the state of the output of the HMM in the non-speech state, and "1" indicates the state of the output of the HMM in the speech state. As shown in FIG. 5, when the output of the HMM is the speech state (section A in FIG. 5) two successive frames from the first frame, the first frame is set as a candidate for a speech start point, and the third and subsequent frames enter the state "C". Afterward, if the output of the HMM is in the speech state (section B in FIG. 5) three frames successively from the state "C", the first frame (S1 shown in FIG. 5) set as a speech candidate point is classified as a speech start point. On the other hand, if the output of the HMM is the non-speech state within three frames from the state "C", the frame after the frame in which non-speech occurs transfers to the state "D". If the output of the HMM is in the non-speech state (section C in FIG. 5) ten frames successively in the "D" state, then the first frame set as a speech candidate point is canceled, and removed from the speech candidate points.

Next, the process of classifying a speech end point is described below. The process of classifying a speech end point is performed in the flow as shown in FIG. 6. In FIG. 6, "S" indicates the state in which a section (section D) indicating the output of the HMM in the non-speech state six frames or more successively is searched, "C" indicates the state in which a speech end point is searched for, "0" in the state transition indicates the non-speech state of the output of the HMM, and "1" indicates the speech state of the output of the HMM. As shown in FIG. 6, when the output of the HMM is the non-speech state six frames or more successively from the first frame (section D in FIG. 6), the state "C" for searching the speech end point is entered. Then, from the state "C", regardless of the state in which the output of the HMM is singly in the speech state or the state in which the output of the HMM is in the speech state two frames successively, the non-speech state of the output of the HMM is successive counted. On the other hand, when the output of the HMM from the state "C" is "1" three times successive, the state "S1" is entered. Finally, when the non-speech state is counted twenty times in total, the first frame (state "S1" in FIG. 6) is classified as the speech end point.

When the speech start point and the speech end point are determined in the classifying process, the information is input to the CNS as speech section information.

As described above, by performing the processes of classifying a speech start point and a speech end point in addition to the classification of speech/non-speech by the speech section detecting HMM on the lip region image clipped from a captured image by the SVM, a speech section can be correctly detected for a lip image in various face direction as shown in FIGS. 7A to 7D. For example, in FIGS. 7A to 7D, by the speech section detecting HMM, the lip image in FIGS. 7A to 7C is classified as a speech state, and the lip image in FIG. 7D is classified as a non-speech state.

In the CNS, according to the information about the speech start point and the speech end point from the speech section detection device 1, the speech data corresponding to the captured image from the frame of the speech start point to the frame of the speech end point is read from the data storage unit 11, and the read speech data is speech-recognized. Then, based on the speech recognition result, predetermined processes of searching for a route, displaying information, etc. are performed.

Figure 8:
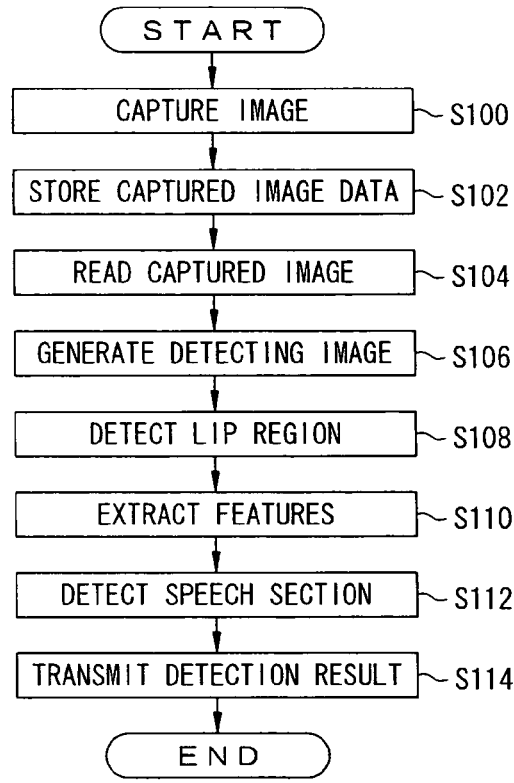
FIG. 8 is a flowchart of the operation process of the speech section detection device 1.

By referring to FIG. 8, the flow of the operation process of the speech section detection device 1 is described below. FIG. 8 is a flowchart of the operation process of the speech section detection device 1.

As shown in FIG. 8, when the process of detecting a speech section is started, control is first passed to step S100, and the image capturing unit 10 captures an image of an object person to be captured, and control is passed to step S102.

In step S102, the data storage unit 11 stores the image data captured by the image capturing unit 10, and control is passed to step S104.

In step S104, the image processing unit 12 reads the captured image data stored by the data storage unit 11, and control is passed to step S106.

In step S106, the image processing unit 12 generates detecting image data from the read captured image data, transmits the generated detecting image data to the lip region detection unit 13, thereby passing control to step S108.

In step S108, the lip region detection unit 13 detects a lip region from a detecting image, and transmits the positional relation information about the detected lip region to the feature extraction unit 14, thereby passing control to step S110.

In step S110, the feature extraction unit 14 clips an image of a lip region from the captured image according to the positional relation information about the detected lip region, extracts features from the clipped image, and transmits the extracted features to the speech section detection unit 15, thereby passing control to step S112.

In step S112, the speech section detection unit 15 inputs features acquired from the feature extraction unit 14 to the speech section detecting HMM, classifies the speech/non-speech state, and detects a speech section based on the classification result, thereby passing control to step S114.

In step S114, the speech section detection unit 15 transmits the information about a detected speech section to the CNS, thereby terminating the process.

Figure 9:
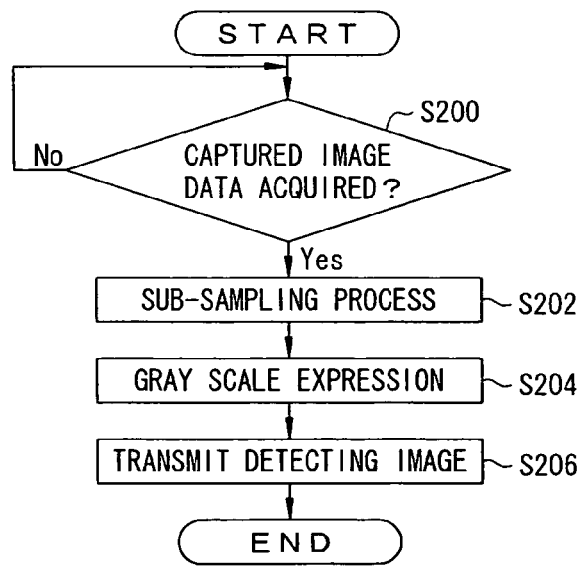
FIG. 9 is a flowchart of the process of generating detecting image data in the image processing unit 12.

Furthermore, by referring to FIG. 9, the flow of the process of generating detecting image data in the image processing unit 12 is explained below. FIG. 9 is a flowchart of the process of generating detecting image data in the image processing unit 12.

As shown in FIG. 9, first, control is passed to step S200, it is classified whether or not the captured image data has been acquired from the data storage unit 11. When it is classified that the data has been acquired (YES), control is passed to step S202. Otherwise (NO), the system enters a standby state until the data is acquired.

When control is passed to step S202, a sub-sampling process is performed on the captured image, thereby passing control to step S204.

In step S204, the sub-sampled captured image data is expressed in gray scale, the captured image data for detection is generated, and control is passed to step S206.

In step S206, the generated image data for detection is transmitted to the lip region detection unit 13, thereby terminating the process.

Figure 10:
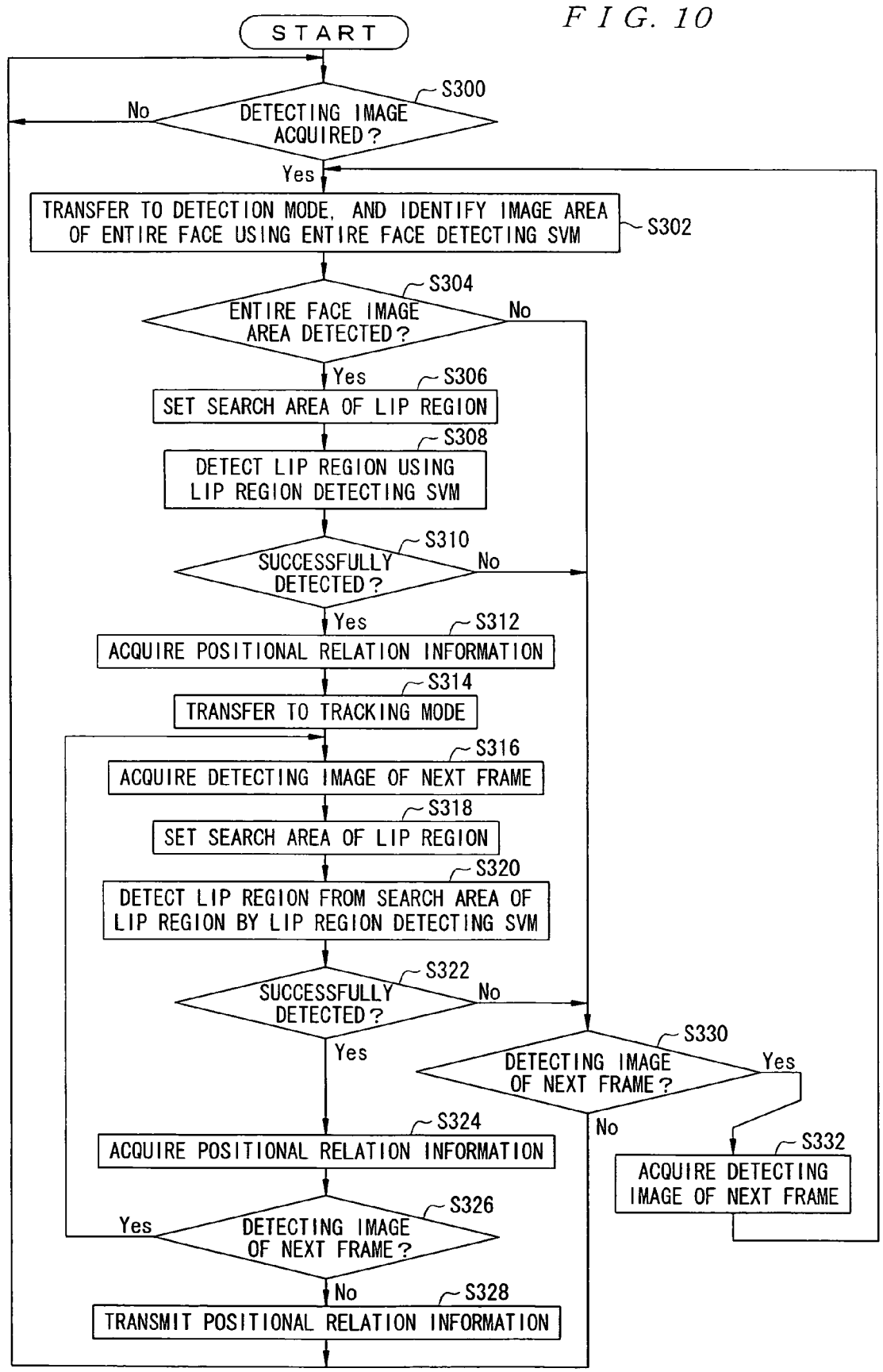
FIG. 10 is a flowchart of the process of detecting a lip region in the lip region detection unit 13.

Furthermore, by referring to FIG. 10, the flow of the process of detecting the lip region in the lip region detection unit 13 is described below. FIG. 10 is a flowchart of the process of detecting a lip region in the lip region detection unit 13.

As shown in FIG. 10, control is first passed to step S300, it is classified whether or not a detecting image has been acquired from the image processing unit 12. If it is classified that the image has been acquired (YES), control is passed to step S302. If not (NO), the system enters the standby state.

If control is passed to step S302, the detection mode is entered, the identifying process is performed using the entire face detecting SVM on the area scanned by the 20×30 pixel search window in the detecting image, thereby passing control to step S304.

In step S304, it is determined whether or not the image area of the entire face has been detected in the identifying process in step S302. If it is classified that the area has been detected (YES), control is passed to step S306. Otherwise (NO), control is passed to step S330.

If control is passed to step S306, the search area of the 20×15 pixel lip region including the lower half area in the detected entire face image area is set for the detecting image, and control is passed to step S308.

In step S308, the identifying process is performed using the lip region detecting SVM on the area scanned in the 10×10 pixel search window in the search area set in step S306, thereby passing control to step S310.

In step S310, it is classified whether or not a lip region has been successfully detected in the identification in step S308. If it has been successfully acquired (YES), control is passed to step S312. Otherwise (NO), control is passed to step S330.

If control is passed to step S312, the positional relation information about the lip region detected in step S310 is acquired, and control is passed to step S314.

In step S314, the setting is switched from the detection mode to the tracking mode, and control is passed to step S316.

In step S316, the image data in the next frame of the detecting image whose lip region has been detected in step S310 is acquired, and control is passed to step S318.

In step S318, according to the positional relation information about the lip region in the detecting image in the immediately previous frame, the search area of the 15×15 pixel lip region is set, thereby passing control to step S320.

In step S320, the identifying process is performed using the lip region detecting SVM on the area scanned by the 10×10 pixel search window in the 15×15 pixel search area set in step S318, and control is passed to step S322.

In step S322, it is classified whether or not the lip region has been successfully detected in the identification in step S320. If it is classified that the lip region has been successfully detected (YES), control is passed to step S324. Otherwise (NO), control is passed to step S330.

If control is passed to step S324, the positional relation information about the lip region detected in step S322 is acquired, and control is passed to step S326.

In step S326, it is classified whether or not there is a detecting image in the next frame. If it is classified there is the image (YES), control is passed to step S316. Otherwise (NO), control is passed to step S328.

If control is passed to step S328, the acquired positional relation information is transmitted to the feature extraction unit 14, and control is passed to step S300.

If control is passed to step S330, it is classified whether or not there is a detecting image in the next frame. If it is classified there is the image (YES), control is passed to step S332. Otherwise (NO), control is passed to step S300.

If control is passed to step S332, the detecting image data in the next frame is acquired, and control is passed to step S302.

Figure 11:
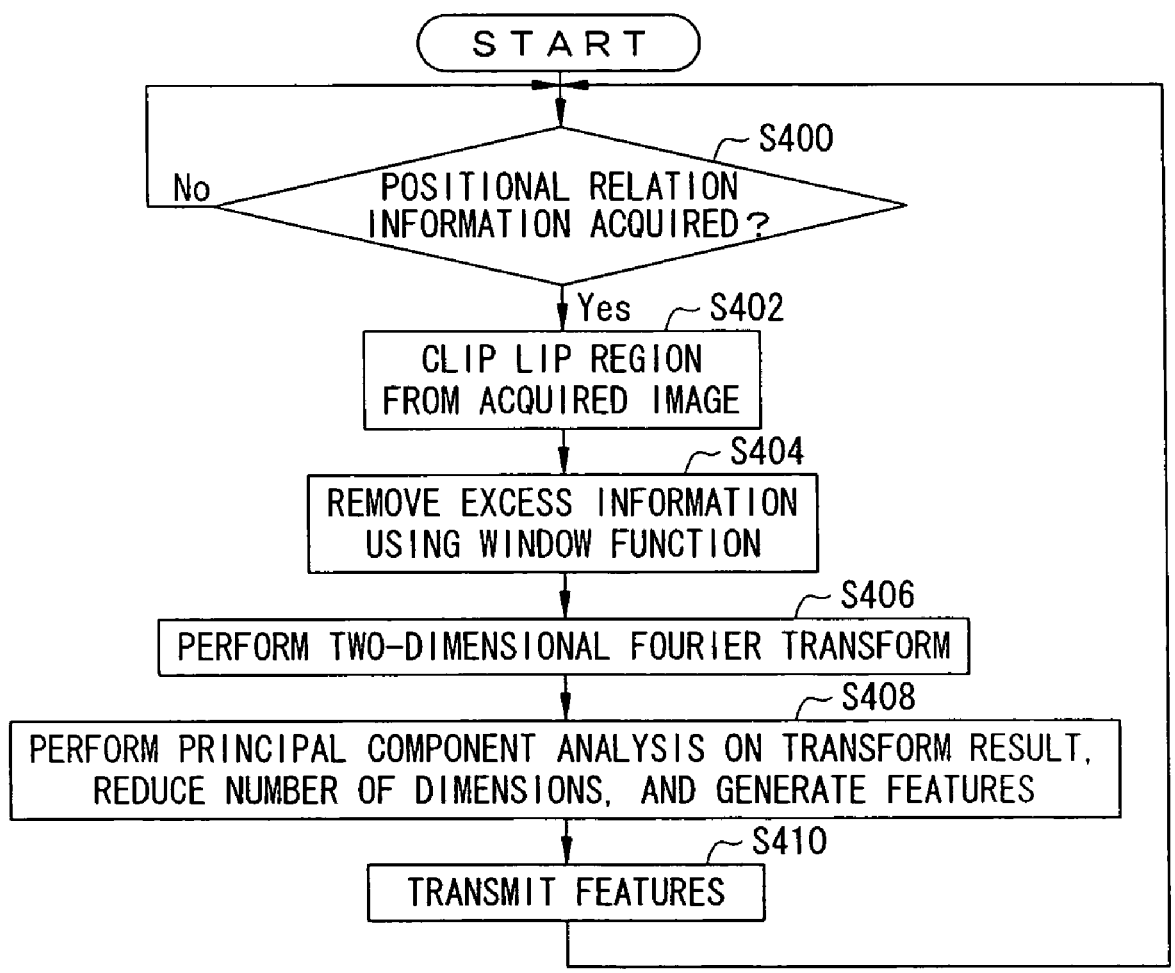
FIG. 11 is a flowchart of the process of extracting features in the feature extraction unit 14.

Furthermore, by referring to FIG. 11, the flow of the process of extracting features in the feature extraction unit 14 is described below. FIG. 11 is a flow chart of the process of extracting features in the feature extraction unit 14.

As shown in FIG. 11, control is first passed to step S400, it is classified whether or not the positional relation information has been acquired from the lip region detection unit 13. If it is classified that the information has been acquired (YES), then control is passed to step S402. Otherwise (NO), the system enters the standby state until the information is acquired.

When control is passed to step S402, the image of the lip region is clipped according to the positional relation information acquired from the captured image stored in the data storage unit 11, and control is passed to step S404.

In step S404, using a window function, the process of reducing the influence of an image of nose, chin, etc. is performed, and control is passed to step S406.

In step S406, the two-dimensional Fourier transform is performed on the image after the process using the window function, the amplitude spectrum of the lip region image is obtained, thereby passing control to step S408.

In step S408, the principal component analysis is performed on the amplitude spectrum obtained in step S406, the number of dimensions of the amplitude spectrum is reduced, thereby generating features and passing control to step S410.

In step S410, the generated features are transmitted in a five-frame set to the speech section detection unit 15, and control is passed to step S400.

Figure 12:
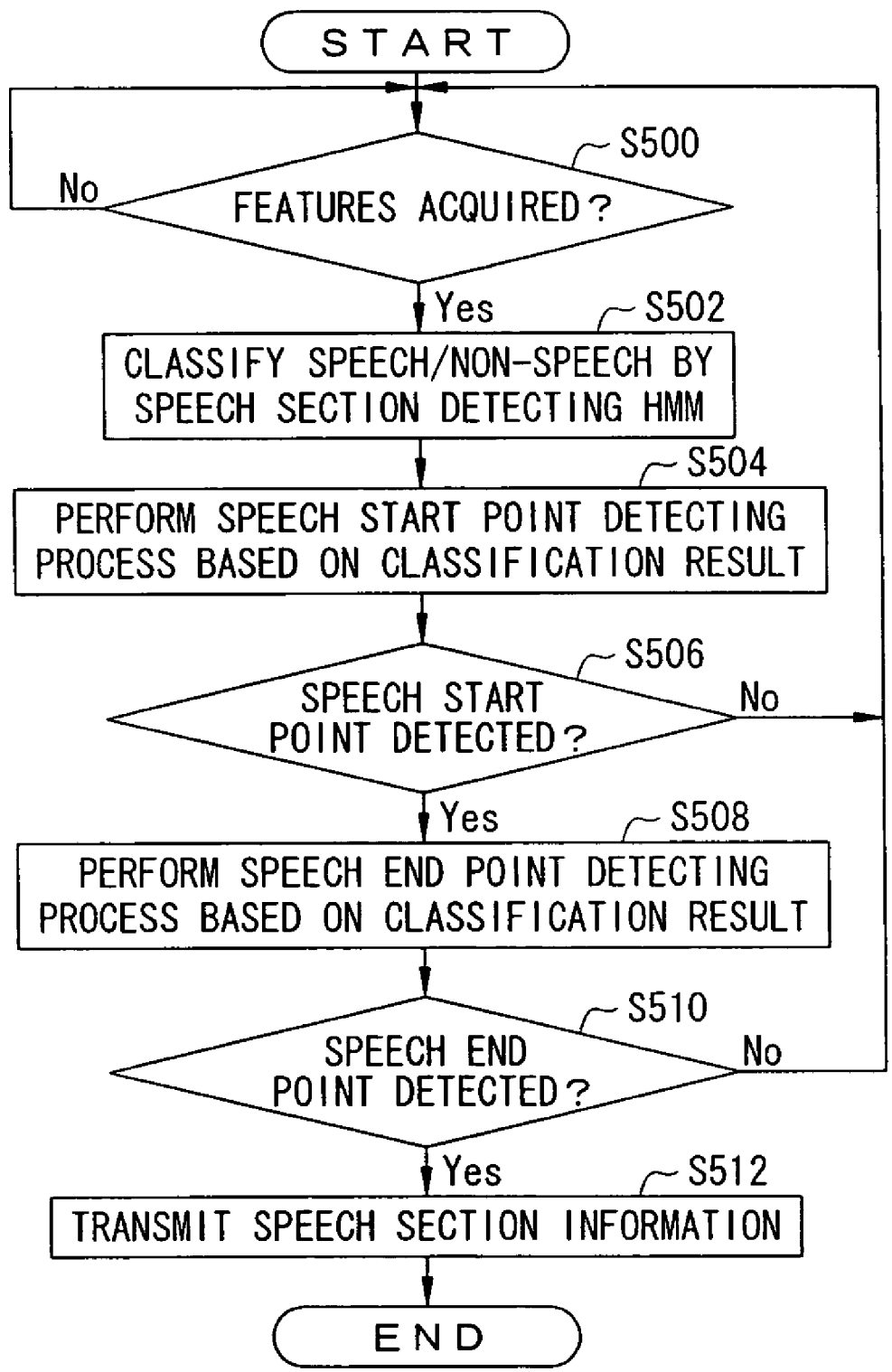
FIG. 12 is a flowchart of the process of detecting a speech section in the speech section detection unit 15.

By referring to FIG. 12, the flow of the process of detecting a speech section in the speech section detection unit 15 is described below. FIG. 12 is a flowchart of the process of detecting a speech section in the speech section detection unit 15.

As shown in FIG. 12, control is first passed to step S500, it is classified whether or not features has been acquired from the feature extraction unit 14. If it is classified that the features have been acquired (YES), control is passed to step S502. Otherwise (NO), the system enters in the standby state until it is acquired.

When control is passed to step S502, the acquired five-frame features set is input to each of the speech HMM as a speech section detection HMM, and a non-speech HMM, speech or non-speech is classified for each five-frame set, and control is passed to step S504.

In step S504, the speech start point classifying process is performed based on the classification result in step S502, thereby passing control to step S506.

In step S506, it is classified whether or not a speech start point has been detected in the classifying process in step S504. If it is classified that the point has been detected (YES), control is passed to step S508. Otherwise (NO), control is passed to step S500.

If control is passed to step S508, the speech end point classifying process is performed based on the classification result in step S502, and control is passed to step S510.

In step S510, it is classified whether or not the speech end point has been detected in the classifying process in step S508. If it is classified that the point has been detected (YES), control is passed to step S512. Otherwise (NO), control is passed to step S500.

If control is passed to step S512, the speech section information is transmitted to the CNS based on the detected speech start point and speech end point, thereby terminating the process.

Figure 13:
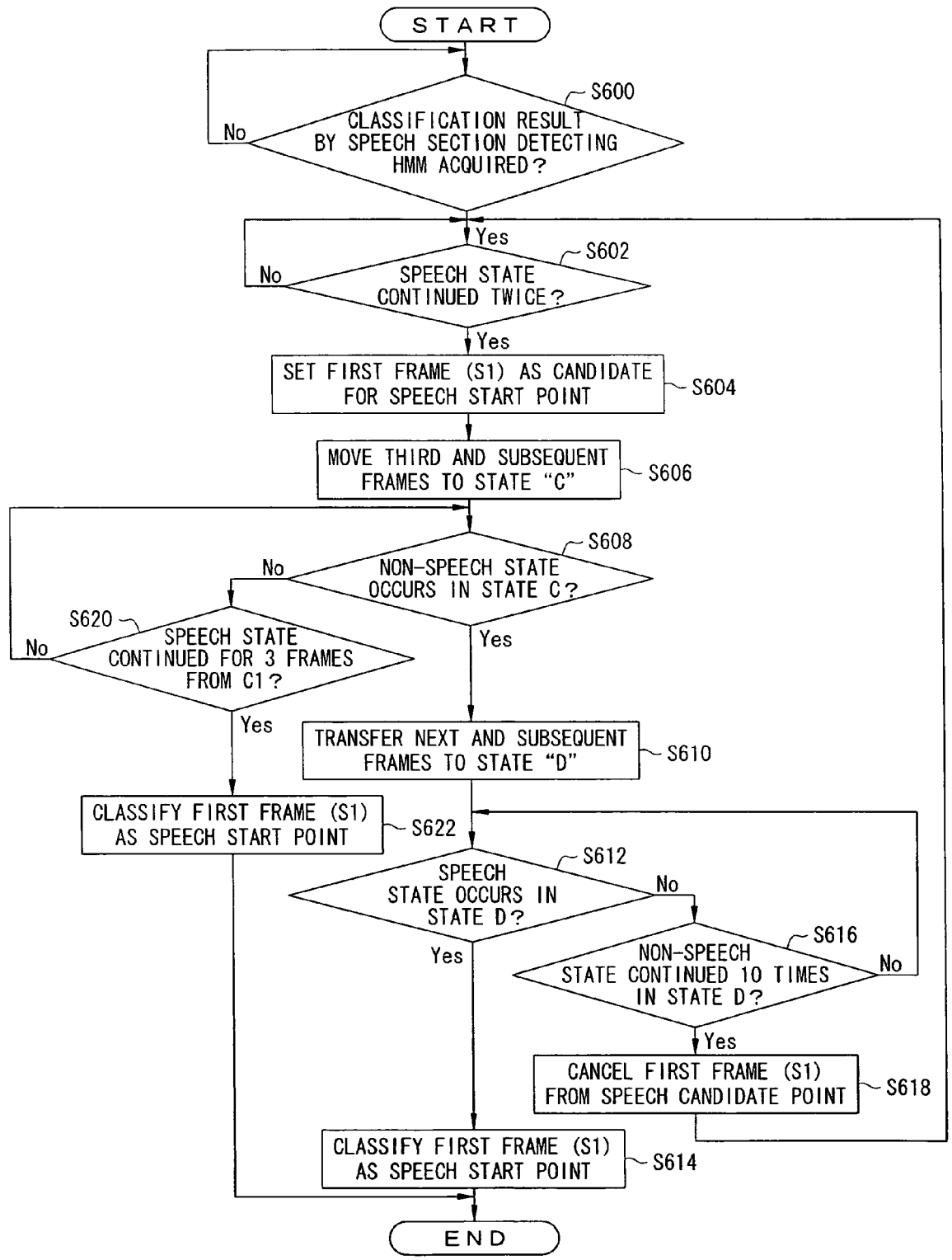
FIG. 13 is a flowchart of the process of classifying a speech start point in the speech section classification unit 15.

Furthermore, by referring to FIG. 13, the flow of the speech start point classifying process in the speech section detection unit 15 is described below. FIG. 13 is a flowchart of the process of classifying a speech start point in the speech section classification unit 15.

As shown in FIG. 13, control is first passed to step S600, and it is classified whether or not a speech/non-speech classification result by the speech section detecting HMM has been acquired. If it is classified that the result has been acquired (YES), control is passed to step S602. Otherwise (NO), the system enters the standby state until it is acquired.

When control is passed to step S602, it is classified whether or not the speech state has two times successively acquired from the corresponding frames based on the classification result. If it is classified that the state has continued (YES), control is passed to step S604. Otherwise (NO), the classifying process is continued for the subsequent frame.

When control is passed to step S604, the corresponding frame is set as the first frame (S1), and the frame is set as a candidate for a speech start point, thereby passing control to step S606.

In step S606, the third and subsequent frames from S1 are transit into the state "C", and control is passed to step S608.

In step S608, it is classified whether or not the non-speech state has occurred in the frame in the state "C". If it is classified that the non-speech state has occurred (YES), control is passed to step S610. Otherwise (NO), control is passed to step S620.

If control is passed to step S610, the frames after the frame in which the non-speech state has occurred are placed in the state "D", thereby passing control to step S612.

In step S612, in the frame in the state "D", it is classified whether or not the speech state has occurred. If it is classified that the state has occurred (YES), control is passed to step S614. Otherwise (NO), control is passed to step S616.

When control is passed to step S614, the first frame (S1) is classified as the speech start point, thereby terminating the process.

When control is passed to step S616, it is classified whether or not the non-speech state has continued ten times in the frames in the state "D". If it is classified that the state has continued (YES), control is passed to step S618. Otherwise (NO), control is passed to step S612.

When control is passed to step S618, the first frame (S1) as a speech candidate point is canceled, and control is passed to step S602.

In step S608, if the non-speech state has not occurred in the state "C", and control is passed to step S620, the number of occurrences of the speech state is counted, and it is classified whether or not the speech state has occurred three frames successively. If it is classified that the state has occurred (YES), control is passed to step S622. Otherwise (NO), control is passed to step S608.

If control is passed to step S622, the first frame (S1) is classified as a speech start point, thereby terminating the process.

Figure 14:
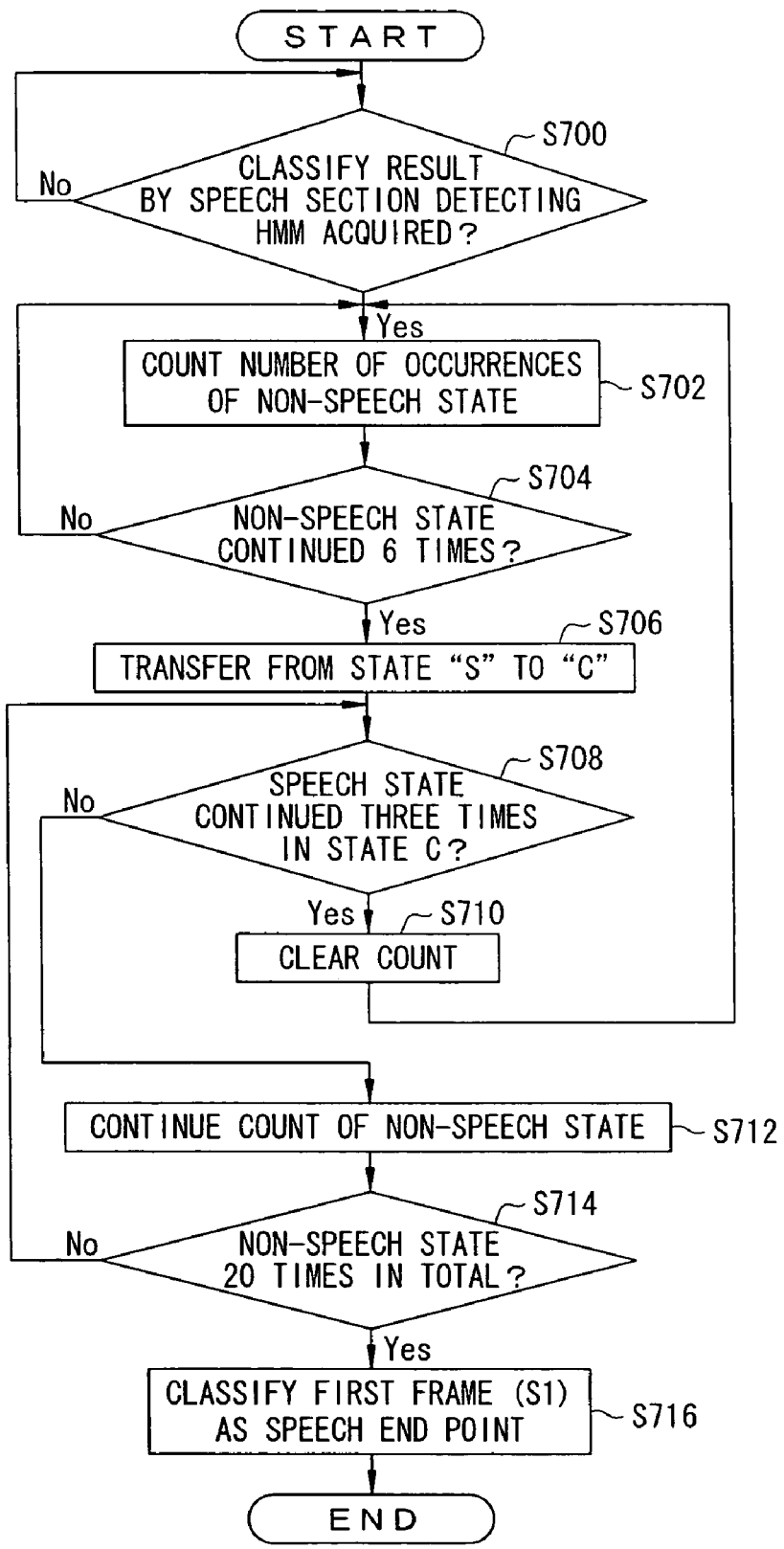
FIG. 14 is a flowchart of the process of classifying a speech end point in the speech section classification unit 15.

By referring to FIG. 14, the flow of the speech end point classifying process in the speech section detection unit 15 is described below. FIG. 14 is a flowchart of the process of classifying a speech end point in the speech section classification unit 15.

As shown in FIG. 14, control is first passed to step S700, it is classified whether or not the speech/non-speech classification result has been acquired by the speech section detecting HMM. If it is classified the result has been acquired (YES), control is passed to step S702. Otherwise (NO), the system enters the standby state until the result is acquired.

When control is passed to step S702, the number of occurrences of the non-speech state is counted in the frame order, and control is passed to step S704.

In step S704, it is classified whether or not the non-speech state has continued six times successively. If it is classified that the state has continued (YES), control is passed to step S706. Otherwise (NO), control is passed to step S702.

When control is passed to step S706, the frames after the six-time successive non-speech state are placed in the state "C", and control is passed to step S708.

In step S708, the number of occurrences of the speech state is also counted, and it is classified in the frame in the state "C" whether or not the speech state has continued three times successively. If it is classified that the state has continued (YES), control is passed to step S710. Otherwise (NO), control is passed to step S712.

When control is passed to step S710, the count of the number of occurrences of non-speech state is cleared, and control is passed to step S702.

If control is passed to step S712, the count of the number of occurrences of the non-speech state is continued, and control is passed to step S714.

In step S714, it is classified whether or not the total number of occurrences of the non-speech state has reached 20 times. If it is classified that 20 times have been reached (YES), control is passed to step S716. Otherwise (NO), control is passed to step S708.

When control is passed to step S716, the first frame (S1) of the six-time successive frames in step S704 is classified as a speech end point, thereby terminating the process.

The speech section detection device 1 can capture using the image capturing unit 10 an image including the face of the object person at the wheel to be captured, store captured image data using the data storage unit 11, express the captured image data in gray scale and generate a detecting image by reducing the size by sub-sampling using the image processing unit 12, detect the lip region from the detecting image using an entire face detecting SVM and a lip region detecting SVM using the lip region detection unit 13, extract a lip region image from the original captured image according to the positional relation information about the detected lip region and extract the features from the clipped lip region image using the feature extraction unit 14, and detect a speech section using a speech section detecting HMM using the speech section detection unit 15.

In the above-mentioned mode for embodying the present invention, as in detecting a lip image, an eye image can be detected using a dedicated SVM, the features can be extracted, and the behavior content relating to the movement of eyes can be classified using a dedicated HMM. With the configuration, a behavior such as a drowsy driver behavior, etc. can be classified, thereby successfully supporting driving by giving an alarm by voice, etc.

In the above-mentioned mode for embodying the present invention, the features extracted by the feature extraction unit 14 can be input to the speech content classifying HMM, thereby directly identifying the speech content, not detecting a speech section. In this case, by learning various lip images of unspecified persons in advance, an HMM for identification of a pronunciation contents such as "a", "i", etc. is generated. With the configuration, it is possible to classify the speech content only from the movement of lips. Therefore, no speech information is required, thereby reducing the required amount of data for speech recognition.

In the above-mentioned mode for embodying the present invention, using the entire face detecting SVM and the lip region detecting SVM, the entire face image area and the lip image area are detected from the detecting image, and then using the position relationship between them, the face direction of an object person to be captured can be classified. With the configuration, for example, the direction of the sound collector unit (microphone, etc.) of a sound collector device mounted in the cabin of a vehicle can be controlled using the classification result of the face direction of a speaker, or a sound collector unit directed to a speaker is selected from among the sound collector units mounted in the cabin of a vehicle and operated, thereby acquiring the speech data of the speaker correctly without fail.

In the above-mentioned mode for embodying the present invention, the image data capturing process of an object person to be captured by the image capturing unit 10 and the data storage unit 11 corresponds to the image capturing means according to the disclosed embodiments.

In the above-mentioned mode for embodying the present invention, the lip region detecting process from a captured image by the image processing unit 12 and the lip region detection unit 13 corresponds to the face portion detection means according to the disclosed embodiments.

In the above-mentioned mode for embodying the present invention, the feature extraction unit 14 corresponds the feature extraction means according to the disclosed embodiments.

In the above-mentioned mode for embodying the present invention, the speech section detection unit 15 corresponds to the behavior content classification means according to the disclosed embodiments.

In the above-mentioned mode for embodying the present invention, the speech start point classifying process by the speech section detection unit 15 corresponds to the speech start point classification means according to the disclosed embodiments.

In the above-mentioned mode for embodying the present invention, the speech end point classifying process by the speech section detection unit 15 corresponds the speech end point classification means according to the disclosed embodiments.

Example of Variation of First Mode for Embodying the Present Invention

Next, an example of a variation of the first mode for embodying the present invention is described below by referring to the attached drawings. FIGS. 15A to 15C, and 16 to 19 show an example of a variation of the first mode for embodying the present invention of the face portion detection device, the behavior content classification device, the face portion detection device control program, the behavior content classification device control program, the face portion detection device control method, and the behavior content classification device control method.

The differences from the above-mentioned first mode for embodying the present invention are: preparing an HMM for speech section detection depending on the face direction of an object person for each set face direction; classifying the face direction of an object person and changing the area size of a lip region detected depending on the face direction as a classification result in the lip region detection unit 13; and selecting a speech section detecting HMM depending on the face direction as the classification result, and detecting a speech section depending on the selected HMM in the speech section detection unit 15. In the following explanation, only the difference points from the above-mentioned first mode for embodying the present invention are described, and the overlapping portions with the first mode for embodying the present invention are omitted here.

First, the differences from the first mode for embodying the present invention in the speech section detection device 1 of the first mode for embodying the present invention are described below.

The data storage unit 11 stores data generated corresponding to predetermined face directions as the speech section detecting HMM.

The lip region detection unit 13 has the function of classifying the face direction of an object person to be captured based on the area, detected by the entire face detecting SVM, of the entire face of the object person to be captured, and the positional relation information about a lip region in addition to the function according to the first mode for embodying the present invention. Furthermore, based on the classified face direction, the detection size for a lip region is changed. That is, depending on the face direction of an object person to be captured, the shape of the lip portion to be captured is determined. Therefore, since the size of the lip region required to include the lip portion is determined correspondingly, the size is to be variable depending on the shape rather than to be of one size with all shapes taken into account, thereby efficiently performing the subsequent processes with higher performance. The information about a detection result and a classification result of a face direction are transmitted to the feature extraction unit 14.

When the feature extraction unit 14 acquires the information about the detection result and the classification result of a face result from the lip region detection unit 13, it reads the corresponding original captured image from the data storage unit 11 according to the information, an image of the lip region of a size depending on the face direction is clipped from the read image, and the features to be input to the speech section detecting HMM described later is extracted from the clipped lip region image. That is, it is different from the above-mentioned first mode for embodying the present invention in that the clip size depends on the face direction.

The speech section detection unit 15 selects and reads the speech section detecting HMM corresponding to the face direction from the data storage unit 11 according to the information about the face direction as a classification result from the lip region detection unit 13, inputs the features of the lip region image acquired from the feature extraction unit 14 to the selected speech section detecting HMM, and detects a speech section from the start of speech to the end of speech of an object person based on the output from the HMM in response to the input.

Figure 15A:
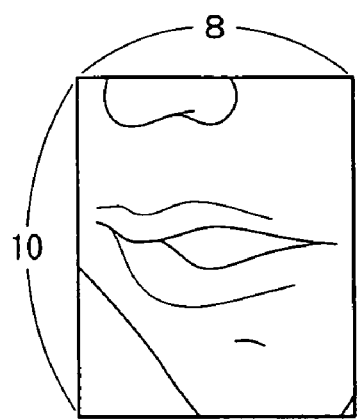
FIGS. 15A to 15C show examples of lip regions detected depending on the face direction.
Figure 15B:
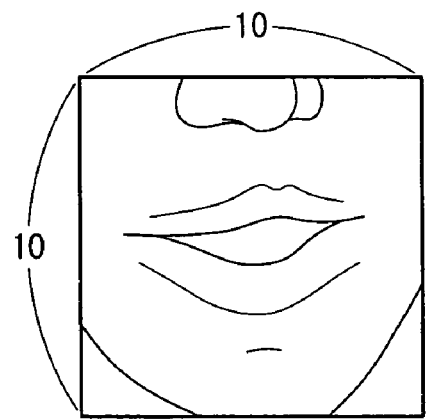
Figure 15C:
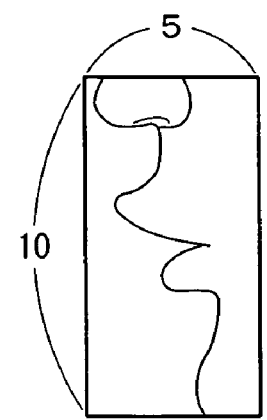

Furthermore, by referring to FIGS. 15A to 15C, the practical operation of the speech section detection device 1 according to an example of a variation of the present mode for embodying the present invention is described below. FIGS. 15A to 15C show examples of lip regions detected depending on the face direction.

In the example of the variation of the present mode for embodying the present invention, a CCD camera is mounted facing parallel to the mirror surface of the inner mirror such that the face of an object person to be captured can be captured from the front when the object person to be captured faces the inner mirror. The data storage unit 11 stores six types of speech section detecting HMMs respectively corresponding to the directions in which the object person to be captured at the wheel faces the right window (hereinafter described as right window direction for short), the right door mirror (hereinafter described as right mirror direction for short), the front (hereinafter described as front direction for short), the inner mirror (hereinafter described as inner mirror direction for short), the left door mirror (hereinafter described as left mirror direction for short), and the left window (hereinafter described as left window direction for short). These HMMs are generated by learning the features of the image of a lip portion extracted from the captured images of unspecified object persons to be captured as learning data for each face direction, inputs features extracted from an image of a lip portion and outputs a likelihood for a speech state of an object person to be captured, and a likelihood for a non-speech state.

In an example of a variation of the present mode for embodying the present invention, when the lip region detection unit 13 acquires a detecting image from the image processing unit 12, as in the above-mentioned first mode for embodying the present invention, it enters the detection mode, and detects a 20×30 pixel area image as the entire face image area 200 using the entire face detecting SVM. When the entire face image area 200 is detected, as in the above-mentioned first mode for embodying the present invention, a 10×10 pixel lip region image is detected using the lip region detecting SVM. Furthermore, when a lip region image is detected, the positional relation information (coordinates information) is acquired, and the face direction (any of the above-mentioned six variations of directions) of the object person in the captured image is classified according to the entire face image area 200 and the acquired positional relation information. Practically, depending on the six variations of face directions, the position coordinates of the lip portion in the entire face image area 200 are determined. Therefore, each face direction is classified depending on the position coordinates. Furthermore, when a face direction is classified, the 10×10 pixel lip region is changed to a size of 10×8 pixels, 10×5 pixels, etc. depending on the face direction as a classification result.

For example, FIGS. 15A to 15C show the detection result of a lip region when the face direction of an object person to be captured is the front direction, the inner mirror direction, and the right window direction. However, with the mounting position of the CCD camera, the lip portion is captured from the front when the object person faces the inner mirror. Therefore, the number of pixels of the lip portion is the largest at this time. As a result, as shown in FIG. 15B, the lip region has a 10×10 pixel size. The second largest number of pixels of the lip portion is obtained when the object person faces the front (or the left mirror direction). Therefore, as shown in FIG. 15A, the 10×10 pixel size is changed to the 10×8 pixel size, and the number of pixels of the lip portion is the smallest when the object person faces the right window direction. Therefore, as shown in FIG. 15C, the 10×10 pixel size is changed to the 10×8 pixel size. Although not shown in the drawings, there is the size (for example, 10×7 pixel size) corresponding to the right mirror direction and the left window direction between the 10×8 pixel and 10×5 pixel sizes.

Thus, when the size of the lip region is changed, the system enters the tracking mode for the detecting image of the next frame.

When the lip region detection unit 13 enters the tracking mode, as in the first mode for embodying the present invention, it sets a 15×15 pixel search area 25 by expanding the area five pixels each in the vertical and horizontal directions with the position coordinates of the lip region image detected in the previous frame in the centre as shown in FIG. 2C for the detecting image in the next frame, and scans the lip region in the 10×10 pixel search window 24 on the set search area 25. The gray scale value of scanned 10×10 pixels, that is, a total of 100 pixels, is input to the lip region detecting SVM as in the detection mode, thereby performing the process of detecting a lip region. When the lip region is detected and the coordinates information is acquired, the face direction is classified based on the already detected entire face image area 200 and the coordinates information as described above, and the size of the lip region is changed based on the face direction as a classification result. According to the present example of the variation, the information about the face direction and the central coordinates of the lip region are transmitted to the feature extraction unit 14.

When the feature extraction unit 14 acquires the information about the face direction and the central coordinates of the lip region in the detecting image in each frame from the lip region detection unit 13, it clips a lip image of gray scale of the number of pixels (for example, the range of 64×48 pixel to 64×64 pixel) depending on the face direction with the acquired central coordinates in the center from the corresponding captured image stored by the data storage unit 11. That is, as with the above-mentioned lip region, the inner mirror direction is defined as the maximum size (64×64 pixels), and the right window direction is defined as the minimum size (64×48 pixels). The process similar to that according to the first mode for embodying the present invention is performed, and the amplitude spectrum of the lip image is obtained as features. The above-mentioned features are extracted for each frame, and the extracted features are grouped as a five-frame set in the order in which images are captured, and is transmitted to the speech section detection unit 15, and the face direction classification result corresponding to a five-frame set is transmitted to the speech section detection unit 15.

When the speech section detection unit 15 acquires a face direction classification result and a five-frame features set from the feature extraction unit 14, it first selects and reads the speech section detecting HMM corresponding to the face direction from the data storage unit 11 based on the face direction classification result. That is, the HMM corresponding to the face direction as a classification result is selected from the HMM corresponding to the six types of face directions. Afterwards, using the selected HMM, a speech section is detected in the process similar to that according to the first mode for embodying the present invention.

Figure 16:
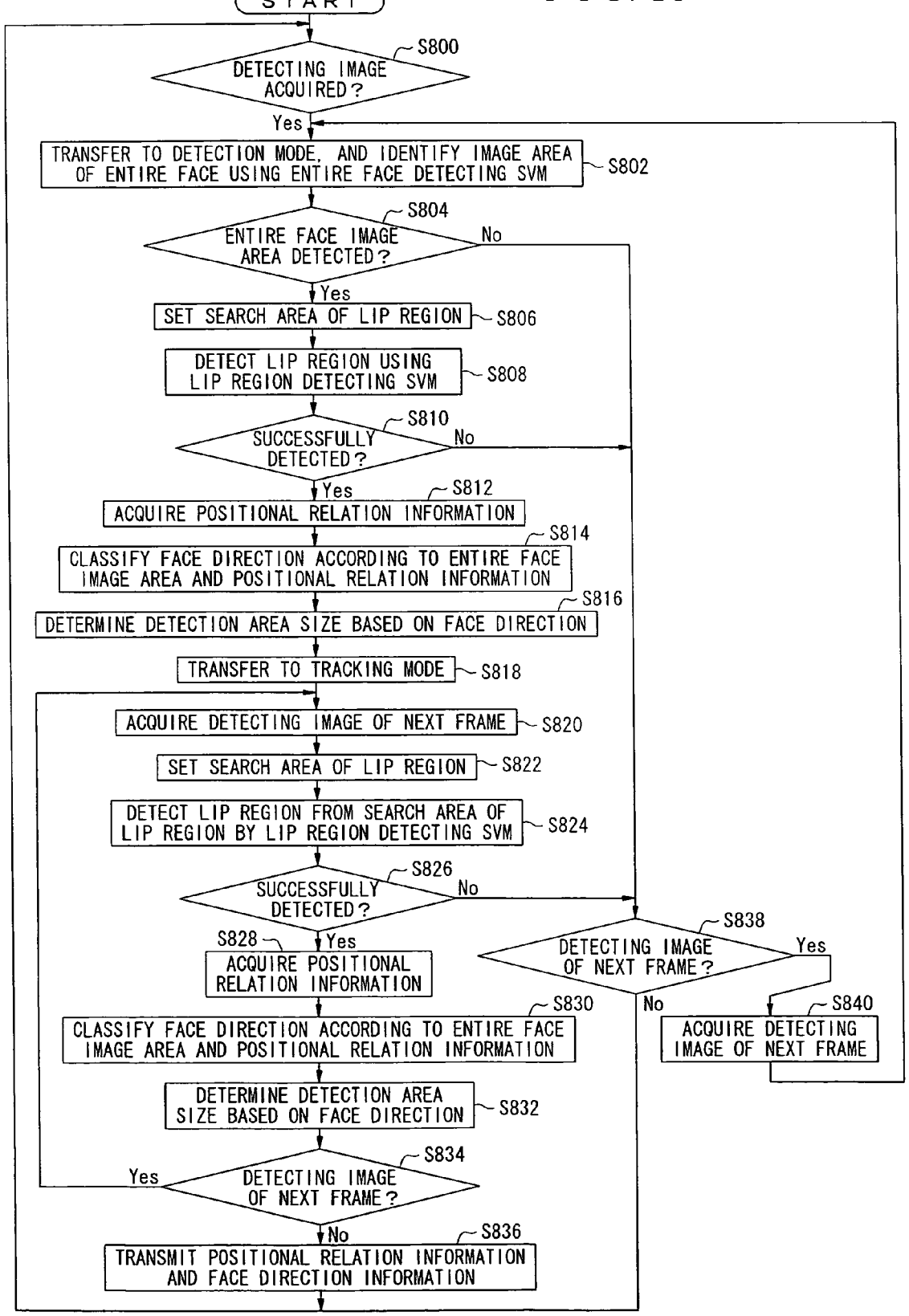
FIG. 16 is a flowchart of the process of detecting a lip region in the lip region detection unit 13 in a variation of the first mode for embodying the present invention.

By referring to FIG. 16, the flow of the lip region detection process in the lip region detection unit 13 according to an example of a variation according to the mode for embodying the present invention is described below. FIG. 16 is a flowchart of the process of detecting a lip region in the lip region detection unit 13 in a variation of the first mode for embodying the present invention.

As shown in FIG. 16, control is first passed to step S800, it is classified whether or not a detecting image has been acquired from the image processing unit 12. When it is classified that the image has been acquired (YES), control is passed to step S802. Otherwise (NO), the system enters the standby state until it is acquired.

When control is passed to step S802, the system enters the detection mode, the identifying process is performed using the entire face detecting SVM on the area scanned in the 20×30 pixel search window in the detecting image, thereby passing control to step S804.

In step S804, it is classified whether or not the entire face image area has been detected in the identifying process in step S802. If it is classified that the area has been detected (YES), then control is passed to step S806. Otherwise (NO), control is passed to step S838.

If control is passed to step S806, the search area of the 20×15 pixel lip region including the lower half area of the detected entire face area image is set for the detecting image, thereby passing control to step S808.

In step S808, the identifying process is performed using the lip region detecting SVM on the area scanned by the 10×10 pixel search window in the search area set in step S806, thereby passing control to step S810.

In step S810, it is classified whether or not a lip region has been successfully detected in the identification in step S808. If it is classified that it has been successfully detected (YES), then control is passed to step S812. Otherwise (NO) control is passed to step S838.

If control is passed to step S812, the positional relation information about the lip region detected in step S810 is acquired, thereby passing control to step S814.

In step S814, the face direction of the object person to be captured in the detecting image is classified based on the entire face area image detected in step S804 and the positional relation information acquired in step S812, thereby passing control to step S816.

In step S816, based on the face direction classified in step S814, the lip region size is determined, and control is passed to step S818. The area size is determined such that the 10×10 pixel size is the maximum size in the face direction in which the face of an object person to be captured faces the CCD camera (inner mirror direction), and in the case of the other face directions, the area is changed to an area smaller than a predetermined 10×10 pixel area.

In step S818, the setting is switched from the detection mode to the tracking mode, thereby passing control to step S820.

In step S820, the image data of the detecting image in the next frame in which a lip region is detected in step S810 is acquired, thereby passing control to step S822.

In step S822, according to the positional relation information about the lip region in the detecting image in the immediately previous frame, the search area of the 15×15 pixel lip region is set, thereby passing control to step S824.

In step S824, the identifying process is performed using the lip region detecting SVM on the area scanned by the 10×10 pixel search window in the 15×15 pixel search area set in step S822, thereby passing control to step S826.

In step 826, it is classified whether or not a lip region has been successfully detected in the identification in step S824. If it is classified that the lip region has been successfully detected (YES), then control is passed to step S828. Otherwise (NO) control is passed to step S838.

If control is passed to step S828, the positional relation information about the lip region detected in step S826 is acquired, thereby passing control to step S838.

In step S830, the face direction of the object person to be captured in the detecting image is classified based on the entire face area image detected in step S804 and the positional relation information acquired in step S828, thereby passing control to step S832.

In step S832, based on the face direction classified in step S830, the lip region size is determined, and control is passed to step S834.

In step S834, it is classified whether or not there is a detecting image in the next frame. If it is classified that there is (YES), control is passed to step S820. Otherwise (NO), control is passed to step S836.

When control is passed to step S836, the acquired positional relation information and the face direction information as a classification result are transmitted to the feature extraction unit 14, thereby passing control to step S800.

When control is passed to step S838, it is classified whether or not there is a detecting image in the next frame. If it is classified that there is (YES), control is passed to step S840. Otherwise (NO), control is passed to step S800.

When control is passed to step S840, the detecting image data in the next frame is acquired, thereby passing control to step S802.

Figure 17:
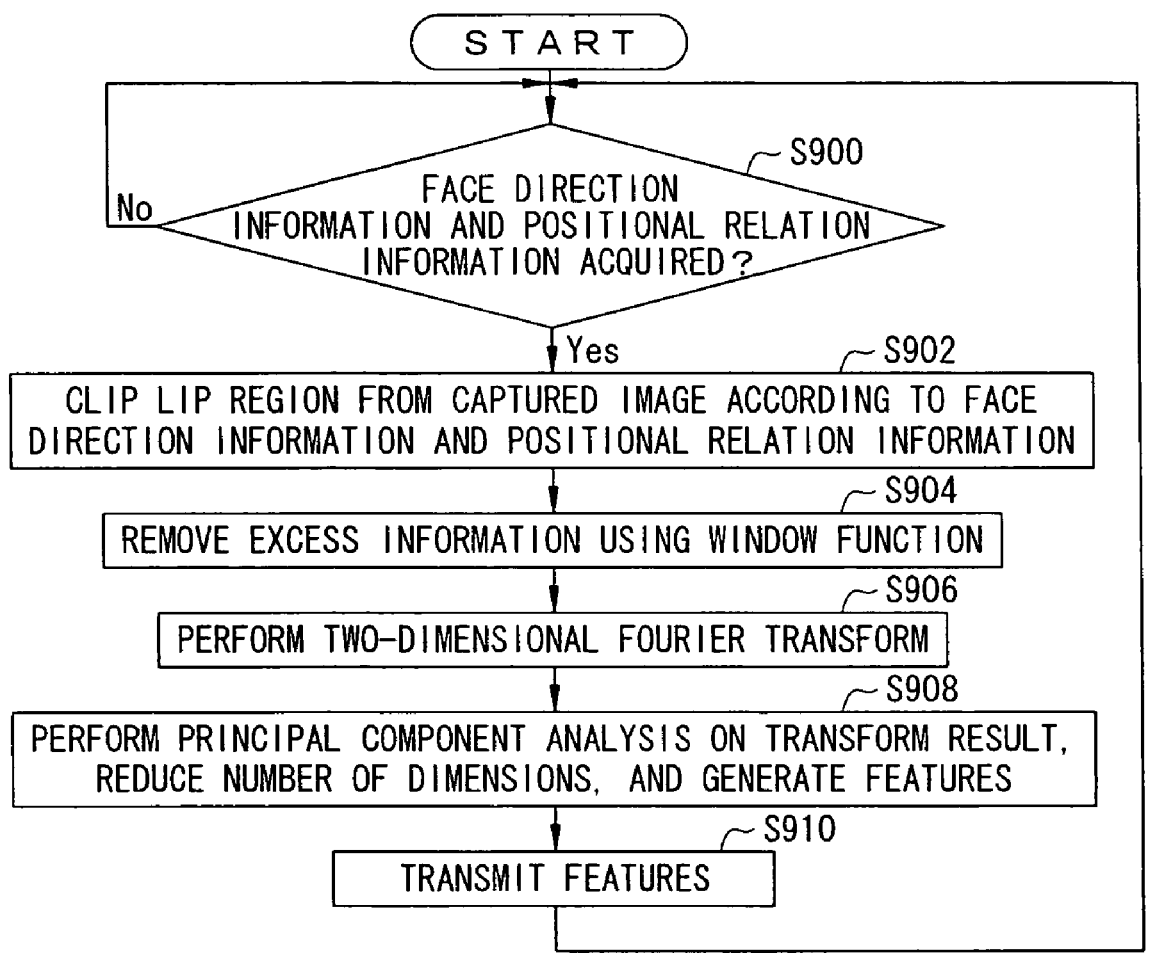
FIG. 17 is a flowchart of the process of extracting features by the feature extraction unit 14 in a variation of the first mode for embodying the present invention.

Furthermore, by referring to FIG. 17, the flow of the process of extracting features in the feature extraction unit 14 is explained below. FIG. 17 is a flowchart of the process of extracting features by the feature extraction unit 14.

As shown in FIG. 17, control is first passed to step S900, it is classified whether or not the face direction information and the positional relation information have been acquired from the lip region detection unit 13. If it is classified that they have been acquired (YES), control is passed to step S902. Otherwise (NO), the system enters the standby state until they are acquired.

When control is passed to step S902, an image of a lip region of a size depending on the face direction is clipped according to the acquired face direction information and positional relation information from the captured image stored in the data storage unit 11, thereby passing control to step S904. The size depending on the face direction refers to the maximum size in the face direction in which the face of an object person to be captured faces the CCD camera (inner mirror direction), and in the case of the other face directions, the area is changed to an area smaller than the maximum size set beforehand according to the face direction.

In step S904, control is passed to step S906 after performing a process of reducing the influence of an image of the nose, chin, etc. by a window function.

In step S906, a two-dimensional Fourier transform is performed on an image processed using the window function, and by obtaining an amplitude spectrum of a lip region image, control is passed to step S908.

In step S908, principal component analysis is performed on the amplitude spectrum acquired in step S906, features is generated by reducing the number of dimensions of the amplitude spectrum, thereby passing control to step S910.

In step S910, a five-frame set of the generated features is transmitted to the speech section detection unit 15, thereby passing control to step S900.

Figure 18:
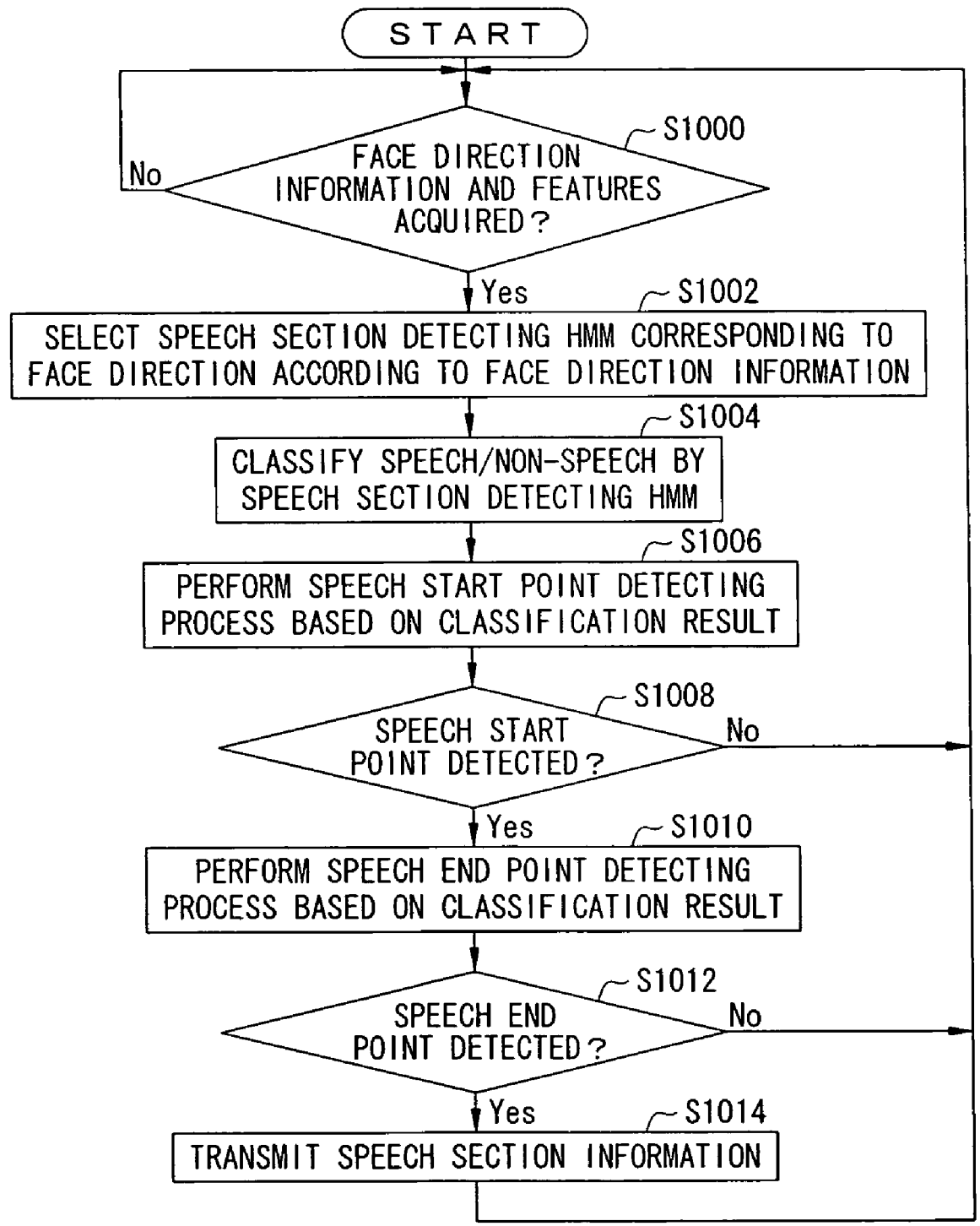
FIG. 18 is a flowchart of the process of detecting a speech section in the speech section detection unit 15 in a variation of the first mode for embodying the present invention.

By referring to FIG. 18, the flow of the speech section detection process in the speech section detection unit 15 is described below. FIG. 18 is a flowchart of the process of detecting a speech section in the speech section detection unit 15 in a variation of the first mode for embodying the present invention.

As shown in FIG. 18, control is first passed to step S1000, it is classified whether or not the face direction information and features have been acquired from the feature extraction unit 14. If it is classified that they have been acquired (YES), control is passed to step S1002. Otherwise (NO), the system enters the standby state until they are acquired.

When control is passed to step S1002, an HMM corresponding to the face direction indicated by the face direction information is selected and read from the speech section detecting HMMs corresponding to a plurality of face directions stored in the data storage unit 11 according to the face direction information, thereby passing control to step S1004.

In step S1004, the acquired five-frame set of the features is input to each of the speech HMM and non-speech HMM that are HMMs for speech section detection selected in step S1002, the speech/non-speech is classified for every five frames, thereby passing control to step S1006.

In step S1006, based on the classification result in step S1004, the speech start point classifying process is performed, thereby passing control to step S1008.

In step S1008, it is classified as to whether or not a speech start point has been detected in the classifying process in step S1006. If it is classified that the point has been detected (YES), control is passed to step S1010. Otherwise (NO), control is passed to step S1000.

When control is passed to step S1010, the speech end point classifying process is performed based on the classification result in step S1004, thereby passing control to step S1012.

In step S1012, it is classified whether or not a speech end point has been detected in the classifying process in step S1010. If it is classified that the point has been detected (YES), control is passed to step S1014. Otherwise (NO), control is passed to step S1000.

When control is passed to step S1014, the speech section information is transmitted to the CNS based on the detected speech start point and speech end point, thereby terminating the process.

Figure 19:
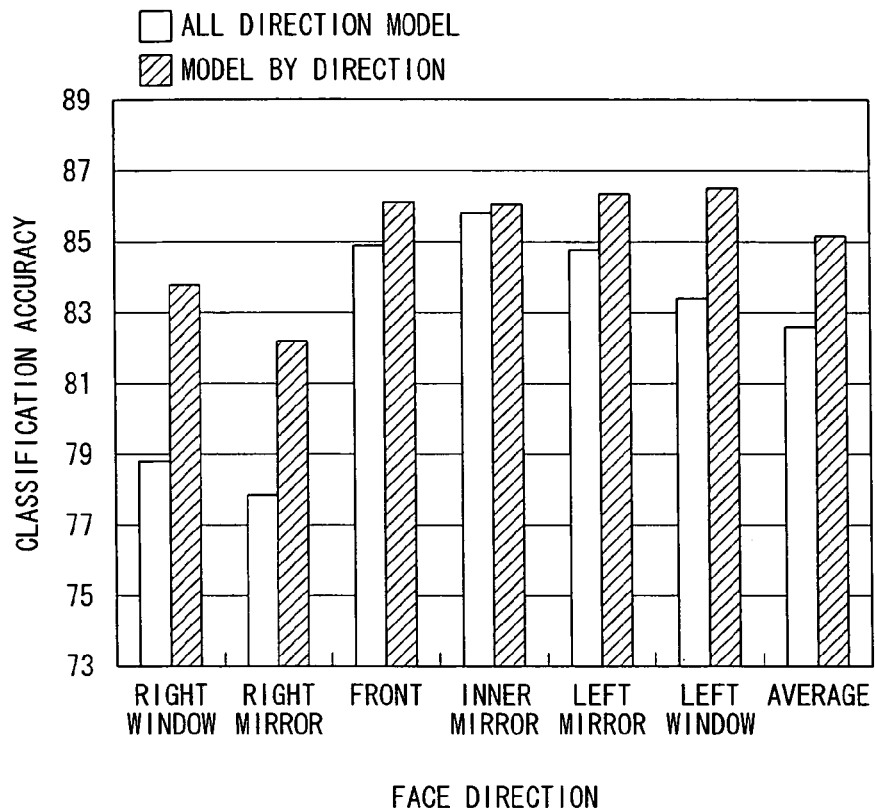
FIG. 19 shows the classification accuracy of a speech section using an HMM with the face direction taken into account and using an HMM without considering the face direction.

Furthermore, to show the effect of the present variation example, by referring to FIG. 19, the speech section detection method according to the first mode for embodying the present invention is compared with the speech section detection method according to the present variation example. FIG. 19 shows the classification accuracy of a speech section using an HMM with the face direction taken into account and using an HMM without considering the face direction. That is, the classification accuracy of a speech section in the embodiment in which a speech section detection was performed using one type of HMM corresponding to all directions without considering the face direction in the first mode for embodying the present invention is compared with the classification accuracy in the speech section in the embodiment in which a speech section detection was performed using each of the six generated HMMs for each of the six face directions according to the present variation example.

FIG. 16 shows an example of the classification accuracy in which each speech section for the six types of face directions of the object person to be captured explained in the present variation example is detected using one type of HMM corresponding to all face directions without consideration of the face direction of the object person to be captured and the classification accuracy in which an HMM corresponding to each of the six types of face directions is generated with the face direction of the object person to be captured taken into account and each speech section is detected for each of the six types of face directions using the six types of HMMs.

When the classification accuracy of the method according to the first mode for embodying the present invention is compared with the classification accuracy according to the method of the present variation example, in the right mirror direction and the right window direction in which the angle of the face direction of an object person to be captured to the acquisition direction of the CCD camera is especially large, the method with the face direction taken into account in the present variation example is 4% higher in classification accuracy than the method in the above-mentioned first mode for embodying the present invention. It is because the angle varies and thereby the image shape of the lip portion captured by the CCD camera indicates a different shape depending on the level of the angle. That is, the higher the degree of the variation of the image of the lip portion (the larger the angle) is, features different from the features extracted from the image of a lower variation level (having a smaller angle) is extracted. Therefore, the detection accuracy in the speech section is improved to use an HMM corresponding to each direction (angle range) than to use one type of HMM in detection of a speech section where the features differs depending on the angle. It is clear as shown in FIG. 16 in which generating an HMM for each face direction improves the classification accuracy in all directions than detection of a speech section in all directions using one type of HMM.

As described above, the speech section detection device 1 of the present variation example can capture an image including the face of an object person to be captured at the wheel using the image capturing unit 10, store a speech section detecting HMM corresponding to a plurality of face directions of an object person to be captured, captured image data, etc. using the data storage unit 11, express captured image data in gray scale and sub-sample the data to reduce the size and generate a detecting image using the image processing unit 12, detect a lip region from a detecting image using an entire face detecting SVM and lip region detecting SVM, classify the face direction of an object person to be captured according to the entire face area image and the coordinates information about the detected lip region, and change the detection size of the lip region based on the classification result using the lip region detection unit 13, clip the lip region image of the size corresponding to the face direction from the original captured image based on the positional relation information about the detected lip region and the face direction as a classification result and extract features from the clipped lip region image using the feature extraction unit 14, and detect a speech section using a speech section detecting HMM corresponding to the face direction as a classification result using the speech section detection unit 15.

In the above-mentioned mode for embodying the present invention, the process of acquiring image data of an object person to be captured by the image capturing unit 10 and the data storage unit 11 corresponds to the image capturing means according to the disclosed embodiments.

In the above-mentioned mode for embodying the present invention, the process of detecting a lip region from an acquired image by the image processing unit 12 and the lip region detection unit 13 corresponds to the face portion detection means according to the disclosed embodiments.

In the above-mentioned mode for embodying the present invention, the process of acquiring the positional relation information by the lip region detection unit 13 corresponds to the positional relation information acquisition means according to the disclosed embodiments.

In the above-mentioned mode for embodying the present invention, the feature extraction unit 14 corresponds to the feature extraction means according to the disclosed embodiments.

In the above-mentioned mode for embodying the present invention, the speech section detection unit 15 corresponds to the behavior content classification means according to the disclosed embodiments.

In the above-mentioned mode for embodying the present invention, the process of classifying a speech start point in the speech section detection unit 15 corresponds to the speech start point classification means according to the disclosed embodiments.

In the above-mentioned mode for embodying the present invention, the process of classifying a speech end point in the speech section detection unit 15 corresponds to the speech end point classification means according to the disclosed embodiments.

Second Mode for Embodying the Present Invention

The second mode for embodying the present invention is explained below by referring to the attached drawings. FIGS. 20, 21A to 21C, and 22 to 30 show the second mode of the arousal state detection device for embodying the present invention to which the face portion detection device, the behavior content classification device, the face portion detection device control program, the behavior content classification device control program, the face portion detection device control method, and the behavior content classification device control method are applied.

In the mode for embodying the present invention, the face portion detection device, the behavior content classification device, the face portion detection device control program, the behavior content classification device control program, the face portion detection device control method, and the behavior content classification device control method are explained by applying them to an arousal state classification device for classifying the arousal state of a driver who drives a vehicle.

Figure 20:
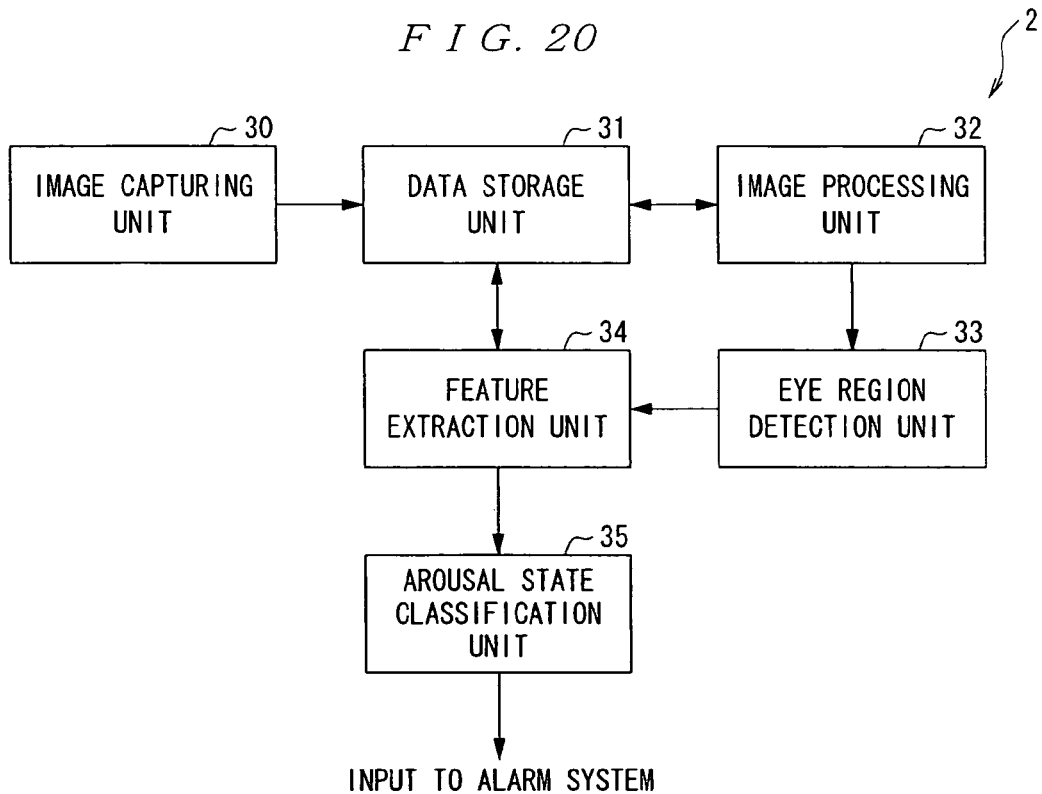
FIG. 20 is a block diagram of the configuration of the arousal state classification device according to the present invention.

First, the configuration of the arousal state classification device according to the present invention is explained by referring to FIG. 20. FIG. 20 is a block diagram of the configuration of the arousal state classification device according to the present invention.

As shown in FIG. 20, an arousal state classification device 2 includes an image capturing unit 30, a data storage unit 31, an image processing unit 32, an eye region detection unit 33, feature extraction unit 34, and an arousal state classification unit 35. In the present mode for embodying the present invention, the arousal state classification device 2 is mounted in the cabin of a vehicle, and connected to an alarm system so as to cooperate with the alarm system not shown in FIG. 20, but is mounted in the cabin of the vehicle. The output of the arousal state classification device 2 is input to the alarm system, and the alarm system displays the screen of a classification result, issues an alarm tone, an alarm voice message, etc. according to the input information when it is classified that the driver is in a sleepy or drowsy state.

The image capturing unit 30 has the configuration including a CCD (charge coupled device) camera, and outputs an image captured in a frame unit as digital data. The output image data is transmitted to the data storage unit 31. According to the mode for embodying the present invention, the CCD camera is attached to the inner mirror in the cabin of the vehicle such that the image of the entire face of a person at the wheel (driver) can be captured. The attachment position of the CCD camera is not limited to the inner mirror, but can be the position of the steering column, the center panel, the front pillar, etc. so far as the image including the entire face of the object person can be captured.

The data storage unit 31 stores data necessary in classifying an arousal state such as an SVM for detecting the entire face, an SVM for detecting an eye region, an HMM for classifying an arousal state, an image captured by the image capturing unit 30, etc.

The image processing unit 32 reduces an image size, etc. as pre-processing of the process of detecting an eye region from the captured image performed by the eye region detection unit 33. Hereinafter, the captured image reduced in image size is referred to as a detecting image.

The eye region detection unit 33 detects an eye region of an object person to be captured from the detecting image acquired from the image processing unit 32 using an SVM. In the mode for embodying the present invention, a left eye region is detected in two stages using two types of SVM, that is, an entire face detecting SVM for detecting the area 200 of the entire face of the object person to be captured and a left eye region detecting SVM for detecting the left eye region including the left eye of an object person to be captured (not including the right eye) from the entire face image detected by the entire face detecting SVM. Once the left eye region is detected, a search area for a left eye region is set for a detecting image in the next frame based on the positional relation information (coordinate information when the coordinates of the upper left pixel of the image are set to (1,1)) about the left eye region detected in the previous frame, and the left eye region detecting SVM is applied to the search area. That is, once a left eye region is detected, the detecting process of an image area of the entire face by the entire face detecting SVM is omitted for the detecting image from the next frame until the left eye region is not detected. At this time, by setting a search area narrower than the search area set when the left eye region is first detected, the process of detecting a left eye region is performed at a high speed. Thus, the mode in which the process of detecting a left eye region using the above-mentioned two types of SVMs is performed is referred to as a detection mode, and the mode in which the process of detecting a left eye region by setting a search area of a left eye region according to the positional relation information about the left eye region detected in the previous frame, and applying the left eye region detecting SVM to the search area is referred to as a tracking mode. The information about the detection result is transmitted to the feature extraction unit 34.

When the feature extraction unit 34 acquires the information about the detection result from the eye region detection unit 33, it reads the corresponding original captured image from the data storage unit 11 according to the information, an image of the left eye region is clipped from the read image, and the features to be input to the arousal state classifying HMM described later is extracted from the clipped left eye region image. In the mode for embodying the present invention, the number of dimensions is reduced by performing the principal component analysis or the independent component analysis on the extracted features. Additionally, in the mode for embodying the present invention, a Fourier transform is performed on the clipped left eye region image, and the frequency spectrum component is extracted as features. Furthermore, the extracted features are transmitted to the arousal state classification unit 35 using predetermined successive frames (for example, 10 frames) as a set.

The arousal state classification unit 35 inputs the features of the left eye region image acquired from the feature extraction unit 34 to the arousal state classifying HMM, and based on the output from the HMM in response to the input, the arousal state of an object person is classified. The information about the classification result is transmitted to the alarm system not shown in the attached drawings.

In the mode for embodying the present invention, the arousal state classification device 2 is provided with a processor not shown in the attached drawings, RAM (random access memory), and a storage medium storing a dedicated program, and controls each of the above-mentioned components by the processor executing the dedicated program.

A storage medium can be a semiconductor storage medium such as RAM, ROM, etc., a magnetic storage medium such as an FD, HD, etc., an optical read system storage medium such as a CD, a CDV, an LD, a DVD, etc., a magnetic storage type/optical read system storage medium such as an MO, etc., and can be any storage medium so far as it is a computer-readable storage medium regardless of the read method such as an electronic, magnetic, or optical reading method.

Figure 21A:
FIG. 21A shows an example of a captured image.
Figure 21B:
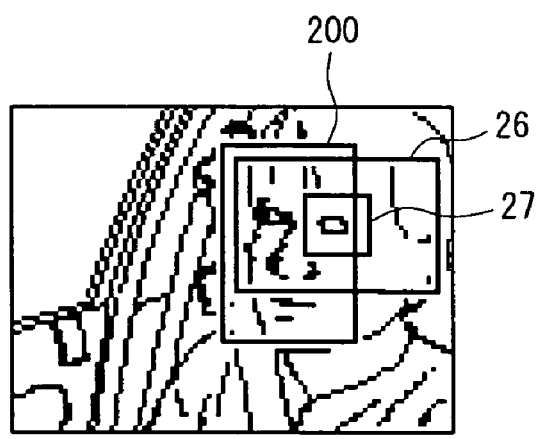
FIG. 21B shows a search area and a search window in a detection mode for a detecting image.
Figure 21C:
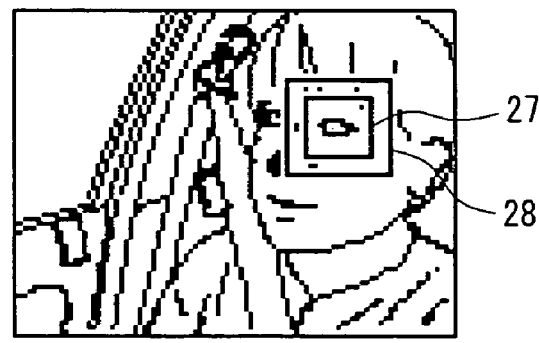
FIG. 21C shows a search area and a search window in a tracking mode for a detecting image.
Figure 22:
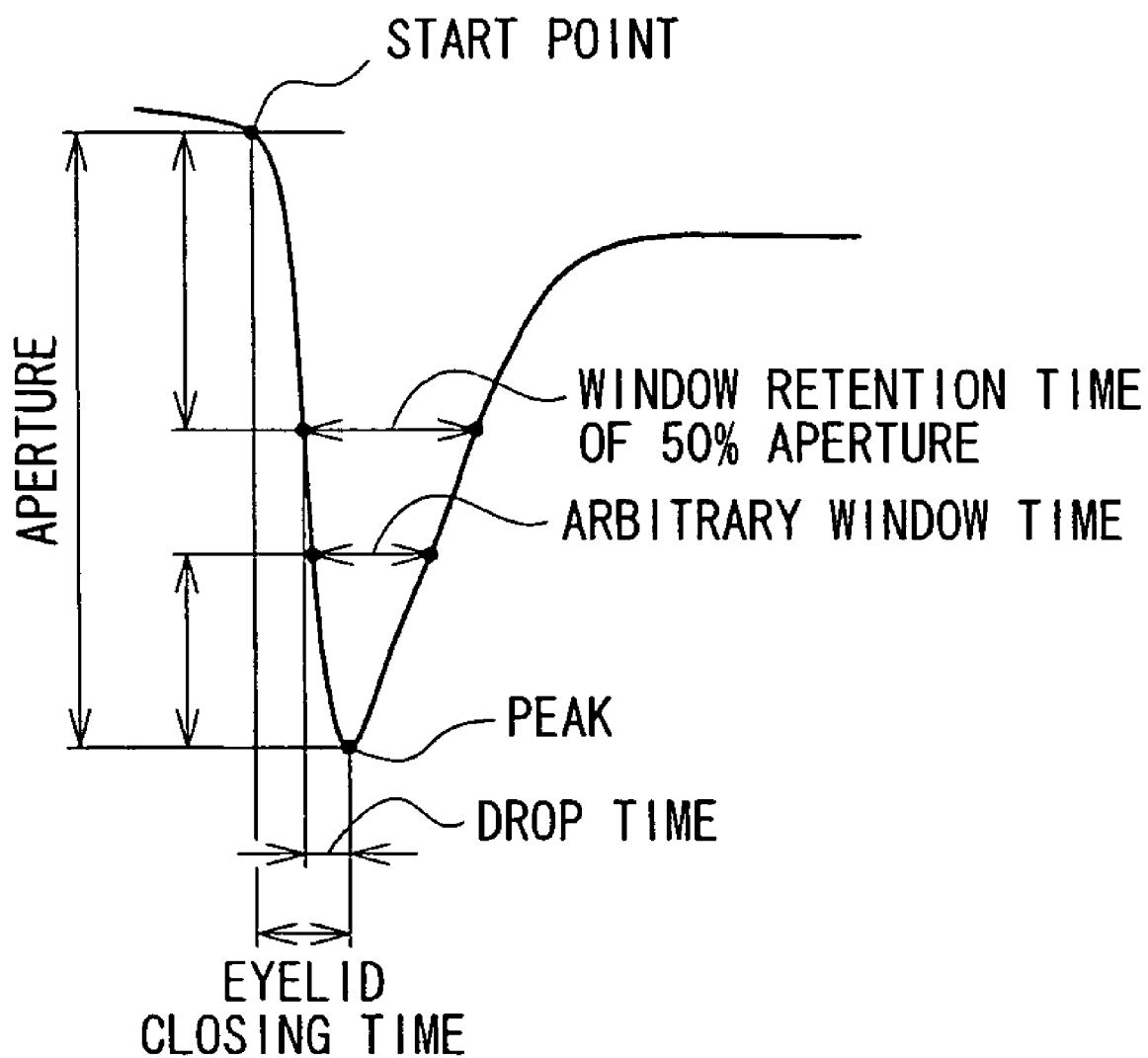
FIG. 22 shows an electro-oculogram waveform for classifying an arousal state for one blink.
Figure 23:
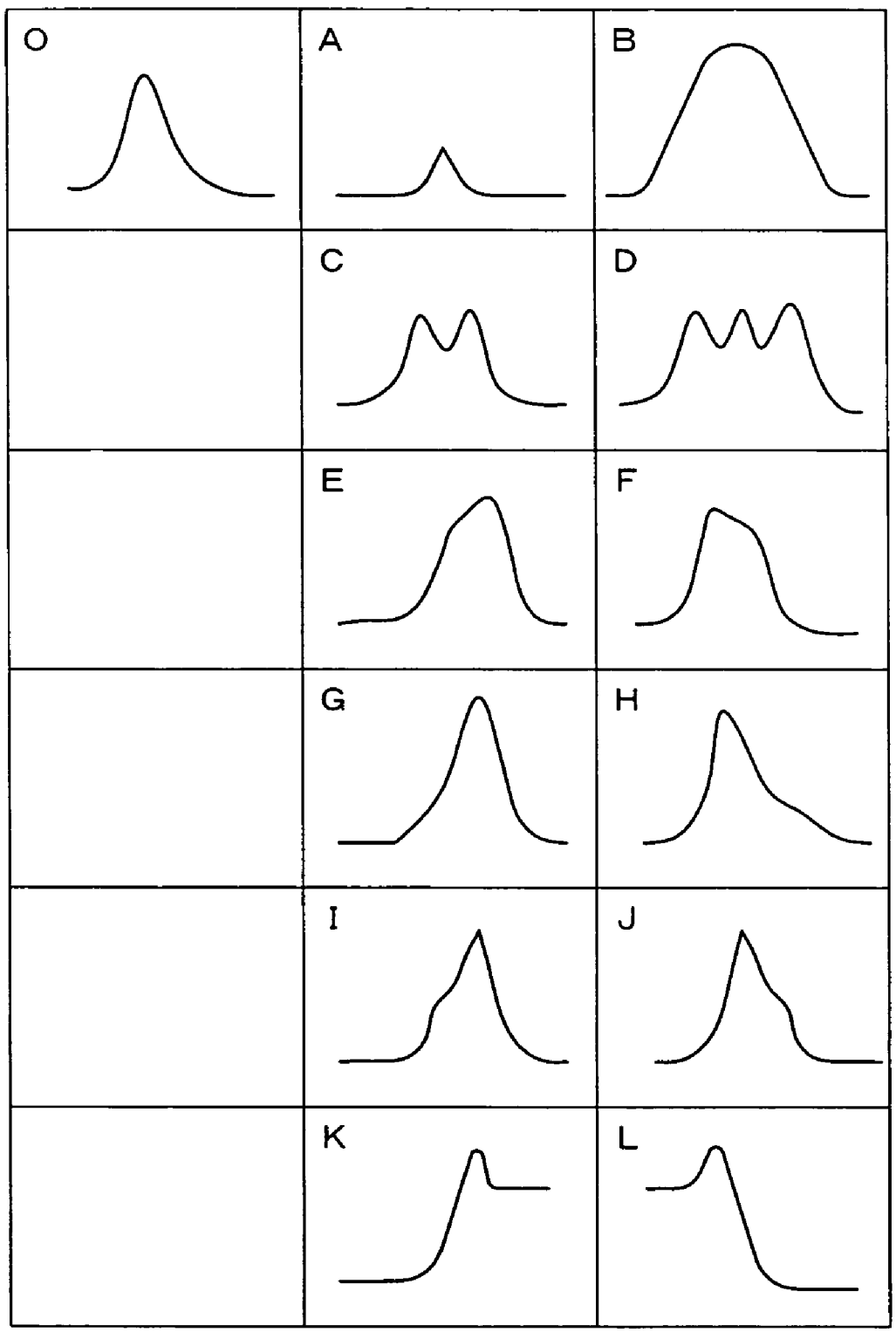
FIG. 23 shows a pattern of a blink waveform.
Figure 24:
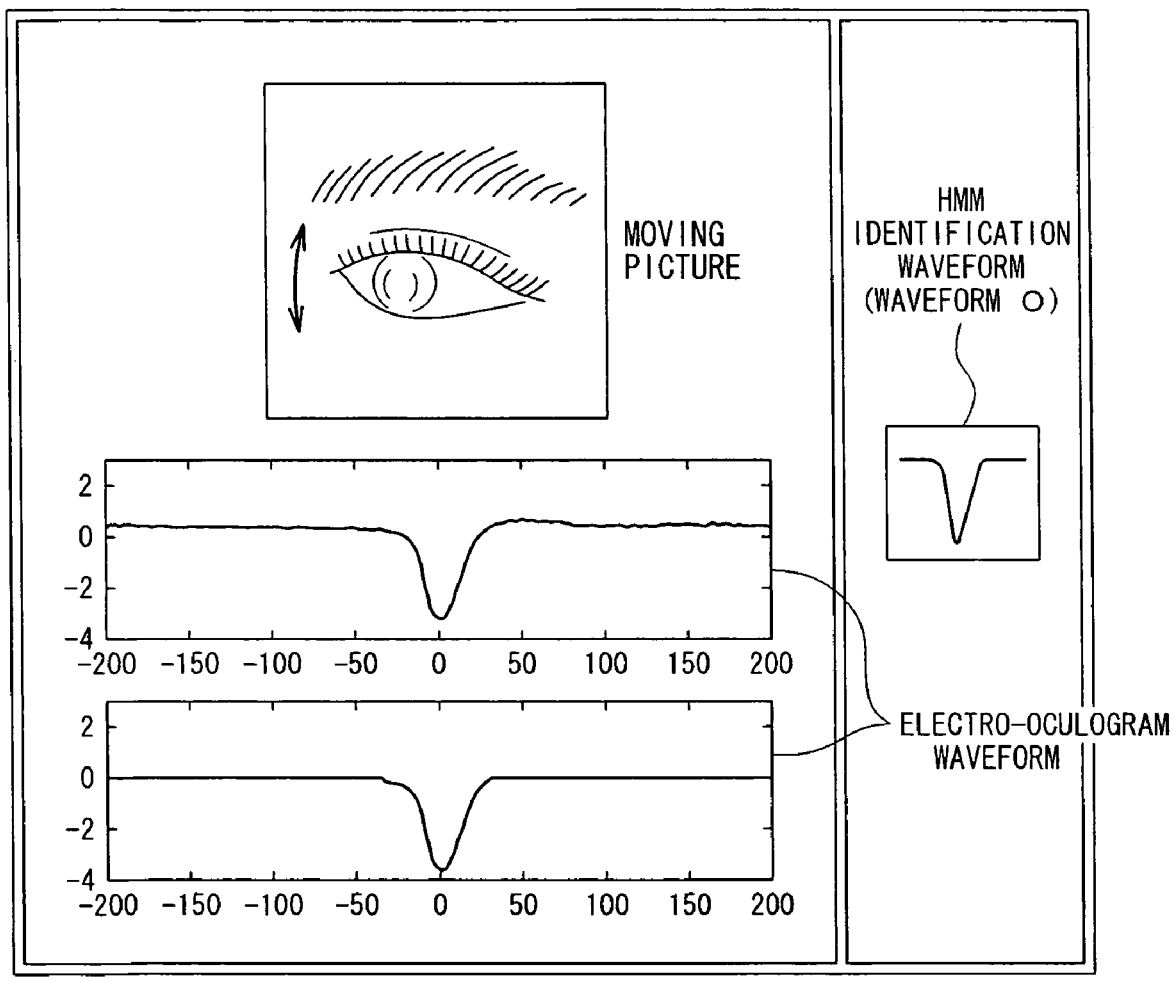
FIG. 24 shows a matching relationship between the output of an arousal state classifying HMM for the waveform O in FIG. 23 and the electro-oculogram waveform.
Figure 25:
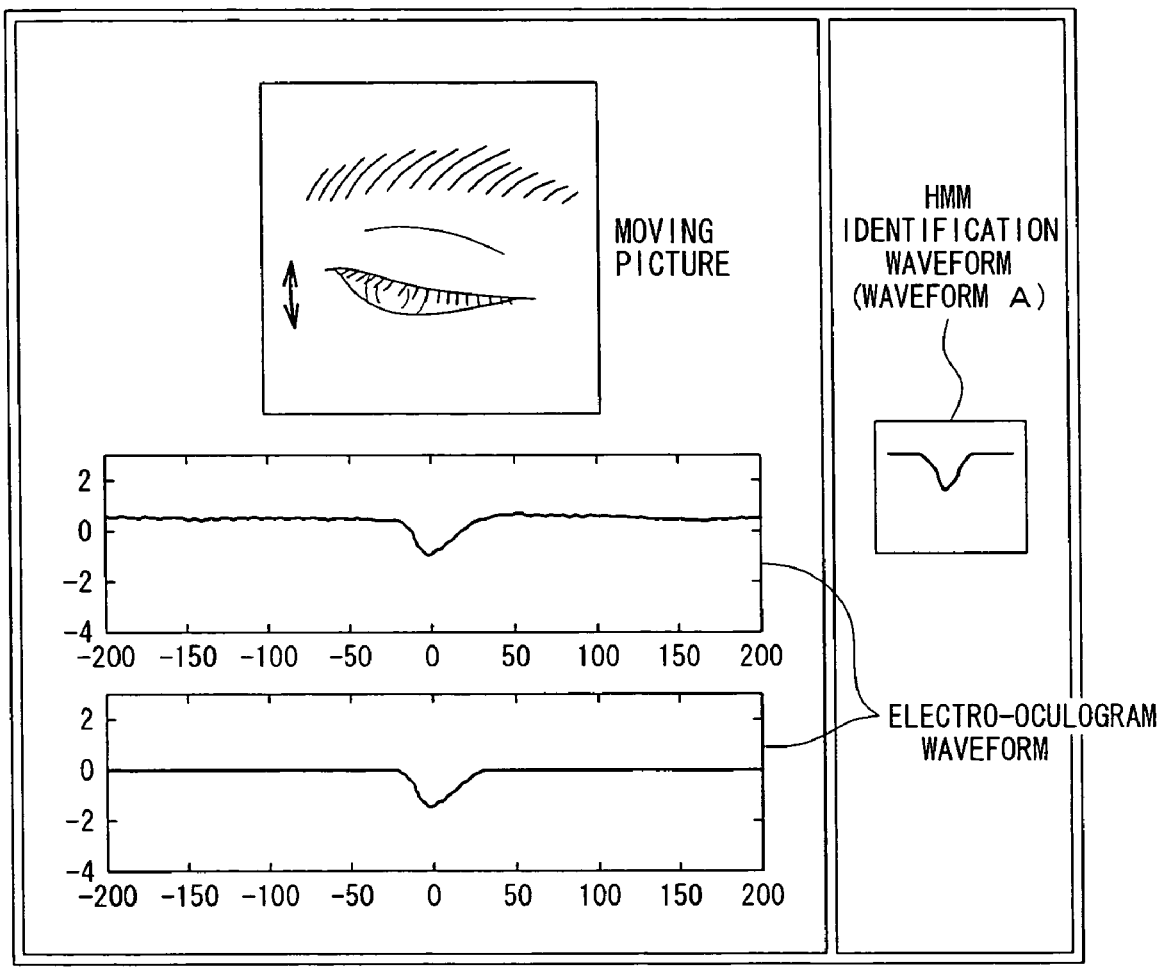
FIG. 25 shows a matching relationship between the output of an arousal state classifying HMM for the waveform A in FIG. 23 and the electro-oculogram waveform.
Figure 26:
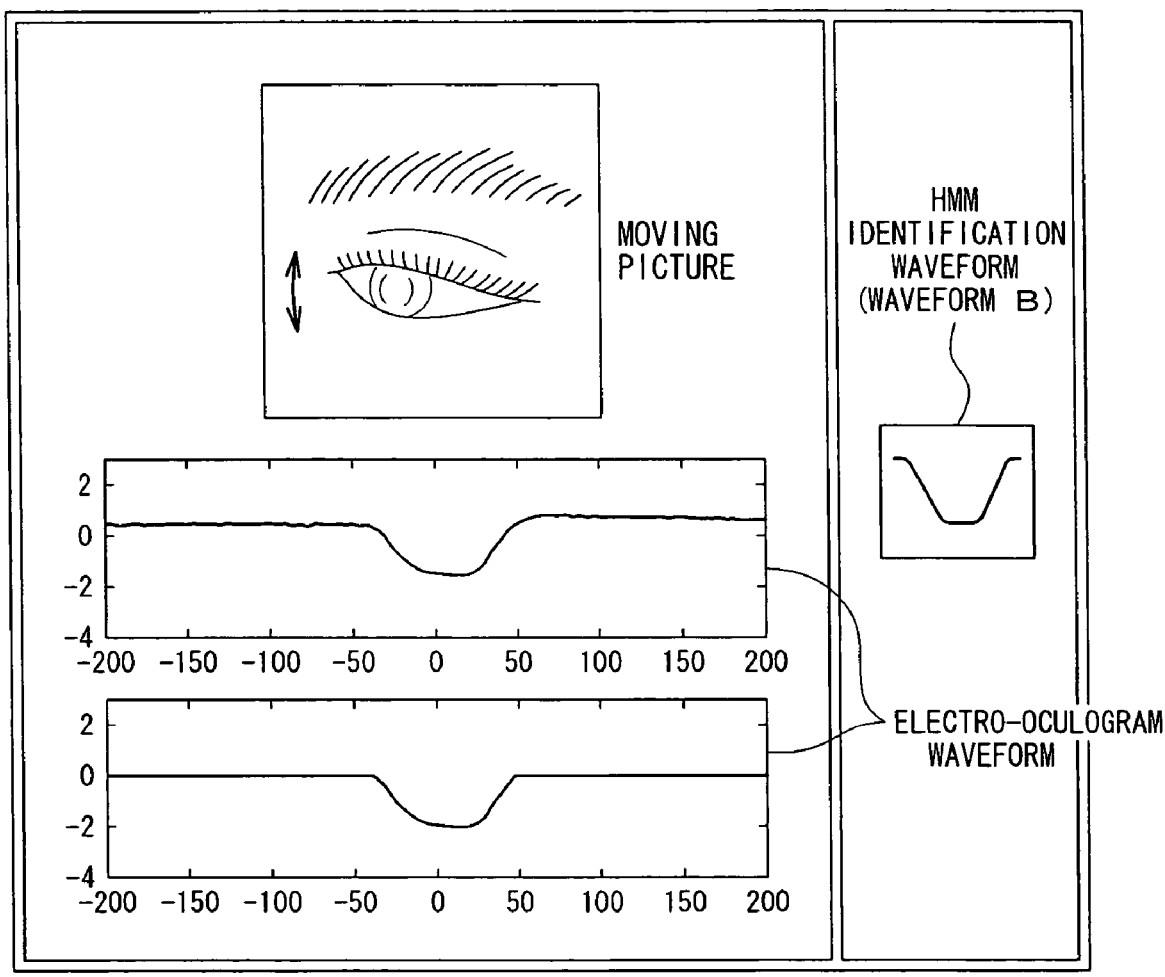
FIG. 26 shows a matching relationship between the output of an arousal state classifying HMM for the waveform B in FIG. 23 and the electro-oculogram waveform.
Figure 27:
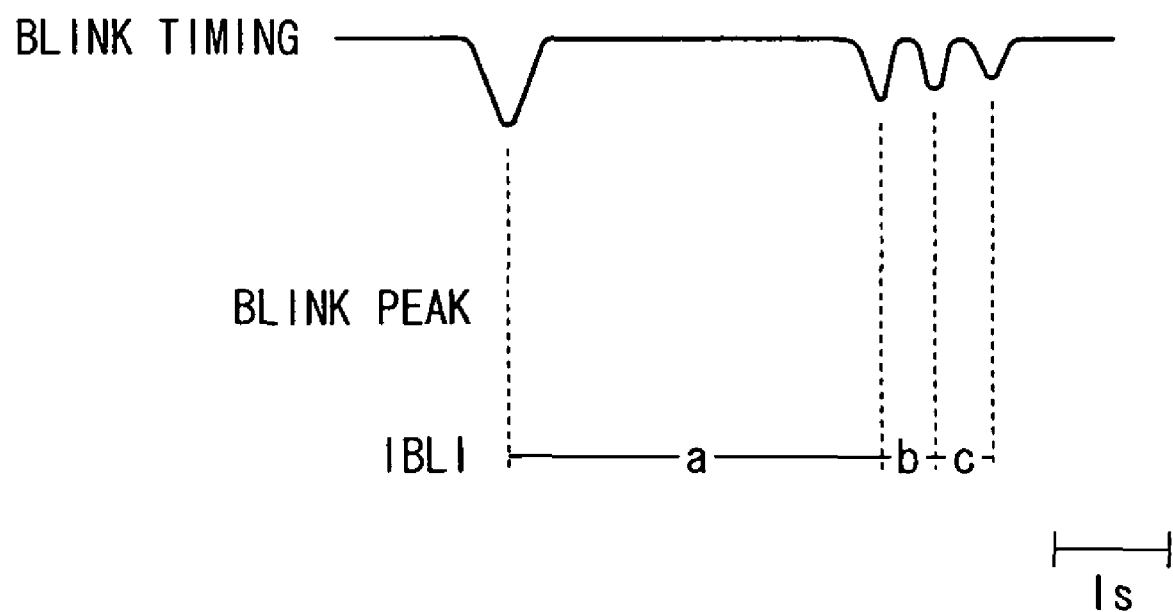
FIG. 27 shows an example of an interval of a blink and a burst waveform pattern.

A more practical operation of the arousal state classification device 2 is explained below by referring to FIGS. 21A to 21C and 22 to 27. FIG. 21A shows an example of a captured image, FIG. 21B shows a search area and a search window in a detection mode for a detecting image, and FIG. 21C shows a search area and a search window in a tracking mode for a detecting image. FIG. 22 shows an electro-oculogram waveform for classifying an arousal state for one blink; FIG. 23 shows a pattern of a blink waveform. FIG. 24 shows a matching relationship between the output of an arousal state classifying HMM for the waveform O in FIG. 23 and the electro-oculogram waveform. FIG. 25 shows a matching relationship between the output of an arousal state classifying HMM for the waveform A in FIG. 23 and the electro-oculogram waveform. FIG. 26 shows a matching relationship between the output of an arousal state classifying HMM for the waveform B in FIG. 23 and the electro-oculogram waveform. FIG. 27 shows an example of an interval of a blink and a burst waveform pattern.

When the arousal state detecting process is started, the arousal state classification device 2 first captures an image including the entire face of the object person to be captured at the wheel of the vehicle (driver) as shown in FIG. 21A using a CCD camera attached to the inner mirror in the image capturing unit 10, and stores the captured image data in the data storage unit 31 in the order in which it is captured in a frame unit (1/30 second in this example). In the mode for embodying the present invention, it is assumed that the captured image is a color image. The data storage unit 31 notifies the image processing unit 32 of the storage of data when the captured image data is stored.

Upon receipt of a notification from the data storage unit 31, the image processing unit 32 reads the captured image data from the data storage unit 31, and performs the process of reducing an image size by sub-sampling on the read image data. For example, assuming that the captured image is a full-color image of the size of 640×480 (vertical size×horizontal size) pixels, the vertical and horizontal sizes of the image are respectively ⅛ times sub-sampled into an 80×60 (vertical size×horizontal size) pixel size image. The sub-sampling process is performed by, for example, dividing a 640×480 pixel captured image into a 80×80 pixel rectangular area unit, and replacing each rectangular area with a pixel having an average value of the brightness values of the rectangular areas as a brightness value. Thus, the number of pixels can be reduced to 1/64. Thus, the generated detecting image is transmitted to the eye region detection unit 33.

When the eye region detection unit 33 acquires a detecting image from the image processing unit 32, it enters the detection mode and scans the entire face image area in the 20×20 pixel search window on the entire 80×60 pixel detecting image in the above-mentioned first mode for embodying the present invention. Furthermore, the pixel value of the scanned 20×20 pixels, that is, 400 pixels, is input as a 400-dimensional value to the entire face detecting SVM. In the entire face detecting SVM, a learning process is performed in a state in which the entire face class and non-entire face class can be discriminated in the 400 dimensional space, and the similarity of the classes is determined by the distance (Euclid distance, etc.) between the classifying hyper plane and an input value, and the 20×20 pixel area image having the highest similarity is detected as an image area of the entire face. When the entire face image area 200 is detected, in the method similar to the method according to the first mode for embodying the present invention, a 10×20 pixel search area 26 including the upper half image area (area including the left eye) of the entire face image area 200 is set, and the left eye region is scanned in a 4×8 (vertical size×horizontal size) pixel search window 27 on the set search area. That is, a practical image is expressed as shown in FIG. 21B. Then, the pixel value of 4×8 pixels, that is, a total of 32 pixels, is input as a 32-dimensional value to the left eye region detecting SVM. In the left eye region detecting SVM, a learning process is performed in a state in which the left eye region class and non-left eye class can be discriminated in the 32 dimensional space, and the similarity of the classes is determined by the distance (Euclid distance, etc.) between the classifying hyper plane and an input value, and the 4×8 pixel area image having the highest similarity is detected as a left eye region image. Furthermore, when the left eye region image is detected, the positional relation information (coordinates information) is acquired, and the system enters the tracking mode for the detecting image in the next frame.

When the eye region detection unit 33 enters the tracking mode, it sets a 15×15 pixel search area 28 by expanding the area from the position coordinates of the left eye region image detected in the previous frame five pixels each in the vertical and horizontal directions in the method similar to that in the first mode for embodying the present invention for the detecting image in the next frame, and scans the left eye region in the 4×8 pixel search window on the set search area. The actual image is shown in FIG. 21C. The 32 pixel value of scanned 4×8 pixels, is input to the left eye region detecting SVM as in the detection mode, thereby performing the process of detecting a left eye region. When the left eye region is detected, the central coordinates of the left eye region are transmitted to the feature extraction unit 34 in the present mode for embodying the present invention. In the tracking mode, the mode is maintained while the left eye region is successfully detected. When the left eye region is not successfully detected, the unit enters the face detection mode.

When the feature extraction unit 34 acquires the central coordinates of the left eye region image in the detecting image in each frame from the eye region detection unit 33, it clips a 4×8 pixel of left eye region image with the acquired central coordinates set as the center from the corresponding captured image stored in the data storage unit 31. Then, the discrete Fourier transform is performed by a FFT, etc. on the left eye region image of the clipped frame. The difference value between the coefficient of the real portion after the transform and the coefficient of the real portion after the discrete Fourier transform on the left eye region image in the immediately previous frame is obtained as features. Other feature can be a frequency spectrum component obtained by performing a Fourier transform on the left eye region image, a logarithmic component to the frequency spectrum obtained by performing a Fourier transform on the left eye region image, an inter-frame difference component between the previous and subsequent frames to the frequency spectrum obtained by performing a Fourier transform on the left eye region image, a MEL cepstrum (MFCC) component for a left eye region image, an intra-frame moment component for the left eye region image, an inter-frame moment component for a left eye region image, an intra-frame moment component for a frequency spectrum obtained by performing a Fourier transform on a left eye region image, an inter-frame moment component for a frequency spectrum obtained by performing a frame conversion on a left eye region image, or a combination of them, etc. They are appropriately used depending on the configuration of the system, etc.

In the present mode for embodying the present invention, obtained features are computational-complexity-reduced, and dimension-reduced by principal component analysis to remove unnecessary information for identification as in the first mode for embodying the present invention. The above-mentioned features are extracted for each frame, and the extracted features are grouped as a set of a predetermined number (for example, 10 frames) in the order in which images are captured, and are transmitted to the arousal state classification unit 35. By using a predetermined number of frames (for example, 10 frames) as a set, features for an image of one blink is included.

When the arousal state classification unit 35 acquires a predetermined frames (for example, 10 frames) as a set from the feature extraction unit 34, it inputs the features to the arousal state classifying HMM.

By referring FIGS. 22 and 23, the characteristic of a blink effective in classifying an arousal state is explained below. As an element for identification of the characteristic of a blink, as shown in FIG. 22, there is included in the electro-oculogram waveform of one blink the aperture, the time required from the state in which the eyelids are open (start point shown in FIG. 22), then close (peak shown in FIG. 22), and then open again (blink speed), the blink speed in the position of the aperture of 50% (window duration time with aperture of 50% shown in FIG. 22), the time required from the state in which the eyelids are open (start point shown in FIG. 22) and then close (eyelid closing time shown in FIG. 22), the time required from the position of the aperture of 50% to the closing of eyelids (dropping time shown in FIG. 22), etc. Furthermore, in the physiology, as the electro-oculogram waveform for a blink, there are various blink waveforms confirmed as a waveform O as a standard blink waveform in the arousal state of a person as shown in FIG. 23, a waveform A to waveform L other than the standard waveform O, etc. In these waveforms, the typical waveforms in classifying a specifically sleepy state (hereinafter referred to as a sleepy state) are the waveform A and waveform B. Based on the aperture and the blink speed of each blink, a classification of the waveform A or B is made, the occurrence pattern, an occurrence frequency, etc. are analyzed, thereby classifying the arousal state of an object person with high accuracy.

Therefore, in the present mode for embodying the present invention, an arousal state detecting HMM having as input the features extracted by the feature extraction unit 34, and a likelihood corresponding to a total of four types blink waveforms (waveforms C to L) including the standard blink waveform O, the blink waveform A, the blink waveform B, and other blink waveform as output is prepared. That is, for a blink picture (moving picture) corresponding to one blink for the left eyes of unspecified general persons, a label is attached with the aperture and speed of a blink (classification into waveforms O, A, B, and others (waveforms C to L), and a learning process is performed with an HMM using as learning data the features extracted from the left eye region image detected based on the pictures, and four types of HMMs that can identify the four types of waveforms (HMMs corresponding one to one to each waveform) are generated.

The arousal state classification unit 35 inputs a set of features of a predetermined number of frames (for example, 10 frames) acquired from the feature extraction unit 34 for the four types of arousal state detecting HMMs generated as described above, checks whether or not each HMM corresponding to any of the four types of blink waveforms outputs the highest likelihood, and determines the blink waveform having the highest output likelihood as a waveform of one blink of an object person to the input features.

By referring to FIGS. 24 to 26, the effectiveness of identification of the above-mentioned waveforms O, A, and B using the arousal state detecting HMMs is explained below. In FIGS. 24 to 26, an object person actually attaches an electrode to the right and left eyes at their electro-oculogram waveform measurement positions, an electro-oculogram waveform obtained when an electro-oculogram change for one blink is measured, and the left eye region image for one blink are detected from the captured image of the object person using the method according to the present invention, the detected features for a blink of the left eye region image is input to each of the four types of arousal state detecting HMM, and the waveform corresponding to the HMM indicating the highest likelihood in the output. The screens shown in FIGS. 24 to 26 are the screens of detecting application software, the measured waveform of the electro-oculogram potential (electro-oculogram waveform) of the right and left eyes is displayed under the moving pictures in accordance with the moving picture (only left eye) of a blink display at the upper portion of the screen, and the information about the identification result of any of the four waveforms of O, A, B, and other waveforms identified by applying the present invention to the blink moving pictures is displayed at the right side of the screen. FIG. 24 shows a screen displaying the electro-oculogram waveform obtained when a blink classified into a standard blink is made by an object person, and a waveform identified by an arousal state classifying HMM. For the features extracted from the pictured of the blink, the arousal state classifying HMM displays the waveform O (normal blink waveform) as an identification result as shown on the right of the screen shown in FIG. 24, and the type of the blink waveform of the object person can be correctly identified. Similarly, FIGS. 25 and 26 respectively show the electro-oculogram waveform which is a typical blink waveform in classification of a sleepy state when an object person makes a blink classified into the waveforms A and B, and the waveform identified by the arousal state classifying HMM for the features extracted from the pictures of the blink at this time. As shown in FIGS. 25 and 26, the waveforms A and B are displayed as an identification result of the arousal state classifying HMM, thereby correctly identifying the type of the blink waveform of an object person.

By identifying a blink waveform as shown in FIGS. 24 to 26 for many object persons, a 99% classification accuracy can be obtained for the blink classified into the standard blink (waveform O), an classification accuracy of 84% can be obtained for the blink classified into the waveform A that is a typical blink in detecting the sleepy state, and an classification accuracy of 79% can be obtained for the blink classified into the waveform B.

Therefore, it is effective to identify a blink waveform for one blink from the left eye region image of an object person to be acquired using the arousal state classifying HMM without applying an electrode for measuring an electro-oculogram waveform and without touching the object person to be captured.

Furthermore, when the type of blink waveform is determined, the arousal state classification unit 35 analyzes the occurrence pattern, occurrence frequency, etc. of each waveform together with the previously defined blink waveform, and classifies the arousal state (awake state, sleepy state, sleeping state, etc.) of an object person based on the analysis result. In the present mode for embodying the present invention, the identification result of each blink waveform is handled in the histogram process in a predetermined time unit, thereby detecting the occurrence frequency and change of four blink patterns, and estimating the arousal state of the object person. Practically, it is classified that the arousal state indicates a low level (the object person becomes very sleepy) when the occurrence frequency of the waveforms A to L becomes high. Additionally, as shown in FIG. 27, in the physiology, it is known that there are frequency occurrences of blinks when the sleepy level rises. Therefore, in the present mode for embodying the present invention, the occurrence intervals of the identified four types of blink waveforms are obtained, and when the frequency of the successive occurrence of blinks rises, it is also classified that the arousal state indicates a low level (the object person becomes very sleepy). The information about the classification result from such a classification (estimate) is output to the alarm system not shown in the attached drawings.

Figure 28:
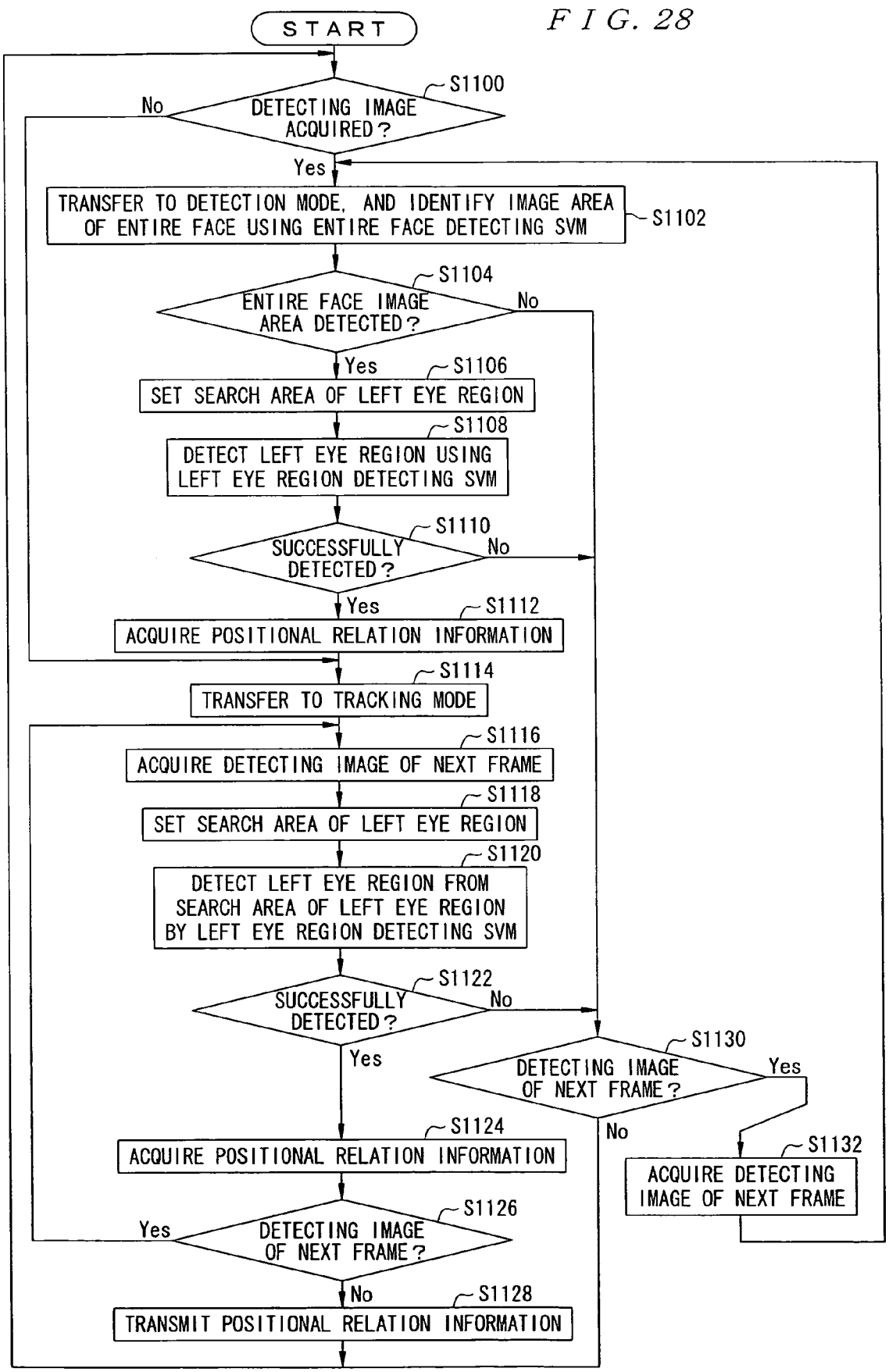
FIG. 28 is a flowchart of the process of detecting a left eye region in the eye region detection unit 33.

Furthermore, by referring to FIG. 28, the flow of the process of detecting a left eye region in the eye region detection unit 33 is described. FIG. 28 is a flowchart of the process of detecting a left eye region in the eye region detection unit 33.

As shown in FIG. 28, control is first passed to step S1100, it is classified whether or not a detecting image has been acquired from the image processing unit 32. If it is classified that the image has been acquired (YES), control is passed to step S1102. Otherwise (NO), the system enters the standby state until the image is acquired.

When control is passed to step S1102, the system enters the detection mode, the identification process is performed using the entire face detecting SVM on the area scanned in a 20×20 pixel search window in the detecting image, thereby passing control to step S1104.

In step S1104, it is classified whether or not the image area of the entire face has been detected in the identification process in step S1102. If it is classified that the area has been detected (YES), control is passed to step S1106. Otherwise (NO), control is passed to step S1130.

When control is passed to step S1106, a 10×20 pixel search area as eye region is set for a detecting image including the upper half area in the entire face area image, thereby passing control in step S1108.

In step S1108, the identification process is performed using the left eye region detecting SVM on the area scanned in the 4×8 pixel search window in the search area set in step S1106, thereby passing control to step S1110.

In step S1110, it is classified whether or not the left eye region has been successfully detected in the identification in step S1108. If it is classified that it has been successfully detected (YES), control is passed to step S1112. Otherwise (NO), control is passed to step S1130.

When control is passed to step S1112, the positional relation information about the left eye region detected in step S1110 is acquired, thereby passing control to step S1114.

In step S1114, the detection mode is switched to the tracking mode, and control is passed to step S1116.

In step S1116, the image data in the next frame of the detecting image from which the left eye region has been detected in step S1110 is acquired, thereby passing control to step S1118.

In step S1118, according to the positional relation information about the left eye region in the detecting image in the immediately previous frame, a 15×15 pixel search area as a left eye region is set, thereby passing control to step S1120.

In step 1120, the identification process is performed using the left eye region detecting SVM on the area scanned in the 4×8 pixel search window in the 15×15 pixel search area set in step S1118, thereby passing control to step S1122.

In step S1122, it is classified whether or not the left eye region has been successfully detected in the identification in step S1120. When it is classified that the region has been successfully detected (YES), control is passed to step S1124. Otherwise (NO), control is passed to step S1130.

When control is passed to step S1124, the positional relation information about the left eye region detected in step S1122 is acquired, thereby passing control to step S1126.

In step S1126, it is classified whether or not there is a detecting image in the next frame. If it is classified that there is the image (YES), control is passed to step S1116. Otherwise (NO), control is passed to step S1128.

When control is passed to step S1128, the acquired positional relation information is transmitted to the feature extraction unit 34, thereby passing control to step S1100.

When control is passed to step S1130, it is classified whether or not there is a detecting image in the next frame. If it is classified there is the image (YES), control is passed to step S1132. Otherwise (NO), control is passed to step S1100.

When control is passed to step S1132, the detecting image data in the next frame is acquired, thereby passing control to step S1102.

Figure 29:
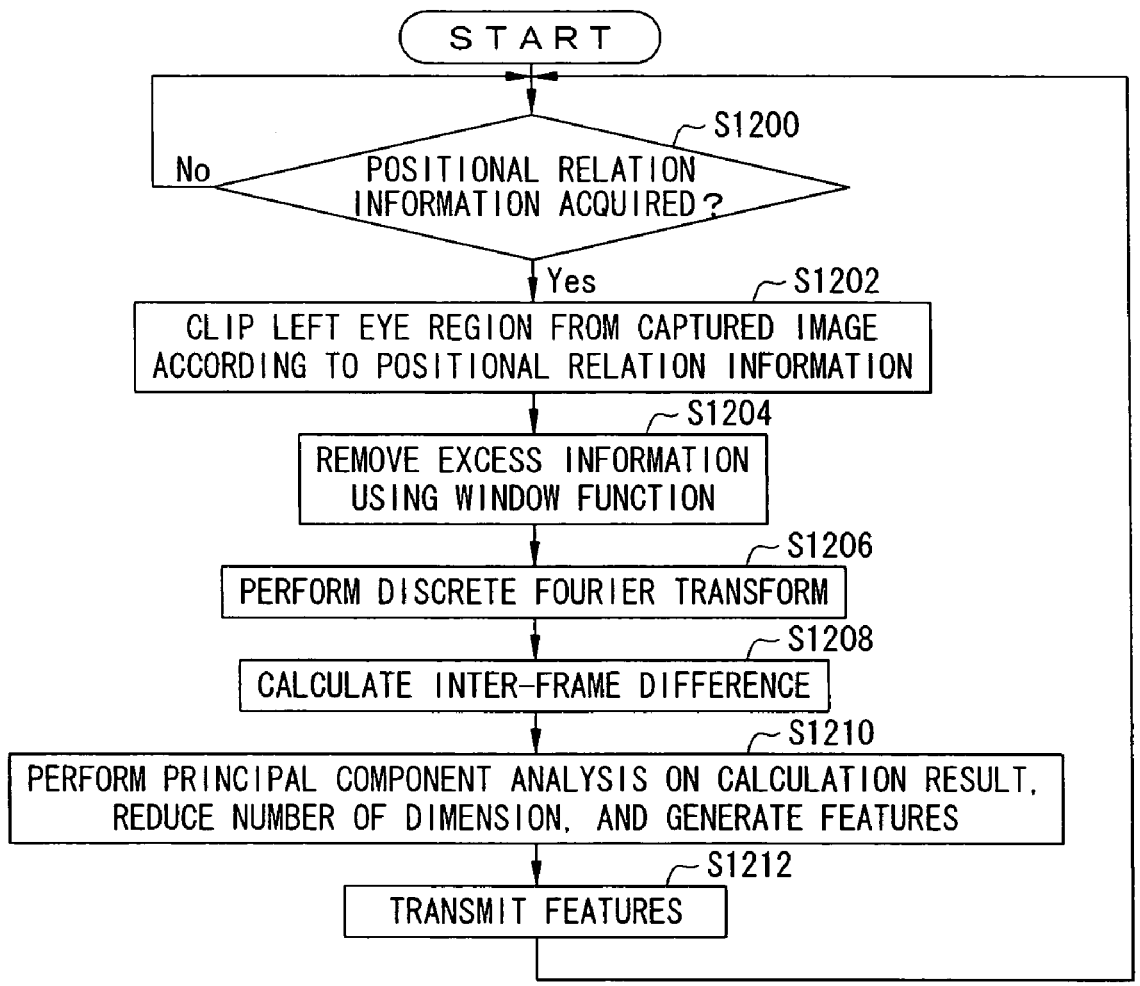
FIG. 29 is a flowchart of the process of extracting features in the feature extraction unit 34.

Furthermore, by referring to FIG. 29, the flow of the process of extracting features in the feature extraction unit 34 is explained below. FIG. 29 is a flowchart of the process of extracting features in the feature extraction unit 34.

As shown in FIG. 29, control is first passed to step S1200, it is classified whether or not the positional relation information has been acquired from the eye region detection unit 33. If it is classified that the information has been acquired (YES), control is passed to step S1202. Otherwise (NO), the system enters the standby state until the information is acquired.

When control is passed to step S1202, an image of the left eye region is clipped according to the positional relation information acquired from the captured image stored in the data storage unit 31, thereby passing control to step S1204.

In step S1204, the process of reducing the influence of an image other than the left eye such as the right eye, eyebrow, etc. using a window function, thereby passing control to step S1206.

In step S1206, a discrete Fourier transform is performed on the image processed using a window function, an amplitude spectrum of the left eye region image is obtained, thereby passing control to step S1208.

In step S1208, the difference in coefficient of a real part between the amplitude spectrum obtained in step S1206 and the amplitude spectrum in the immediately previous frame is calculated, thereby passing control to step S1210.

In step S1210, the principal component analysis is performed on the difference in coefficient of a real part calculated in step S1208, the number of dimensions of the coefficient of the real part is reduced and features is generated, thereby passing control to step S1212.

In step S1212, the predetermined number of frames (for example, 10 frames) of the generated features are prepared as a set and transmitted to the arousal state classification unit 35, thereby passing control to step S1200.

Figure 30:
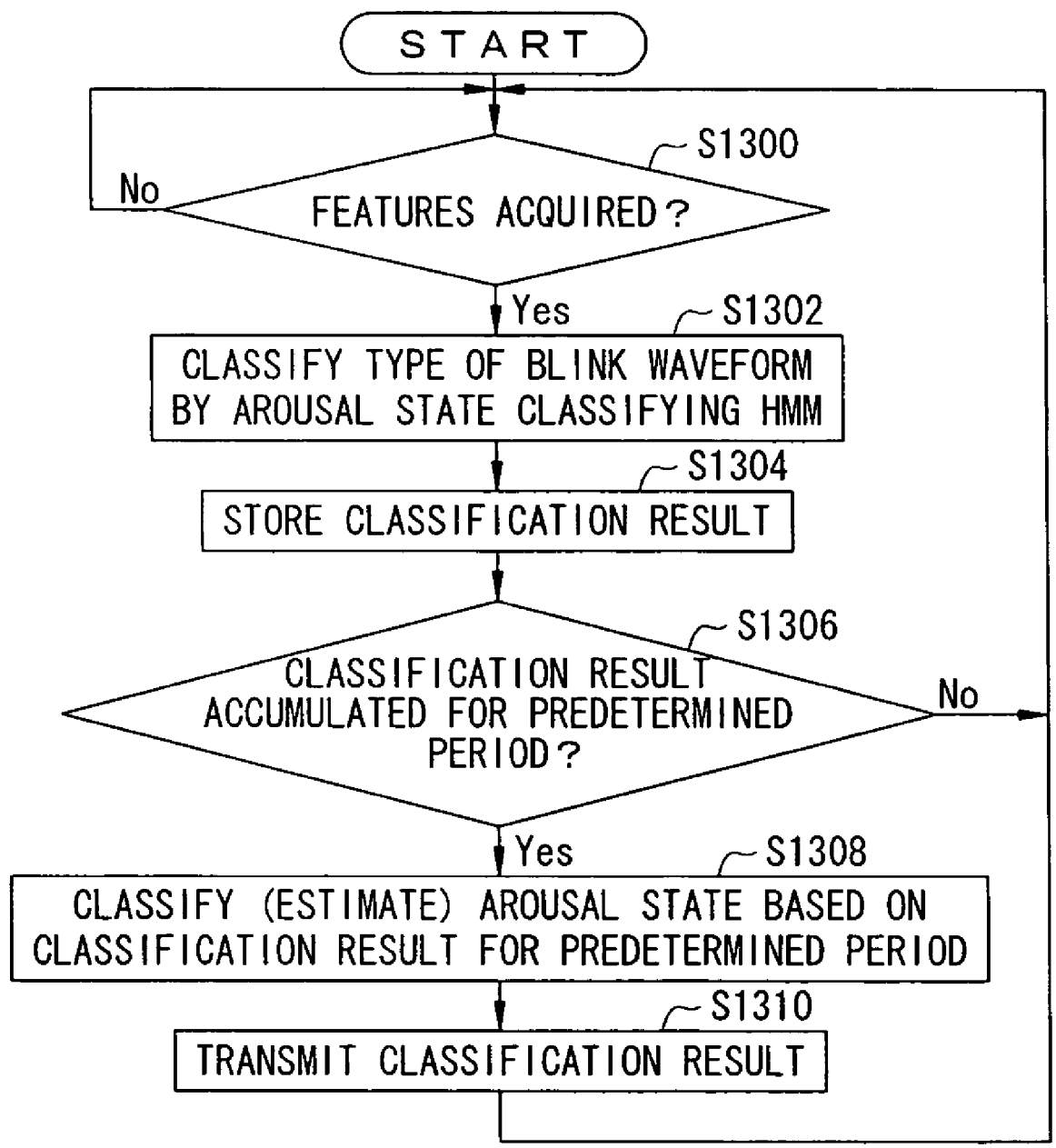
FIG. 30 is a flowchart of the process of classifying the arousal state in the arousal state classification unit 35.
Figure 31:
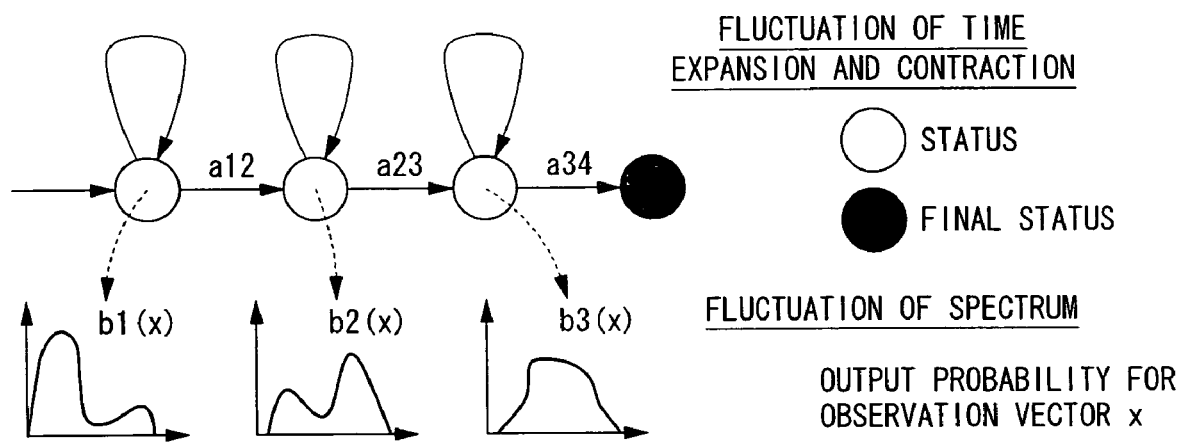
FIG. 31 shows an example of an HMM and envelope of spectrum corresponding to each state of the HMM.

Additionally, by referring to FIG. 30, the flow of the process of classifying the arousal state in the arousal state classification unit 35 is explained. FIG. 30 is a flowchart of the process of classifying the arousal state in the arousal state classification unit 35.

As shown in FIG. 30, control is first passed to step S1300, it is classified whether or not the features have been acquired from the feature extraction unit 34. If it is classified that the amount has been acquired (YES), control is passed to step S1302. Otherwise (NO), the system enters the standby state until the amount is acquired.

When control is passed to step S1302, a predetermined number of frames (for example, 10 frames) of a set of features are input to the four types of HMMs for identification of the above-mentioned four types of blink waveforms, and the type of various blink waveforms are classified for each predetermined number of frames based on the likelihood of these four types of HMMs, thereby passing control to step S1304.

In step S1304, the classification result in step S1302 is stored in the data storage unit 31 in the order in which it is classified, thereby passing control to step S1306.

In step S1306, it is classified whether or not the classification result for a predetermined period has been stored in the data storage unit 31. If it is classified that the result has been stored (YES), control is passed to step S1308. Otherwise (NO), control is passed to step S1300.

When control is passed to step S1308, based on the classification result of a predetermined period, the arousal state is classified, and control is passed to step S1310. The classification of the arousal state is based on the classification result of the blink waveform of a predetermined period, each waveform pattern is handled in the histogram process, thereby performing classification by obtaining the occurrence frequency change of each blink waveform pattern. For example, when the occurrence frequency of an important waveform pattern for classification of a sleeping state for the waveforms other than a normal blink waveform O is high, it is classified that the object person has become sleepy. Also to improve the classification accuracy, frequency of a blink waveform is checked and if the frequency of successive occurrences of blink waveforms is enhanced, it is also classified that the object person is in the very sleepy state.

In step 1310, the classification result in step S1308 is transmitted to the alarm system, thereby terminating the process.

As described above, the arousal state classification device 2 according to the present variation example can capture an image including the face of an object person to be captured at the wheel using the image capturing unit 30, store a arousal state classifying HMM corresponding to plural types of blink waveforms of an object person to be captured, captured image data, etc. using the data storage unit 31, reduce the size of the captured image data by sub-sampling to generate a detecting image using the image processing unit 32, detect a left eye region from a detecting image using an entire face detecting SVM and left eye region detecting SVM using the eye region detection unit 33, clip the left eye region image from the original captured image based on the positional relation information about the detected lip region, and extract features from the clipped left eye region image using the feature extraction unit 34, and classify a type of blink waveform using an arousal state classifying HMM using the arousal state classification unit 35, and perform an analysis process based on the classification result of the blink waveform in a predetermined period, thereby classifying the arousal state of the object person. In the above-mentioned second mode for embodying the present invention, the left eye region of an object person to be captured is detected and the arousal state is classified, but the right eye region or both eye region of the object person to be captured can be detected depending on the acquisition environment and the type of applied system, etc to classify the arousal state.

In the above-mentioned mode for embodying the present invention, the process of acquiring image data of an object person to be captured by the image capturing unit 30 and the data storage unit 31 corresponds to the image capturing means according to the disclosed embodiments.

In the above-mentioned mode for embodying the present invention, the process of detecting the left eye region from a captured image by the image processing unit 32 and the eye region detection unit 33 corresponds to the face portion detection means according to the disclosed embodiments.

In the above-mentioned mode for embodying the present invention, the process of acquiring the positional relation information by the eye region detection unit 33 corresponds to the positional relation information acquisition means according to the disclosed embodiments.

In the above-mentioned mode for embodying the present invention, the feature extraction unit 34 corresponds to the feature extraction means according to the disclosed embodiments.

In the above-mentioned mode for embodying the present invention, the arousal state classification unit 35 corresponds to the behavior content classification means according to the disclosed embodiments.

In the first mode for embodying the present invention and a variation example of the first mode for embodying the present invention, a speech section is detected and a speech content is detected from a lip region image detected from a captured image, but the present invention is not limited to this application, and the behavior such as chewing gum, making a yawn, etc. can be classified.

The function of the speech section detection device 1 of the above-mentioned first mode for embodying the present invention and a variation example according to the first mode for embodying the present invention, and the function of the arousal state classification device 2 of the second mode for embodying the present invention can be combined to classify not only a blink, but also the behavior contents such as a yawn, etc. to classify the arousal state with high accuracy. Thus, depending on the classification result, a support for safe driving can be appropriately performed by giving a sound alarm to a driver of a vehicle, etc.

In the first and second modes for embodying the present invention, a lip region image is detected from a captured image to classify the behavior content (speech section) relating to the movement of lips, and an image of eyes is detected from a captured image to classify, the behavior content (drowsy driving, etc.) relating to the movement of eyes but the present invention is not limited to this application, and other portions constituting the face such as a nose, an eyebrow, etc. can be detected to classify the behavior content relating to them.

In the second mode for embodying the present invention, the face direction of an object person is not considered as in a variation example of the first mode for embodying the present invention, but the present invention is not limited to this application, and the face direction of an object person is considered, an arousal state classifying HMM corresponding to each face direction is prepared, face direction is classified, an HMM corresponding to the face direction classified from the HMM is selected, the selected HMM is used, and the type of blink waveform of an object person can be classified. As a result, the type of wave form can be classified with high accuracy.

INDUSTRIAL APPLICABILITY

As explained above, according to the behavior content classification device according to an embodiment of the present invention, using a well known HMM, the behavior content relating to the movement of a predetermined portion having a time concept can be classified. Therefore, the behavior content can be classified with higher accuracy.

According to the behavior content classification device according to an embodiment, since the predetermined portion is detected using the SVM, a predetermined portion can be detected from various captured images with high accuracy. Additionally, since the behavior content relating to the movement of a predetermined portion with a time concept can be classified by using the well known HMM in classifying the behavior content, the behavior content can be classified with higher accuracy.

According to the behavior content classification device according to an embodiment, in addition to the corresponding effect according to other disclosed embodiments, by changing the size of the image area of a predetermined portion to be detected depending on the face direction, it is not necessary to perform a process of extracting features of an image of unnecessary portion, thereby increasing the speed of the extracting process.

According to the behavior content classification device according to an embodiment, in addition to the effect of any one the disclosed embodiments, the behavior content relating to the movement of a predetermined portion can be classified with higher accuracy from the features depending on the various face directions in an image of the predetermined portion whose shape changes depending on various face directions.

According to the behavior content classification device according to an embodiment, in addition to the effect according to the disclosed embodiments, the time resolution of the process of classifying behavior contents can be improved.

According to the behavior content classification device according to an embodiment, in addition to the effect according to the disclosed embodiments, the behavior content such as the speech, yawn, chewing gum, etc. of an object person can be classified.

According to the behavior content classification device according to an embodiment, in addition to the effect according to another disclosed embodiment, since the speech start point of an object person is separately classified based on the classification result as to whether or not it is a speech state by the HMM, it is possible to classify a speech section with high accuracy.

According to the behavior content classification device according to certain embodiments, in addition to the effect according to another disclosed embodiment, when the classification result indicates a practically impossible state (abnormal condition) such as the repetition of speech and non-speech as output of an HMM, the speech start point can be classified more correctly.

According to the behavior content classification device according to an embodiment, in addition to the effect according to the other disclosed embodiments, since the speech end point of the object person is separately classified based on the classification result, whether or not it is a speech state, by the HMM, the speech section can be classified with high accuracy.

According to the behavior content classification device according to certain embodiments, in addition to the effects according to the disclosed embodiments, when the classification result is practically impossible (abnormal condition) such as, for example, the repetition of speech and non-speech, the speech end point can be classified more correctly.

According to the behavior content classification device according to an embodiment, in addition to the effect according to the disclosed embodiments, it is possible to classify the behavior content such as drowsy state, etc.

According to the behavior content classification device according to an embodiment, in addition to the effect according to another disclosed embodiment, the type of the blink of an object person such as the speed of the blink, the closing level of the eyelid when a blink is made, etc can be classified with high accuracy.

According to the behavior content classification device according to an embodiment, in addition to the effect of another disclosed embodiment, in the case that the state of the eyes when a blink is made can be represented as, for example, an electro-oculogram waveform, the speed (change time of electro-oculogram potential) from the start to the end of the blink, and the type of aperture indicating the closing level of the eyelid when a blink is made can be classified with high accuracy.

According to the behavior content classification device according to an embodiment, in addition to the effect of another disclosed embodiment, from the type of the blink of the object person that can be classified from the speed of a blink, the closing level of the eyelid when a blink is made, the arousal state of the object person such as a vacant state, a drowsy state, etc. can be classified with high accuracy.

According to the behavior content classification device according to an embodiment, in addition to the effect according to another disclosed embodiment, it is necessary only to generate HMMs for specific types of blinks, and it is necessary only to perform a classifying process using specific types of HMMs. Therefore, the memory capacity required for the HMMs can be reduced and the classifying process can be performed at a high speed.

According to the behavior content classification device according to an embodiment, in addition to the effect according to another disclosed embodiment, the arousal state can be classified with high accuracy based on the change in the number of occurrences of the specific types of blinks in a predetermined time such as the number of occurrences of specific types of blinks, the frequency of a specific type of blink, etc.

According to the behavior content classification device according to an embodiment, since the state of a speech behavior with a time concept can be classified using an HMM, the speech content can be classified with high accuracy from the movement of the lips without voice information.

According to car navigation system according to an embodiment, it is possible to more correctly recognize the speech content of the object person in an environment of noise such as the music from a car stereo, road noise, the sound of wind, the sound of the engine, etc., and perform a predetermined operation such as searching a route, guiding along a route to the destination, etc. based on the recognition result.

According to the alarm system according to a disclosed embodiment, for example, when an object person is a driver of the vehicle, the drowsy state of the driver is classified and an alarm is raised to the driver, thereby preventing drowsy driving, etc.

The invention claimed is:

1. A behavior content classification device comprising:
   image capturing means for capturing a first image including a face of an object person, the first image comprising a second image including a predetermined portion of the face;
   feature extraction means for extracting features from the second image;
   a hidden Markov model (HMM) having as input the extracted features and having as output a likelihood for a predetermined behavior content relating to a movement of the predetermined portion; and
   behavior content classification means for calculating the likelihood using the extracted features and the HMM, and for classifying behavior content relating to the movement of the predetermined portion of the object person based on the calculation result,
   wherein:
      the image capturing means comprises:
         positional relation information acquisition means for acquiring positional relation information between the first image and the second image, and
         face direction classification means for classifying a face direction of the object person according to the positional relation information,
      the behavior content classification means further selects the HMM from among a plurality of candidate HMMs based on the classification result of the face direction classification means, the candidate HMMs being generated for a plurality of face directions, and the selected HMM corresponding to the face direction of face direction classification result.

2. The behavior content classification device according to claim 1, wherein:
   the second image includes an image of a lip portion of the object person; and
   the HMM includes a lip state classifying HMM.

3. The behavior content classification device according to claim 2, wherein:
   the lip state classifying HMM outputs a likelihood for at least one of a speech state and a non-speech state of the object person;
   the behavior content classification means classifies, using the lip state classifying HMM, whether or not the object person is in the speech state for frames of the first image;
   the device further comprises a speech start point classifying means for classifying a speech start point indicating the output of the lip state classifying HMM corresponding to a point when the object person starts a speech based on the classification result; and
   the behavior content classification means classifies a speech section from the start of the speech of the object person to the end of speech based on the classification result of the speech start point classification means.

4. The behavior content classification device according to claim 3, wherein the speech start point classification means sets a first one of the frames as a candidate for a speech start point when the classification result indicates the speech state successively from the first frame to an n-th (n is an integer and n≧2) frame, and classifies the first frame as a speech start point when the classification result indicates the state of speech successively from the n-th frame to an m-th (m is an integer and m≧3) frame.

5. The behavior content classification device according to claim 4, wherein:
   the speech start point classification means removes the first frame from the candidate for the speech start point when the classification result indicates a non-speech state within k (k is an integer, and k≦m) frames from the n-th frame, and indicates a non-speech state successively p (p is an integer and p≧10) frames from the (n+k)th frame, and classifies the first frame as a speech start point when the classification result indicates the start of speech again within r (r is an integer and r<p) frames from the (n+k)th frame.

6. The behavior content classification device according to claim 2, wherein
   the lip state classifying HMM outputs the likelihood for at least one of a speech state and a non-speech state of the object person;
   the behavior content classification means classifies whether or not the object person is in the speech state using the lip state classifying HMM for frames of the captured first image, and includes speech end point classification means for classifying a speech end point indicating output of the lip state classifying HMM corresponding to the point where the object person terminates the speech based on the classification result; and
   the behavior content classification means classifies a speech section from the start of speech to the end of speech of the object person based on the classification result of the speech end point classification means.

7. The behavior content classification device according to claim 6, wherein
   when the classification result indicates the non-speech state successively for w (w is an integer and w≧20) frames, the speech end point classification means classifies the first frame in the w frames as a speech end point.

8. The behavior content classification device according to claim 7, wherein
   when the state indicating non-speech continues for x (x is an integer and 6≦x<w) frames, the speech end point classification means continues the count up to the w-th frame although the classification result is the state indicating one of a single speech and a speech state for successive two frames in the count of the state indicating non-speech in and after x+1 frames, and when the speech state continues for three frames, the means clears the count.

9. A car navigation system, comprising:
   the behavior content classification device according to claim 2;
   speech recognition means for performing a speech recognition process based on a classification result of a speech section by the behavior content classification device; and
   operation processing means for performing predetermined operation processing based on a recognition result of the speech recognition means.

10. The behavior content classification device according to claim 1, wherein the behavior content classification means inputs to the HMM a set of the features of each frame corresponding to a predetermined number of frames of successive images and for a set of the features for which input to the HMM is started one set before, the input of a subsequent set of the features is started with predetermined frames shifted for the input of the first frame of the immediately previous set such that the frame of the immediately previous set can partly overlap the frame of the next set.

11. A behavior content classification device comprising:
image capturing means for capturing a first image including a face of an object person, the first image comprising a second image including an eye portion;
feature extraction means for extracting features from the second image;
an eye state classifying hidden Markov model (HMM) having as input the extracted features, and having as output a likelihood for a blink waveform of the object person; and
behavior content classification means for calculating the likelihood using the extracted features and the eye state classifying HMM, and for classifying the blink waveform of the object person based on the calculation result,
wherein:
the image capturing means comprises:
positional relation information acquisition means for acquiring positional relation information between the first image and the second image, and
face direction classification means for classifying a face direction of the object person according to the positional relation information,
the behavior content classification means further selects the HMM from among a plurality of candidate HMMs based on the classification result of the face direction classification means, the candidate HMMs being generated for a plurality of face directions, and the selected HMM corresponding to the face direction of face direction classification result.

12. The behavior content classification device according to claim 11, wherein:
the eye state classifying HMM outputs a likelihood for a blink of a specific type in response to the input of the extracted features; and
the behavior content classification means calculates the likelihood for the blink waveform having the specific characteristic for the features using the extracted features and the eye state classifying HMM, and classifies an arousal state of the object person based on the calculation result.

13. The behavior content classification device according to claim 12, wherein:
the behavior content classification means classifies the arousal state of the object person based on the change in the number of occurrences of each of the specific types of blinks in a predetermined time.

14. The behavior content classification device according to claim 11, wherein
the behavior content classification means inputs to the HMM a set of the features of each frame corresponding to a predetermined number of frames of successive first images and for a set of the features for which input to the HMM is started one set before, the input of a subsequent set of the features is started with predetermined frames shifted for the input of the first frame of the immediately previous set such that the frame of the immediately previous set can partly overlap with the frame of the next set.

15. A behavior content classification device comprising:
image capturing means for capturing a first image including a face of an object person, the first image comprising a second image including an eye portion;
feature extraction means for extracting features from the second image;
an eye state classifying hidden Markov model (HMM) having as input the extracted features, and having as output a likelihood for a blink speed and an aperture of the object person; and
behavior content classification means for calculating the likelihood using the extracted features and the eye state classifying HMM, and for classifying a type of the blink speed and aperture of the object person based on the calculation result,
wherein:
the image capturing means comprises:
positional relation information acquisition means for acquiring positional relation information between the first image and the second image, and
face direction classification means for classifying a face direction of the object person according to the positional relation information,
the behavior content classification means further selects the HMM from among a plurality of candidate HMMs based on the classification result of the face direction classification means, the candidate HMMs being generated for a plurality of face directions, and the selected HMM corresponding to the face direction of face direction classification result.

16. The behavior content classification device according to claim 15, wherein:
the behavior content classification means classifies an arousal state of the object person based on the calculation result.

17. An alarm system, comprising:
the behavior content classification device according to claim 16; and
notification means for displaying or raising an alarm of a classification result about the arousal state.

18. A behavior content classification program tangibly embodied in a non-transitory computer-readable storage device containing instructions which, when executed by a computer, perform a method for classifying a behavior content of an object person, the method comprising the steps of:
capturing a first image including a face of an object person;
detecting a predetermined portion of the face of the object person from the first image using a support vector machine (SVM) based on the first image;
extracting features in a second image including the detected predetermined portion;
calculating a likelihood for a behavior content relating to a movement of the predetermined portion using the extracted features and a hidden Markov model (HMM), the HMM having as input the extracted features, and having as output the likelihood; and
classifying the behavior content relating to the movement of the predetermined portion of the object person based on a calculation result,
wherein:
the method further comprises:
acquiring positional relation information between the first image and the second image; and
classifying a face direction of the object person according to the positional relation information; and the HMM is selected from among a plurality of candidate HMMs based on the face direction classification result, the candidate HMMs being generated for a plurality of face directions, and the selected HMM corresponding to the face direction of the face direction classification result.

19. The behavior content classification program according to claim 18, wherein:
the second image includes an image of a lip portion of the object person; and
the HMM includes a lip state classifying HMM.

20. A behavior content classification program tangibly embodied in a non-transitory computer-readable storage device containing instructions which, when executed by a computer, perform a method for classifying a behavior content of an object person, the method comprising the steps of:
capturing a first image including a face of an object person, the first image comprising a second image including an eye portion;
extracting features from the second image; and
calculating a likelihood for a blink waveform of the object person using the extracted features and an eye state classifying hidden Markov model (HMM), the HMM having as input the extracted features, and having as output the likelihood; and
classifying the blink waveform of the object person based on the calculation result,
wherein:
the method further comprises:
acquiring positional relation information between the first image and the second image; and
classifying a face direction of the object person according to the positional relation information; and
the HMM is selected from among a plurality of candidate HMMs based on the face direction classification result, the candidate HMMs being generated for a plurality of face directions, and the selected HMM corresponding to the face direction of the face direction classification result.

21. A behavior content classification method comprising:
capturing, by an image capturing device, a first image including a face of an object person;
detecting, by a face portion detection device, a predetermined portion of the face of the object person from the first image using a support vector machine (SVM) based on the first image;
extracting, by a feature extraction device, features in a second image including the detected predetermined portion;
calculating, by a behavior content classification device, a likelihood for a behavior content relating to a movement of the predetermined portion using the extracted features and a hidden Markov model (HMM), the HMM having as input the extracted features, and having as output the likelihood; and
classifying, by the behavior content classification device, the behavior content relating to the movement of the predetermined portion of the object person based on a calculation result,
wherein:
the method further comprises:
acquiring, by a positional relation information acquisition device, positional relation information between the first image and the second image; and
classifying, by a face direction classification device, a face direction of the object person according to the positional relation information; and
the HMM is selected from among a plurality of candidate HMMs based on the face direction classification result, the candidate HMMs being generated for a plurality of face directions, and the selected HMM corresponding to the face direction of the face direction classification result.

22. The behavior content classification method according to claim 21, wherein:
the second image includes an image of a lip portion of the object person; and
the HMM includes a lip state classifying HMM.

23. A behavior content classification method comprising:
capturing, by an image capturing device, a first image including a face of an object person, the first image comprising a second image including an eye portion;
extracting, by a feature extraction device, features from the second image;
calculating, by a behavior content classification device, a likelihood for a blink waveform of the object person using the extracted features and an eye state classifying hidden Markov model (HMM), the HMM having as input the extracted features, and having as output the likelihood; and
classifying, by the behavior content classification device, the blink waveform of the object person based on the calculation result,
wherein:
the method further comprises:
acquiring, by a positional relation information acquisition device, positional relation information between the first image and the second image; and
classifying, by a face direction classification device, a face direction of the object person according to the positional relation information; and
the HMM is selected from among a plurality of candidate HMMs based on the face direction classification result, the candidate HMMs being generated for a plurality of face directions, and the selected HMM corresponding to the face direction of the face direction classification result.

* * * * *